United States Patent
Park et al.

(10) Patent No.: US 10,366,374 B2
(45) Date of Patent: Jul. 30, 2019

(54) MOBILE TERMINAL AND METHOD FOR CONTROLLING THE SAME INCLUDING ELECTRONIC RECEIPT MANAGEMENT SYSTEM

(71) Applicant: LG ELECTRONICS INC., Seoul (KR)

(72) Inventors: Hanl Park, Seoul (KR); Hyunjin Kim, Seoul (KR); Hyewon Song, Seoul (KR); Boram Kim, Seoul (KR); Dongsu Han, Seoul (KR); Joonsung Sohn, Seoul (KR); Hoyoung Kim, Seoul (KR); Minho Kim, Seoul (KR); Woonghee Park, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 15/235,830

(22) Filed: Aug. 12, 2016

(65) Prior Publication Data
US 2017/0061395 A1 Mar. 2, 2017

(30) Foreign Application Priority Data

Aug. 28, 2015 (KR) .................... 10-2015-0122163
Dec. 23, 2015 (KR) .................... 10-2015-0185045

(51) Int. Cl.
*G06Q 20/04* (2012.01)
*G06Q 10/10* (2012.01)
(Continued)

(52) U.S. Cl.
CPC ....... *G06Q 20/0453* (2013.01); *G06F 1/1626* (2013.01); *G06F 3/016* (2013.01); *G06Q 10/1093* (2013.01)

(58) Field of Classification Search
CPC ............ G06Q 20/0453; G06Q 10/1093; G06F 1/1626; G06F 3/016
(Continued)

(56) References Cited

U.S. PATENT DOCUMENTS 6,487,540 B1 * 11/2002 Smith ................. G06Q 20/02
705/21
2003/0158819 A1 * 8/2003 Scott ...................... G06F 21/10
705/65

(Continued)

FOREIGN PATENT DOCUMENTS

KR 1020110035391 A 4/2011
KR 1020140137059 A 12/2014

*Primary Examiner* — Dylan C White
(74) *Attorney, Agent, or Firm* — Dentons US LLP

(57) ABSTRACT

A mobile terminal and a method for controlling the mobile terminal are disclosed. A mobile terminal according to the present invention comprises a wireless communication unit; touch screen; memory; and a controller displaying on the touch screen an electronic receipt received through the wireless communication unit as payment of product is being processed, generating notification information on the basis of payment information obtained from the electronic receipt and service information according to the payment, and storing the notification information in the memory in conjunction with a calendar application. According to the present invention, notification information can be generated on the basis of the information obtained from an electronic receipt, and generated notification information can be managed in conjunction with a calendar application.

19 Claims, 94 Drawing Sheets

(51) Int. Cl.
*G06F 1/16* (2006.01)
*G06F 3/01* (2006.01)

(58) Field of Classification Search
USPC .......................................... 705/7.18
See application file for complete search history.

(56) References Cited

U.S. PATENT DOCUMENTS

| | | | |
|---|---|---|---|
| 2005/0131768 A1* | 6/2005 | Rodriguez | G06Q 20/202 705/4 |
| 2005/0255835 A1 | 11/2005 | Goto | |
| 2010/0057586 A1* | 3/2010 | Chow | G01S 19/14 705/26.1 |
| 2012/0265694 A1* | 10/2012 | Tuchman | G06Q 30/01 705/304 |
| 2013/0226798 A1* | 8/2013 | Orttung | G06Q 20/027 705/44 |
| 2013/0275299 A1* | 10/2013 | Yang | G06Q 20/0453 705/41 |
| 2014/0101048 A1* | 4/2014 | Gardiner | G06Q 20/3276 705/44 |
| 2014/0149236 A1* | 5/2014 | Argue | G06Q 20/3276 705/16 |
| 2015/0142592 A1* | 5/2015 | Chauhan | G06Q 20/202 705/21 |
| 2016/0253669 A1* | 9/2016 | Yoon | G06Q 20/4014 705/75 |
| 2017/0293909 A1* | 10/2017 | Song | G06Q 20/405 |
| 2017/0344994 A1* | 11/2017 | Wang | G06Q 20/405 |
| 2018/0053259 A1* | 2/2018 | Brahma | G06Q 40/12 |

* cited by examiner (a)　　　　　　　　(b)

(a)  (b)

FIG. 67
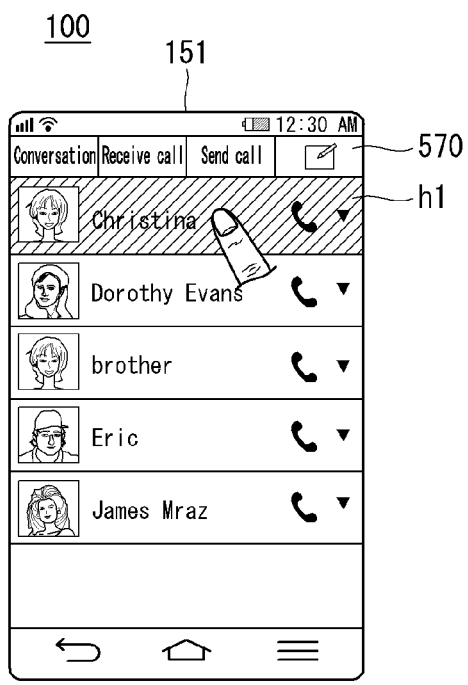
(a)
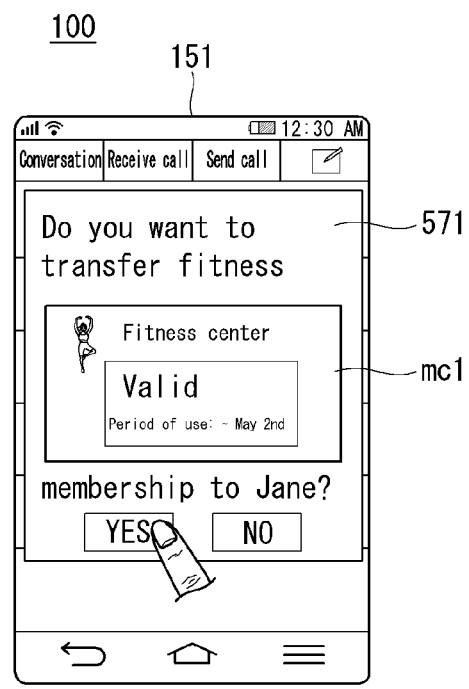
(b)

FIG. 69
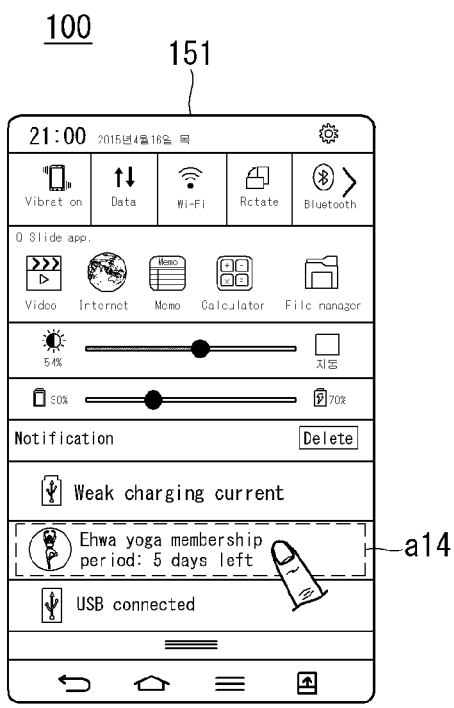
(a)
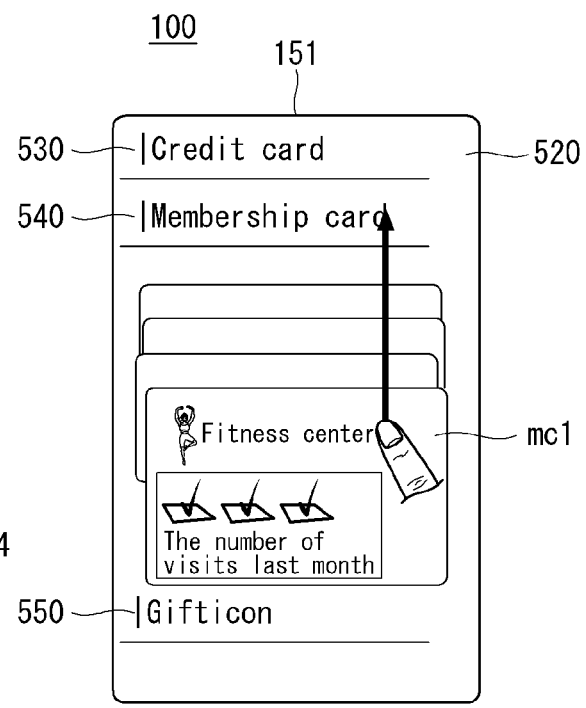
(b)

(a)  (b)

FIG. 74
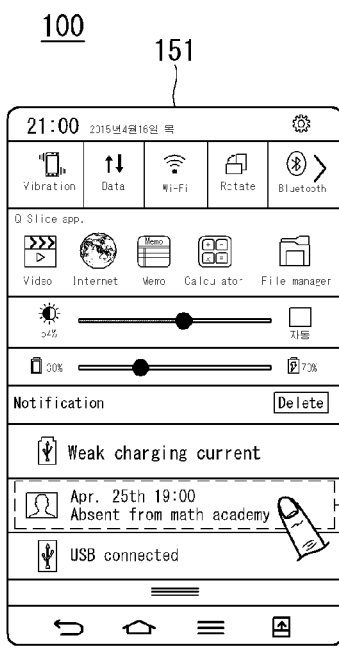
(a)
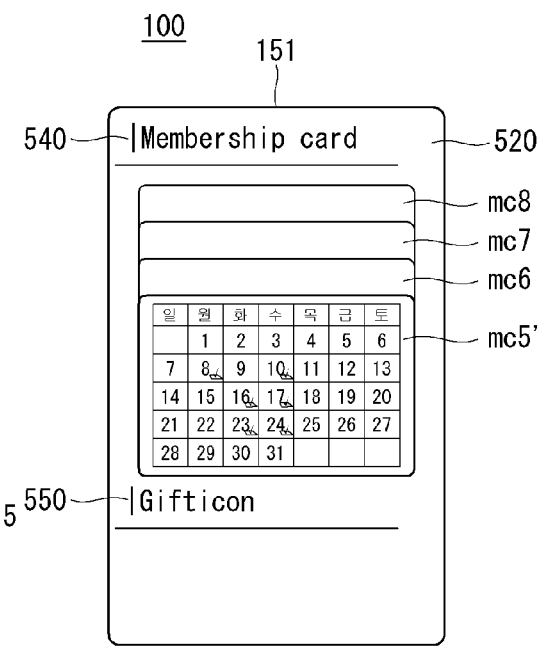
(b)

MOBILE TERMINAL AND METHOD FOR CONTROLLING THE SAME INCLUDING ELECTRONIC RECEIPT MANAGEMENT SYSTEM

CROSS-REFERENCE TO RELATED APPLICATIONS

This application claims priority to Korean Patent Application No. 10-2015-0122163 filed on 28 Aug. 2015 in Korea, and Korean Patent Application No. 10-2015-0185045 filed on 23 Dec. 2015 in Korea, the entire contents of which is hereby incorporated by reference in its entirety.

BACKGROUND OF THE DISCLOSURE

1. Field of the Disclosure

The present invention is related to a mobile terminal with enhanced user convenience to utilize an electronic receipt received at the time of payment and a method for controlling the mobile terminal.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Meanwhile, as mobile payment based on mobile terminals is becoming common, demand for a user interface is growing, through which a user can manage electronic receipts stored in the mobile terminal and utilize various types of information by using the electronic receipts.

SUMMARY OF THE DISCLOSURE

Accordingly, an object of the present invention is to address the above-noted and other problems.

An object of the present invention is to address the above-noted and other problems. Another object of the present invention is to provide a mobile terminal generating notification information on the basis of the information obtained from an electronic receipt and managing the generated notification information in conjunction with a calendar application; and a method for controlling the mobile terminal.

The present invention according to one aspect to achieve the above-noted and other objects provides a mobile terminal comprising a wireless communication unit; touch screen; memory; and a controller displaying on the touch screen an electronic receipt received through the wireless communication unit as payment of product is being processed, generating notification information on the basis of payment information obtained from the electronic receipt and service information according to the payment, and storing the notification information in the memory in conjunction with a calendar application.

The payment information can include seller information of the product, time of the payment, amount of the payment, and name of the product; and the service information can include at least one of information related to refund, replacement, after-sales service, or warranty of the product.

In case at least one of the service information is not obtained from the electronic receipt, the controller can receive the service information not obtained from the electronic receipt through the wireless communication unit on the basis of the seller information.

The controller can generate the notification information which includes notification time at which to output the notification information according to a predetermined condition on the basis of the payment information and the service information; and notification contents.

If receiving a first input with respect to the electronic receipt, the controller can display a menu for storing the electronic receipt in conjunction with the calendar application.

In case an execution screen of the calendar application is displayed on the touch screen, the controller can display a payment item indicating that the payment has been processed on the execution screen of the calendar application along with payment time and display a notification item indicating that the notification information has been set on the execution screen of the calendar application along with generated notification time.

In case a payment item displayed on the execution screen of the calendar application is selected, the controller can display specific information of a receipt on the touch screen, where the payment information and the service information are arranged in terms of predetermined items.

The controller can edit the receipt specific information or display a user interface within the receipt specific information, through which a user can input a condition for generating the notification information.

In case a notification item displayed on the execution screen of the calendar application is selected, the controller can display the generated notification information on the touch screen.

If receiving a second input with respect to the electronic receipt, the controller can search the memory for an electronic receipt having the same seller information as the electronic receipt and display the searched electronic receipt on the touch screen.

If receiving a third input with respect to the electronic receipt, the controller can display a user interface for writing a memo in the electronic receipt.

In case the electronic receipt includes a plurality of products, the controller can store receipt specific information with respect to a selected product, where the payment information and the service information are arranged in terms of predetermined items and generate the notification information with respect to the selected product.

In case the payment is canceled, the controller can receive an electronic receipt due to the cancellation through the wireless communication unit and reflect information according to the cancellation in the calendar application.

At the time of the payment, the controller can receive a warranty for the corresponding product through the wireless communication unit and store the received warranty in conjunction with the electronic receipt.

The mobile terminal can further comprise a camera, and the electronic receipt may be the image of the receipt obtained through the camera; and the controller can obtain the payment information and the service information from the image of the receipt.

The controller can receive vehicle information from a vehicle control system through the wireless communication unit and generate the notification information on the basis of the payment information, the service information, and the vehicle information.

The vehicle information can include driving record, maintenance record, fueling record, and wash record of the vehicle.

In case the controller receives a payment request from the vehicle control system, the controller can perform a user authentication process and transmit payment approval information through the wireless communication unit.

If payment via a mobile credit card is processed at a member shop, the controller can receive the electronic receipt, generate a mobile membership card for the member ship on the basis of the electronic receipt, store the generated mobile membership card in conjunction with the mobile credit card and the received electronic receipt, and display the generated mobile membership card on the touch screen.

The controller can display the mobile credit card and the mobile membership card on the execution screen of a card management application which manages mobile cards stored in the mobile terminal along with other mobile cards; and if a predetermined input with respect to the mobile membership card is received from the execution screen of the card management application, perform an operation corresponding thereto.

In what follows, described are the effects of a mobile terminal according to the present invention and a method for controlling the mobile terminal.

According to at least one of embodiments of the present invention, since notification information is generated on the basis of the information obtained from an electronic receipt, and generated notification information is managed in conjunction with a calendar application, notification information according to an electronic receipt can be checked with ease.

Also, according to at least one of embodiments of the present invention, since service information is obtained on the basis of seller information included in an electronic receipt, the service information can be obtained easily even when the electronic receipt does not contain the service information.

Also, according to at least one of embodiments of the present invention, since notification information is generated according to a predetermined condition on the basis of payment information and service information, desired notification information can be checked easily.

Also, according to at least one of embodiments of the present invention, since a menu for storing an electronic receipt is displayed according to a predetermined input applied to the electronic receipt, electronic receipts can be managed easily with a simple operation.

Also, according to at least one of embodiments of the present invention, since an item representing payment information or notification information is displayed in a calendar application according to an electronic receipt, information related to the electronic receipt can be easily recognized from an execution screen of the calendar application.

Also, according to at least one of embodiments of the present invention, since receipt specific information is displayed when a payment item displayed on the execution screen of the calendar application is selected, the receipt specific information can be easily recognized in conjunction with the calendar application.

Also, according to at least one of embodiments of the present invention, since a user interface for receiving a condition for editing receipt specific information or receiving a condition for generating notification information is provided, information related to an electronic receipt can be utilized as needed.

Also, according to at least one of embodiments of the present invention, since generated notification information is displayed if an notification item displayed on the execution screen of the calendar application is selected, notification information configured in conjunction with the calendar application can be checked easily.

Also, according to at least one of embodiments of the present invention, since a different electronic receipt having the same seller information as an electronic receipt according to a predetermined input applied to the electronic receipt is displayed, information related to electronic receipts can be figured out easily.

Also, according to at least one of embodiments of the present invention, since a memo can be written to an electronic receipt according to a predetermined input applied to the electronic receipt, a memo related to electronic receipts can be written easily.

Also, according to at least one of embodiments of the present invention, since information about part of products included in an electronic receipt can be stored selectively, desired contents can be stored and managed easily.

Also, according to at least one of embodiments of the present invention, since information due to payment cancellation is reflected in the calendar application, information due to payment cancellation can be checked easily.

Also, according to at least one of embodiments of the present invention, since a warranty received at the time of payment of the corresponding product is stored in conjunction with an electronic receipt, product warranties can be managed easily.

Also, according to at least one of embodiments of the present invention, since generated notification information is output at notification time, notification information can be checked easily.

Also, according to at least one of embodiments of the present invention, since payment information is obtained from an image of a receipt obtained through a camera, offline receipts can also be managed easily.

Also, according to at least one of embodiments of the present invention, since notification information is generated on the basis of vehicle information received from a vehicle control system and information obtained from an electronic receipt, payment of a vehicle-related product can be managed easily.

Also, according to at least one of embodiments of the present invention, since remote payment is performed with respect to a payment request received from a vehicle control system, payment of a vehicle-related product can be processed easily.

Also, according to at least one of embodiments of the present invention, since a mobile membership card is generated on the basis of an electronic receipt received at the time of mobile payment, a membership card related to a payed product can be generated easily.

Also, according to at least one of embodiments of the present invention, since a generated mobile membership card is managed in conjunction with an electronic receipt and a mobile credit card used for payment, payment related to the mobile membership card can be managed easily.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 66 to 68 illustrate transferring a paid product in case payment cancellation is not possible according to one embodiment of the present invention.

FIGS. 69 and 70 illustrate performing additional payment in case a period of using a paid product is shorter than a predetermined time period according to one embodiment of the present invention.

FIGS. 72 to 74 illustrate classifying and managing mobile cards according to a predetermine criterion in a card management application according to one embodiment of the present invention.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1:
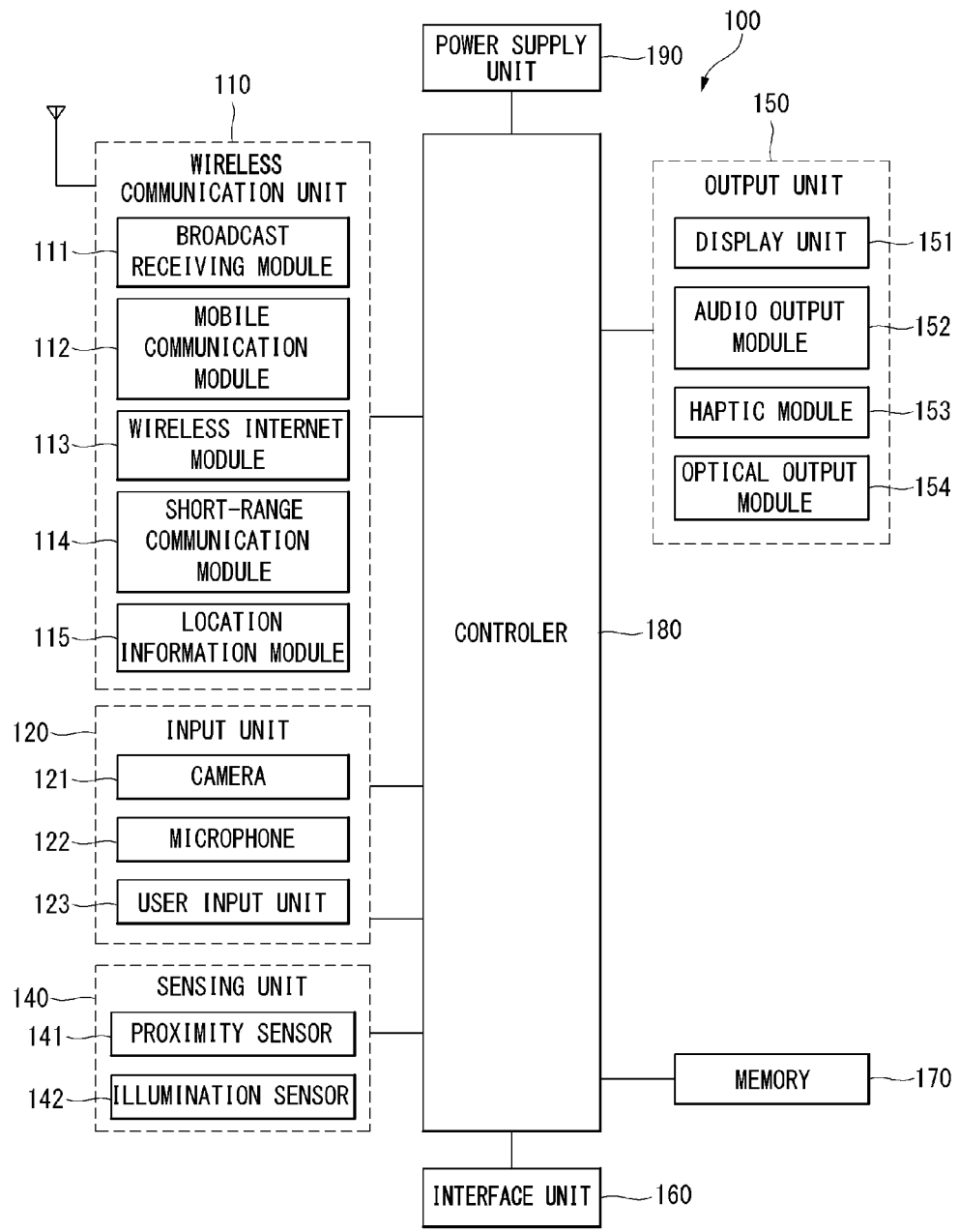
FIG. 1 is a block diagram of a mobile terminal in accordance with the present disclosure.

Reference is now made to FIG. 1, where FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO(Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Further preferred embodiments will be described in more detail with reference to additional drawing figures. It is understood by those skilled in the art that the present features can be embodied in several forms without departing from the characteristics thereof.

In what follows, embodiments related to a control method which can be implemented in a mobile terminal configured as above will be described with reference to appended drawings. It should be clearly understood by those skilled in the art that the present invention can be embodied in several specific forms without departing from the technical principles and fundamental characteristics of the present invention.

Figure 2:
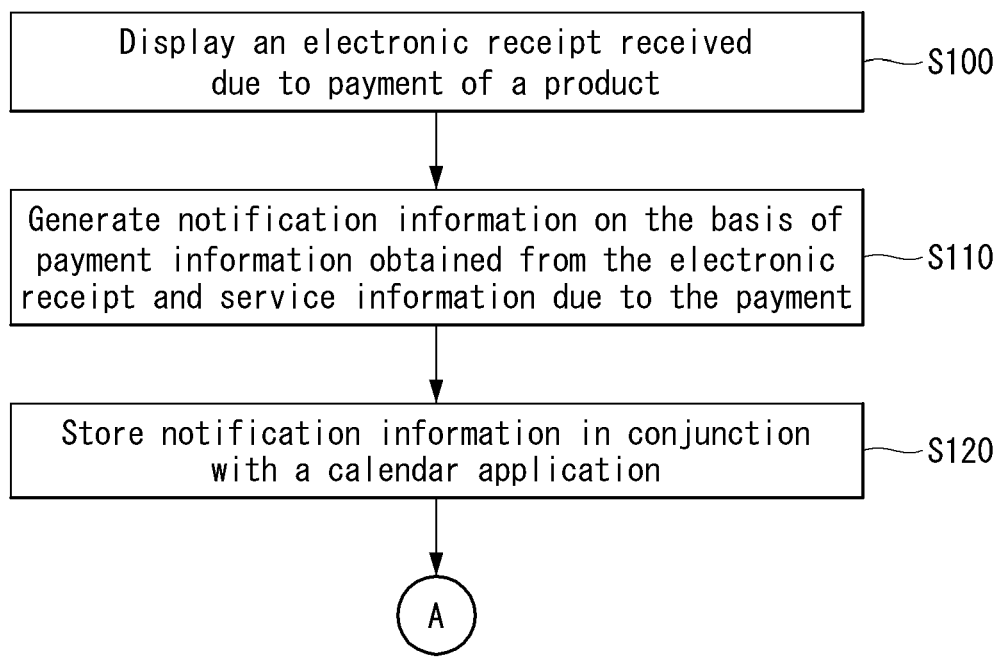
FIG. 2 is a flow diagram of a method for controlling a mobile terminal according to one embodiment of the present invention.

FIG. 2 is a flow diagram of a method for controlling a mobile terminal according to one embodiment of the present invention. FIGS. 3 to 7 illustrate storing notification information generated from an electronic receipt according to one embodiment of the present invention in conjunction with a calendar application.

A method for controlling a mobile terminal according to one embodiment of the present invention can be embodied in a mobile terminal 100 described with reference to FIG. 1.

In what follows, described in detail will be a method for controlling a mobile terminal according to one embodiment of the present invention and operation of the mobile terminal 100 to realize the method.

With reference to FIG. 2, the controller 180 can display an electronic receipt received from payment of a product on a touch screen S100.

The product can include not only a specific, physical product (for example, mobile terminal) but also a service for which a period and the number of times of using the service is predetermined, such as a right of using a fitness center or a private academy. Payment of the product may denote the payment performed while the product is being bought from a seller of the product. For example, the seller may denote a member shop which receives a payment transaction service from subscription to a card company which provides services related to credit cards or mobile credit cards and pays a predetermined amount of fees to the card company. In this case, the member shop can be equipped with a sales system such as a POS (Point Of Sales) system.

Figure 3:
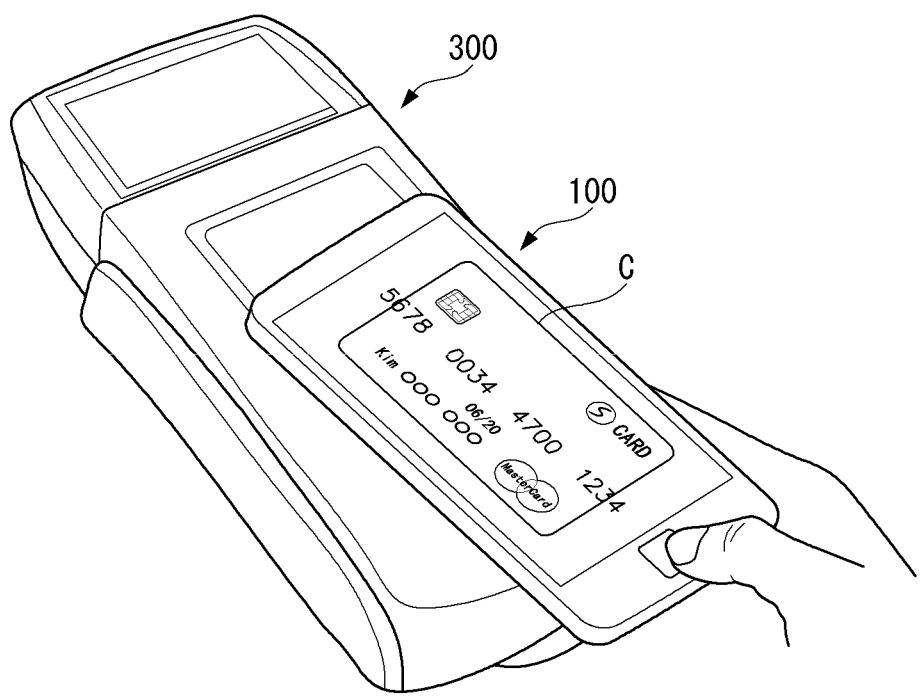
FIGS. 3 to 7 illustrate storing notification information generated from an electronic receipt according to one embodiment of the present invention in conjunction with a calendar application.

According to one embodiment, the mobile credit card can denote card information of a payment card such as a credit card stored in a mobile terminal 100. Or as shown in FIG. 3, the mobile credit card can denote the image (c) of a credit card generated on the basis of card information stored in the mobile terminal 100.

According to one embodiment, the controller 180 can perform mobile payment by using information of a mobile credit card stored in the mobile terminal 100. With reference to FIG. 3, to purchase the product, the user can put the mobile terminal 100 close to the payment terminal of the sales system 300. In this case, the payment terminal can receive information of the mobile credit card from the mobile terminal 100. According to one embodiment, a short range communication technology such as NFC described above can be applied for receiving information of the mobile credit card.

Figure 4:
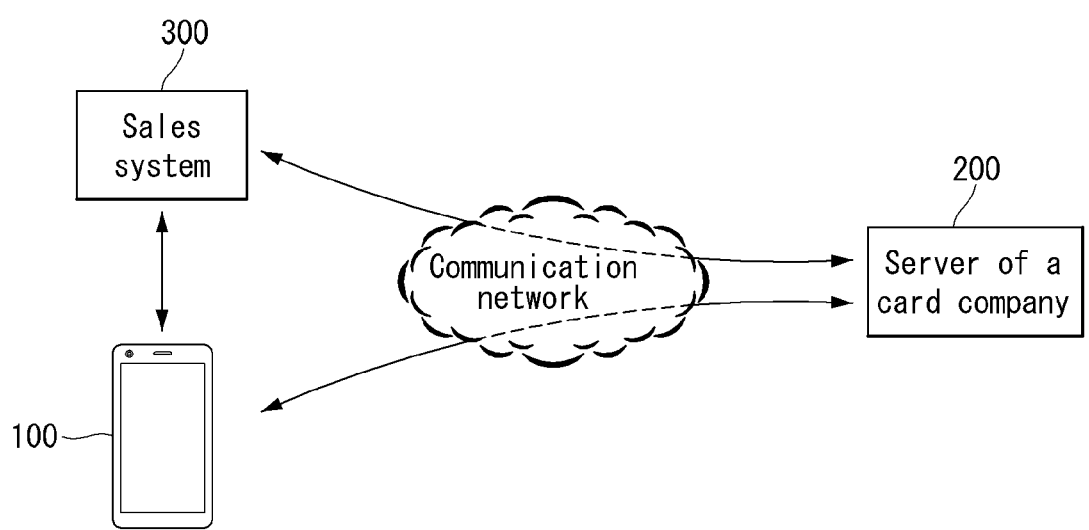

With reference to FIG. 4, the sales system 300 can transmit a payment approval request to the server 200 of the card company for the mobile credit card along with the information of the mobile credit card received through the payment terminal. The server 200 of the card company can perform an authentication process with respect to the transmitted information of the mobile credit card.

In case the transmitted information of the mobile transmit card is authenticated, the server 200 of the card company can transmit payment approval information to the sales system 300 in response to the transmitted payment approval request. In case the payment is approved, the sales system 300 can transmit an electronic receipt due to payment of a product to the mobile terminal 100. Also, the server 200 of the card company can transmit information about payment details to the mobile terminal 100.

Figure 5:
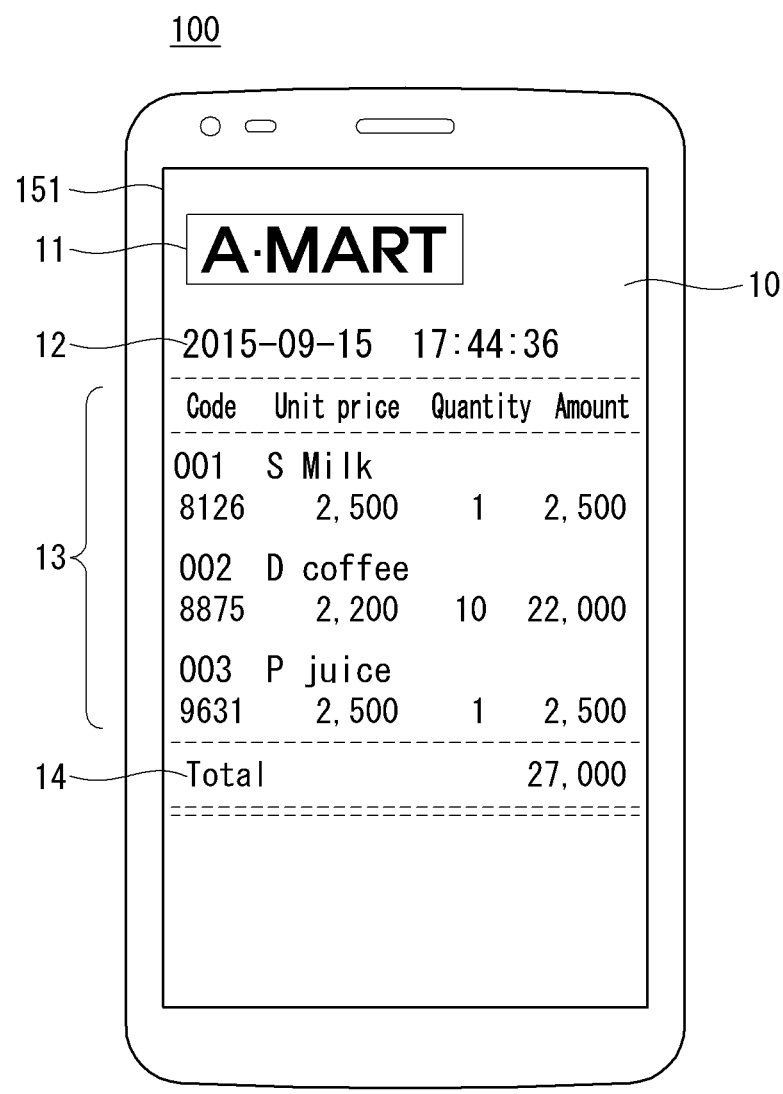

The controller 180 can receive the electronic receipt through the wireless communication unit 110. As shown in FIG. 5, the controller 180 can display the received electronic receipt 10 on the touch screen 151. According to one embodiment, the electronic receipt can include payment information and service information according to the payment.

With reference to FIG. 5, an electronic receipt 10 can include payment information such as a seller information 11, payment time 12, product name 13, and the amount of payment 14. Though not shown in FIG. 5, the electronic receipt 10 can include service information due to the payment including at least one among the information of refund, replacement, after-sales service, and warranty of the product.

Likewise, according to one embodiment, in case payment is processed for a service where an available period for the service and the number of times allowed for using the service are predetermined, the mobile terminal 100 can further receive information about the available service period and the number of times allowed for using the service through a payment terminal of the sales system 300. In this case, the electronic receipt 10 can include information about the available service period and the number of times allowed for using the service.

In the embodiment above, a process for mobile payment has been described for the case where a product is purchased from a seller, which is a member shop. However, the embodiment is merely an example, and it should be understood that the present invention is not limited to the embodiment. An arbitrary method can be used as a mobile payment method for the payment of the product as long as the electronic receipt 10 can be transmitted to the mobile terminal 100.

Also, according to one embodiment, it was assumed that mobile payment is performed by using a mobile credit card, but the present invention is not limited to the embodiment. Descriptions below can actually be applied in the same way even in a case where a user performs payment for a product by using an actual credit card or cash, and the controller 180 receives the electronic receipt 10 with respect to the product payment.

Again, with reference to FIG. 2, the controller 180 can generate notification information on the basis of payment information obtained from the electronic receipt and service information due to the payment S110.

The controller 180 can obtain payment information from the electronic receipt and service information due to the payment. According to one embodiment, the payment information and the service information due to the payment can be received directly through a payment terminal of the sales system 300. Or according to another embodiment, the controller 180 can extract the payment information and the service information due to the payment from the electronic receipt 10 by applying a character recognition technology.

Figure 7:
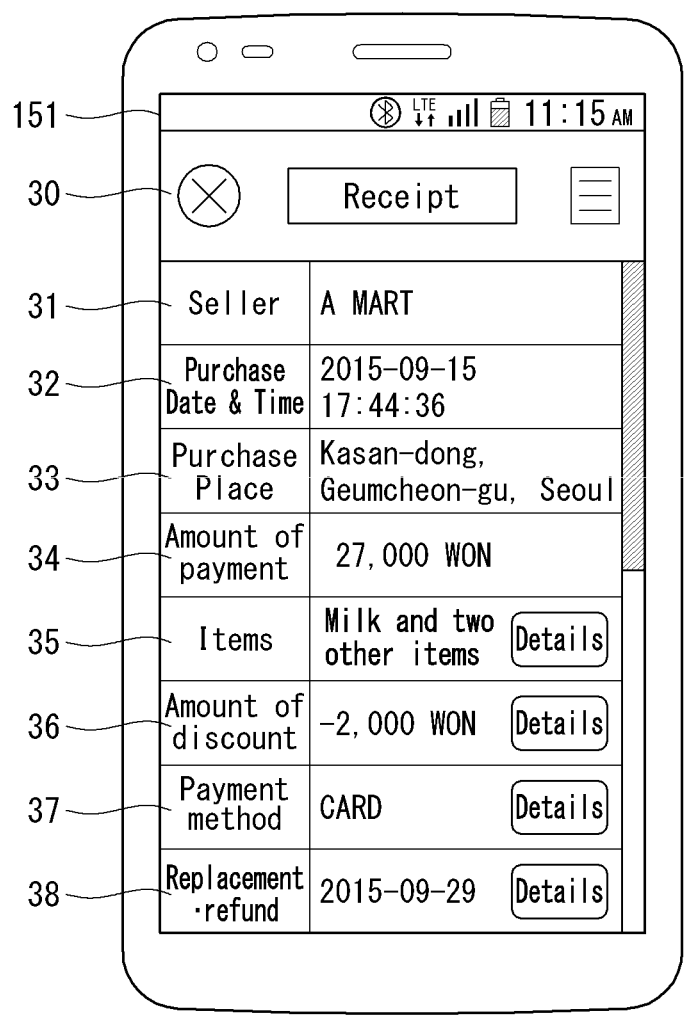

The controller 180 can generate receipt specific information by arranging the obtained payment information and service information due to the payment in terms of predetermined items. FIG. 7 shows one example of the receipt specific information 30. The predetermined items include a seller name 31, payment date and time 32, place of payment 33, amount of payment 34, transaction items 35, amount of discount 36, payment method 37, and replacement • refund information 38. However, it is only an example, and the present invention is not limited to the example; therefore, specific contents can be configured differently as needed.

According to one embodiment, the payment information can include product seller information, payment time, amount of payment, and product name. The service information can include at least one among the information related to refund, replacement, after-sales service or warranty of a product. However, it is only an example, and the present invention is not limited to the example; therefore, another information can be further included according to the needs.

The controller 180 can generate notification information including notification time at which to output the notification information according to a predetermined condition on the basis of the payment information and the service information according to the payment; and notification contents. The notification information can be the information used to notify refund or replacement warranty period related to product payment.

For example, suppose that a refund period of the seller who has issued the electronic receipt 10 of FIG. 5 is two weeks from the payment. Also further suppose that refund information is configured to be generated in the form of notification information, and the refund information is predetermined to be output one day before the last day of the refund period. In this case, the controller 180 can generate notification information which outputs refund information one day before the last day of the refund period.

Again, with reference to FIG. 2, the controller 180 can store the notification information in conjunction with a calendar application S120.

The controller 180 can reflect the notification information generated according to the configured notification time in the calendar application and store the notification information in the memory 170. The calendar application is only an example, and the present invention is not limited thereto. Therefore, any application, for example, a schedule management application, can be applied irrespective of its name or type once it is capable of recording and managing information.

Figure 6:
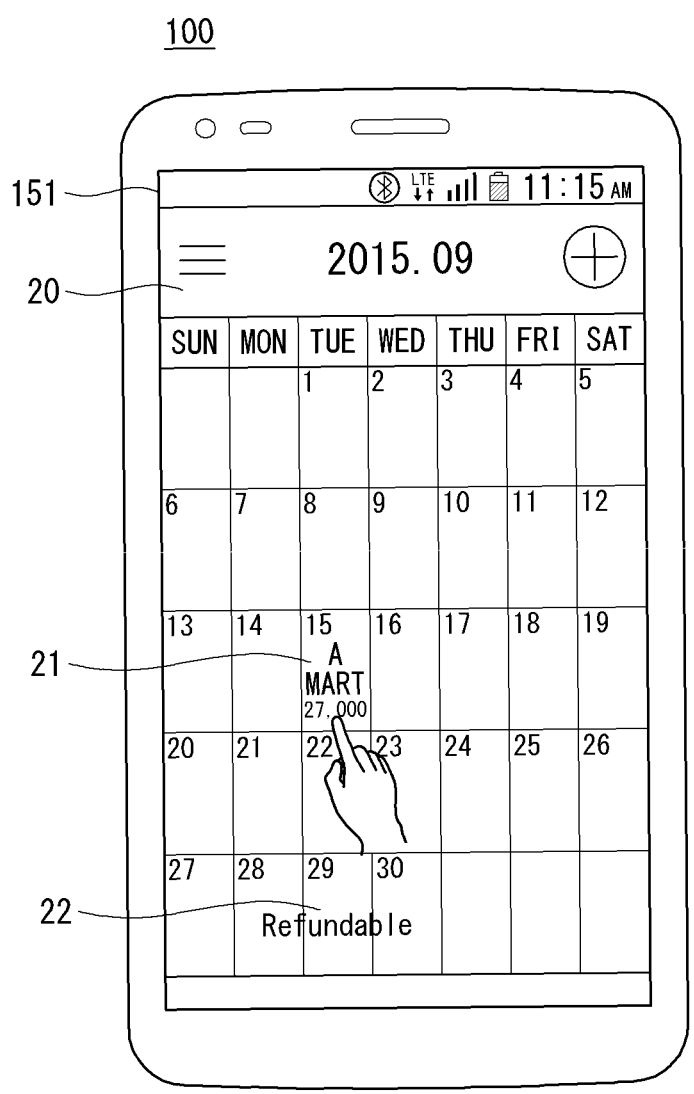

FIG. 6 shows that an execution screen 20 of the calendar application is displayed on the touch screen 151. The execution screen 20 can display a payment item 21 indicating that payment of the corresponding product has been processed at the payment time obtained from the electronic receipt. Also, the execution screen 20 can display a notification item 22 indicating that notification information has been generated according to the notification time.

In case the payment item 21 is selected, the controller 180 can display receipt specific information 30 due to the payment on the touch screen 151 as shown in FIG. 7. Or in case the payment item 21 is selected, the controller 180 can display the electronic receipt 10 on the touch screen 151.

According to one embodiment, a touch input for displaying the receipt specific information 30 or electronic receipt 10 can be configured to be distinguished from each other. For example, in case the payment item 21 is touched, the controller 180 can be configured to display the receipt specific information 30. In case the payment item 21 is touched for more than a predetermined time period, the controller 180 can be configured to display the electronic receipt 10.

However, the description above is only an example, and the touch input can be implemented by various touch methods such as a short touch, multi-touch, drag touch, flick touch, pinch-in touch, pinch-out touch, swipe touch, and hovering touch; and a combination thereof.

According to the description above, since notification information is generated on the basis of the information obtained from an electronic receipt, and the generated notification information is managed in conjunction with a calendar application, the user can easily check the notification information based on the electronic receipt. Also, since notification information is generated according to a predetermined condition on the basis of payment information and service information, the user can easily check the notification information that the user wants to know.

FIGS. 8 to 10b illustrate obtaining service information on the basis of seller information included in an electronic receipt according to one embodiment of the present invention.

Figure 8:
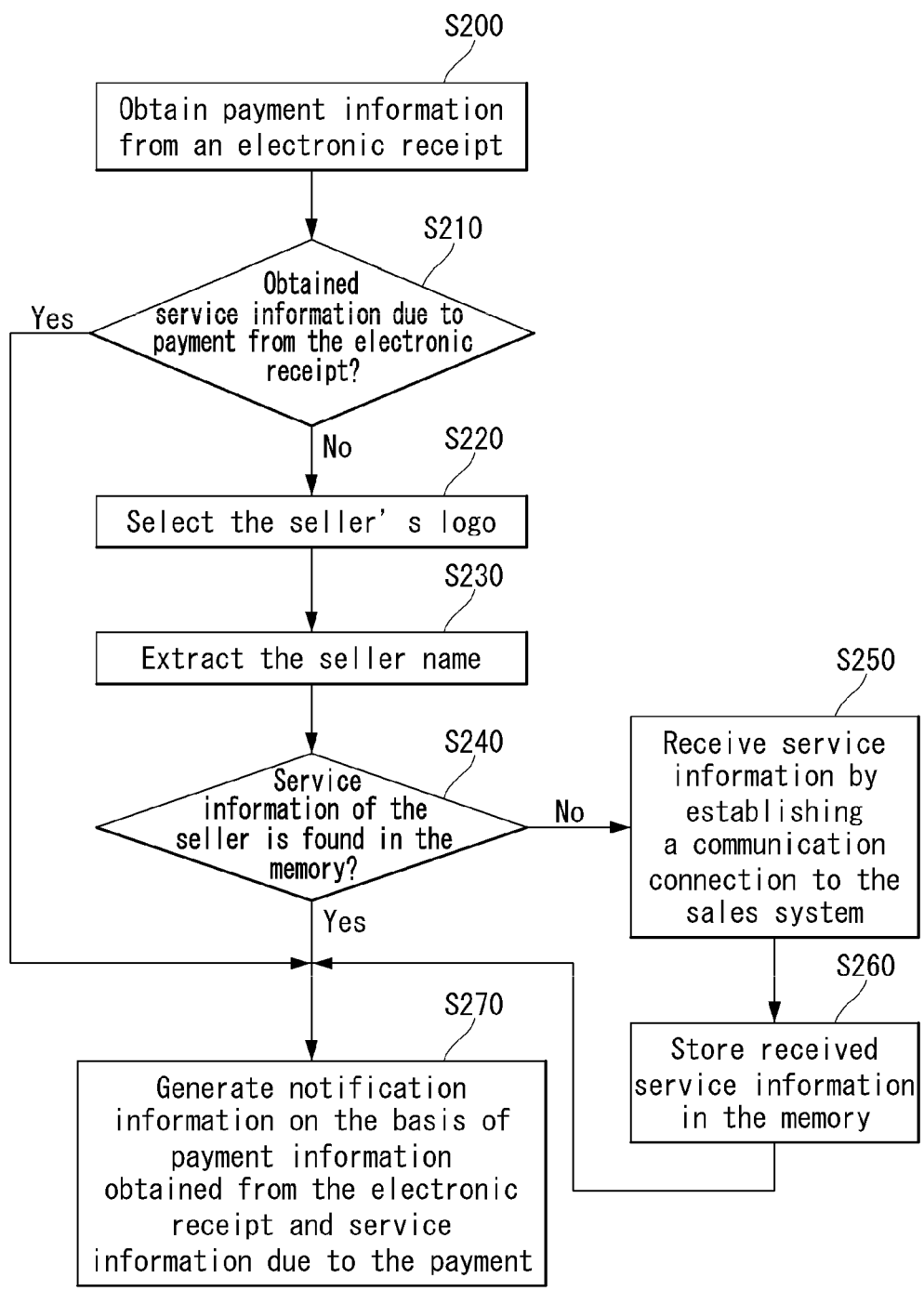
FIGS. 8 to 10b illustrate obtaining service information on the basis of seller information included in an electronic receipt according to one embodiment of the present invention.

With reference to FIG. 8, the controller 180 can receive an electronic receipt 10 and obtain the payment information from the electronic receipt 10, S200. In case the service information is obtained from the electronic receipt 10, S210 (Yes), the controller 180 can generate notification information on the basis of the obtained payment information and service information S270. As described above, the service information can be obtained either by receiving it directly from the sales system 300 or extracting it from the electronic receipt 10.

Figure 9A:
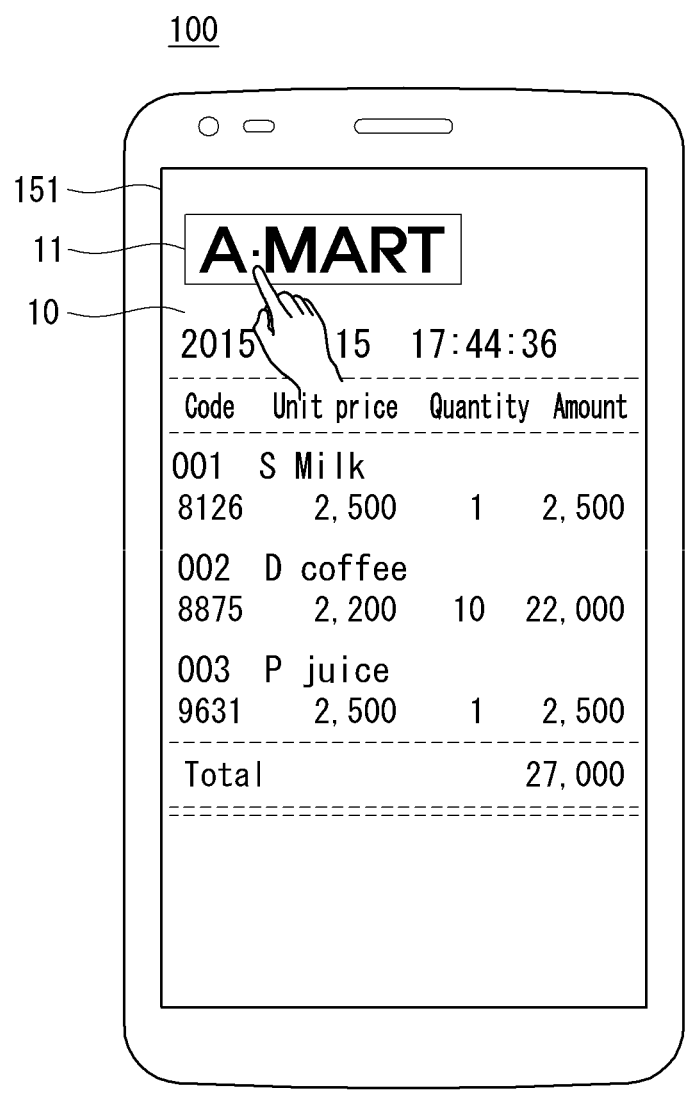
Figure 10A:
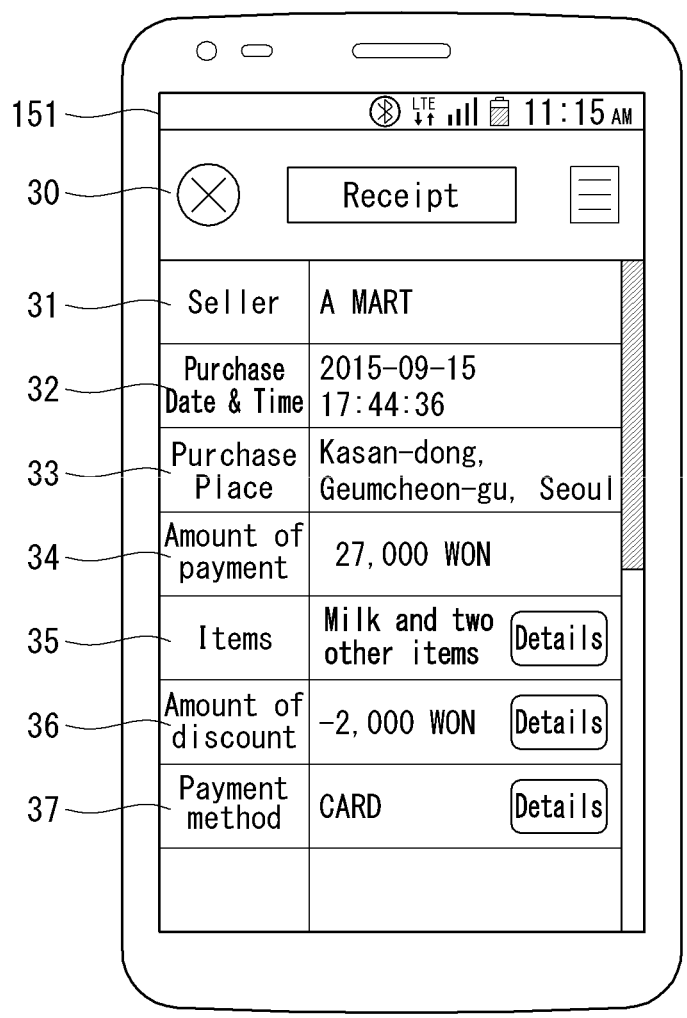

Now suppose at least one of the service information is not obtained from the electronic receipt S210 (No). In other words, it is assumed that refund • replacement information is not obtained. In this case, as shown in FIG. 10a, the receipt specific information 30 does not include refund • replacement information. In this case, as shown in FIG. 9a, the user can select a seller logo 11 which is seller information included in the electronic receipt 10.

If an input selecting the seller logo 11 is received S220, the controller 180 can extract seller information S230. Or if an input selecting the seller logo 11 is received, the controller 180 can obtain seller information from the payment information. The controller 180 can search the memory 170 for service information such as refund • replacement by the seller on the basis of the seller information S240.

In case the service information is stored in the memory 170, S240 (Yes), the controller 180 can generate notification information on the basis of the obtained payment information and service information S270.

Figure 9B:
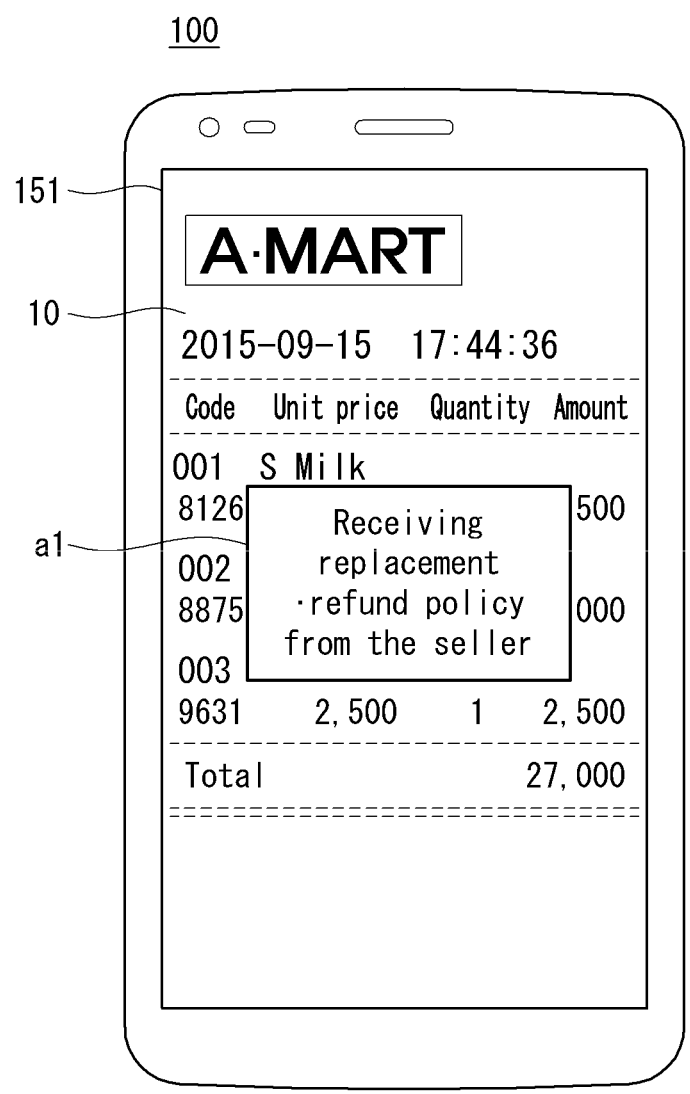

In case the service information is not stored in the memory 170, S240 (No), the controller 180 can be connected to the sales system 300 through the wireless communication unit 110 on the basis of the seller information. The controller 180 can request the service information from the sales system 300 and receive the service information from the sales system 300, S250. According to one embodiment, as shown in FIG. 9b, the controller 180 can display notification a1 which notifies of receiving the service information on the touch screen 151.

Figure 10B:
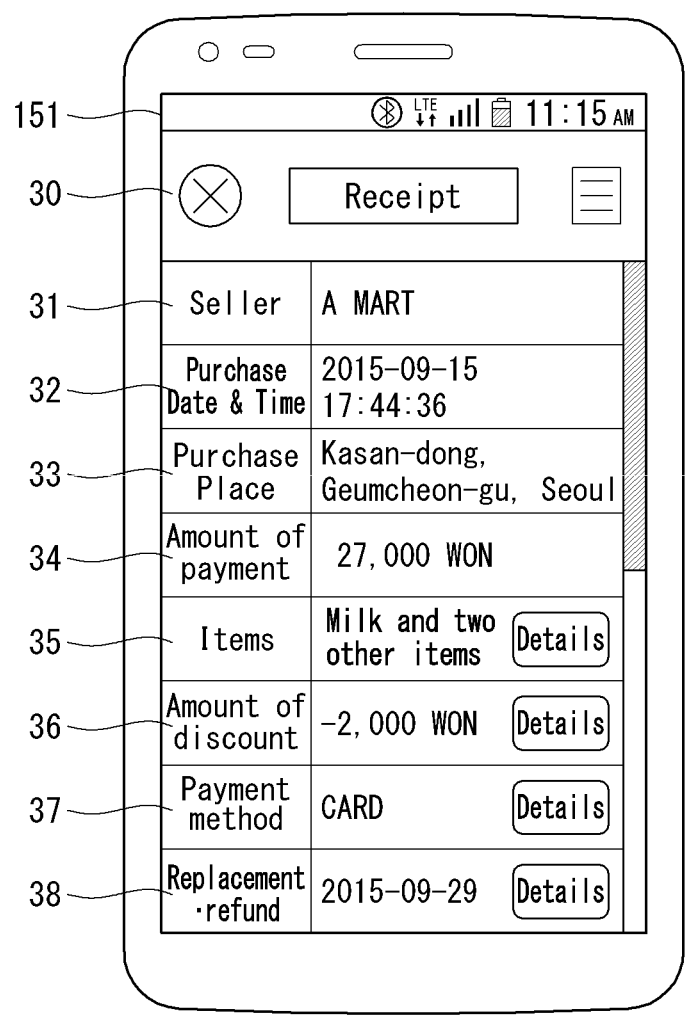

The controller 180 can store the received service information in the memory 170 in conjunction with the obtained payment information. Accordingly, the receipt specific information 30 can include refund • replacement information 38 as shown in FIG. 10b. The controller 180 can generate notification information on the basis of the obtained payment information and service information S270. In FIG. 8, the controller 180 is depicted to perform the S270 step after the S260 step. However, according to another embodiment, the controller 180 can perform the S240 step again after performing the S260 step.

According to the description above, since service information is obtained on the basis of seller information included in the electronic receipt, the user can easily obtain service information even when the service information is not included in the electronic receipt.

Figure 11:
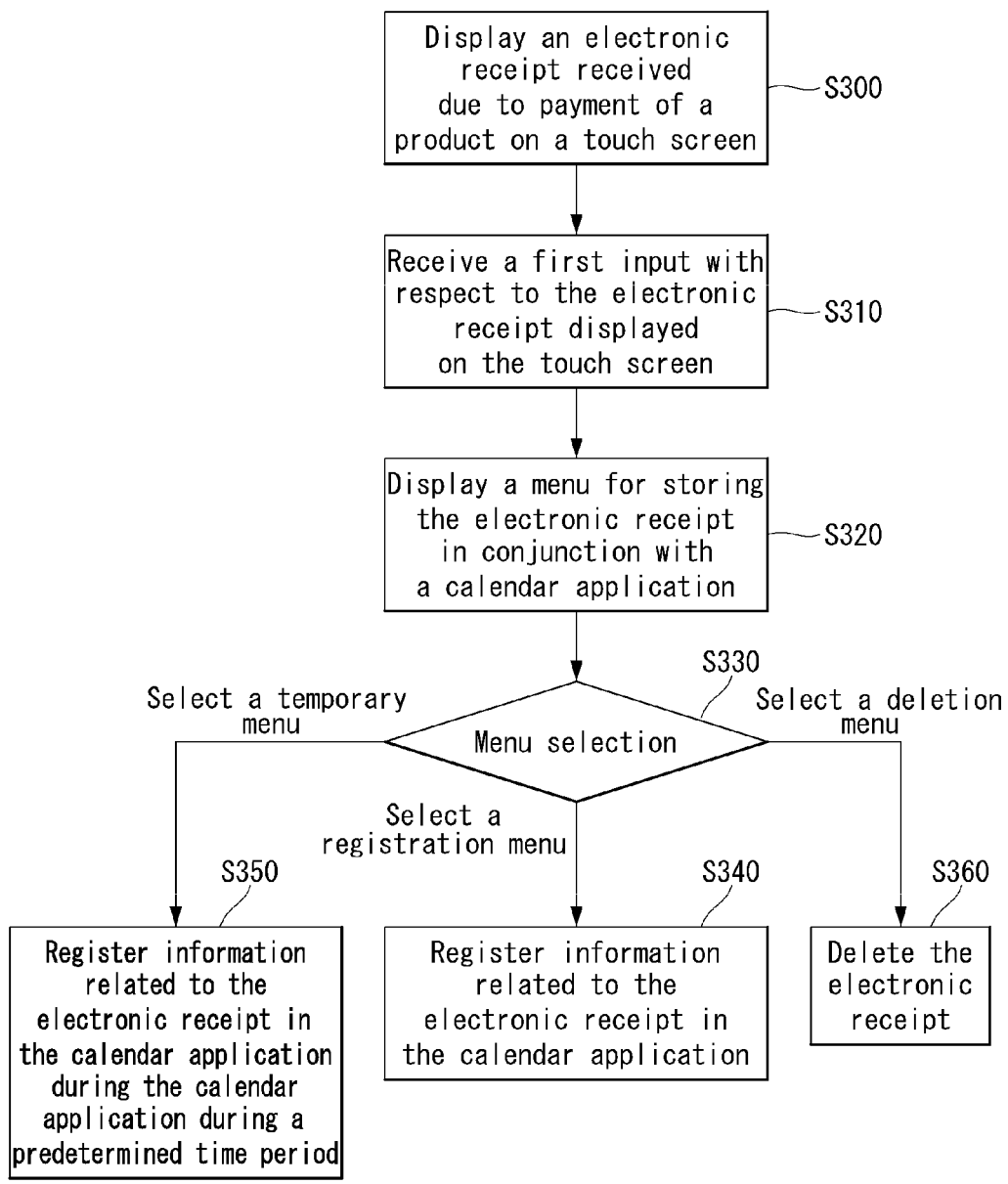
FIGS. 11 to 13 illustrate displaying a menu for storing an electronic receipt according to one embodiment of the present invention in conjunction with a calendar application.
Figure 12:
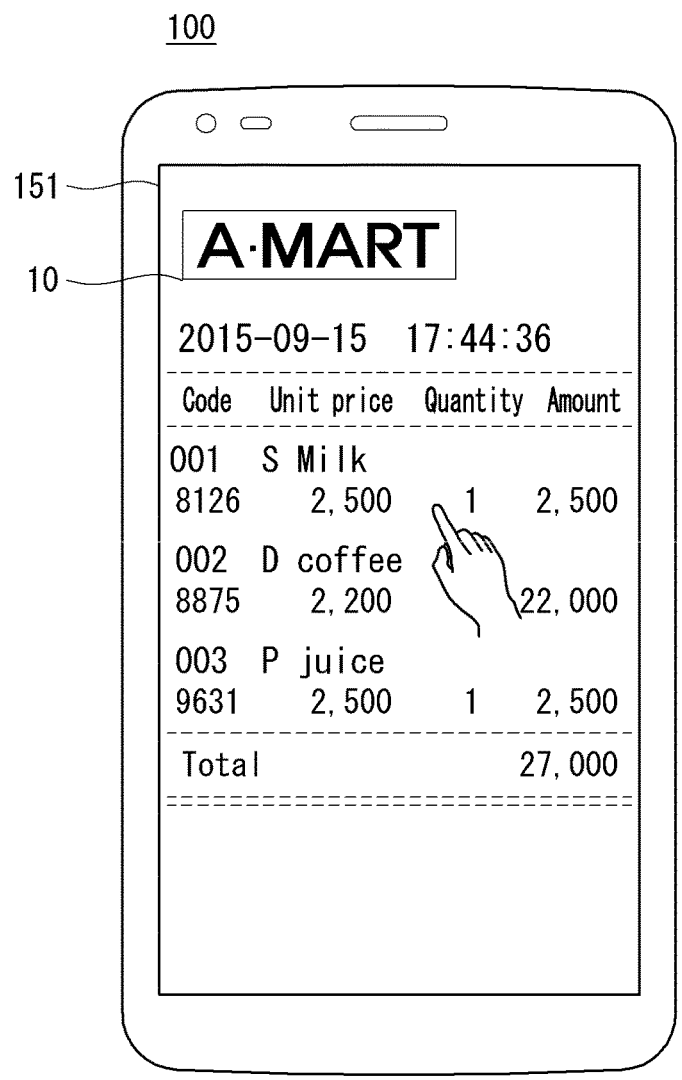
Figure 13:
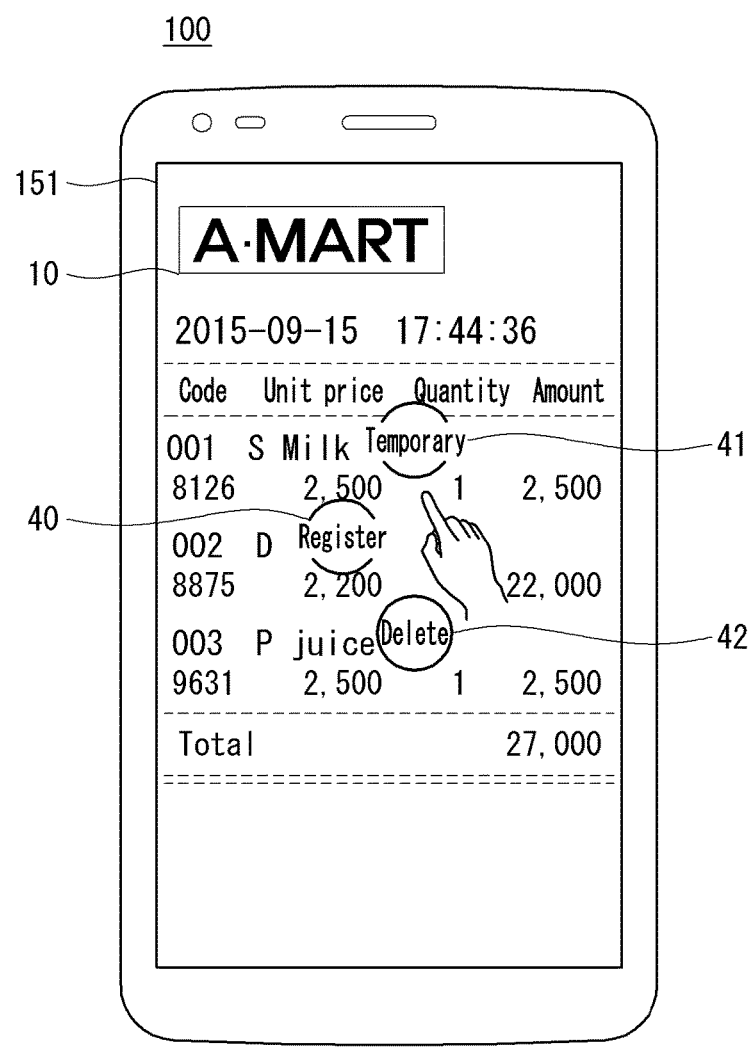

FIGS. 11 to 13 illustrate displaying a menu for storing an electronic receipt according to one embodiment of the present invention in conjunction with a calendar application.

With reference to FIG. 11, the controller 180 can display the electronic receipt 10 received due to payment of a product on the touch screen 151, S300. Since the aforementioned step is the same as described with respect to the S100 step of FIG. 2, detailed descriptions thereof will be omitted.

The controller 180 can receive a first input with respect to the electronic receipt 10 displayed on the touch screen 151, S310. According to one embodiment, the first input can be a long touch input lasting for more than a predetermined time period on one part of the electronic receipt 10 as shown in FIG. 12. However, this is only an example, and the present invention is not limited thereto. According to another embodiment, the first input can be implemented by various touch methods such as a short touch, long touch, drag touch, flick touch, pinch-in touch, pinch-out touch, swipe touch, and hovering touch; and a combination thereof.

Referring again to FIG. 11, the controller 180 can display a menu for storing the electronic receipt 10 in conjunction with the calendar application S320. FIG. 13 shows the case where the menu 40, 41, 42 is displayed on the touch screen 151. According to one embodiment, the menu 40, 41, 42 can be disposed in circular positions with respect to the touch position. However, this is only an example, and the position or type of the menu 40, 41, 42 can be configured differently according to the needs.

To select a menu 40, 41, 42, the user can apply a drag input toward the menu 40, 41, 42. The controller 180 can receive an input for selecting a particular menu from among the menus 40, 41, 42, S330.

In case the user selects a registration menu 40, the controller 180 can register information related to the electronic receipt 10 in the calendar application S340. The information related to the electronic receipt 10 can denote the electronic receipt 10, receipt specific information 30, or notification information. In this case, the receipt specific information 30 or notification information can be obtained or generated from the electronic receipt as described above.

In case the user executes the calendar application, the controller 180 can display a payment item 21 or notification item 22 on the execution screen 20 of the calendar application as shown in FIG. 6.

However, this is only an example, and in case the controller 180 receives the electronic receipt 10, the controller 180 can be configured to store information related to the electronic receipt 10 in conjunction with the calendar application even without the user's input.

Referring again to FIG. 11, in case the user selects a temporary menu 41, the controller 180 can register information related to the electronic receipt 10 in the calendar application for a predetermined time period S350. According to one embodiment, if the temporary menu 41 is selected, the controller 180 can display on the touch screen 151 a time configuration screen in which the user can configure the predetermined time.

In case the user executes the calendar application, the controller 180 can display a payment item 21 or notification item 22 during the predetermined time period on the execution screen 20 of the calendar application. For example, in case the predetermined time is 24 hours, the payment item 21 or notification item 22 can be displayed for 24 hours and deleted afterwards.

Referring again to FIG. 11, in case the user selects a deletion menu 42, the controller 180 can delete the electronic receipt 10, S360. According to one embodiment, the controller can be configured to store receipt specific information in the memory 170 even when the electronic receipt 10 is deleted. Or in case information related to the electronic receipt 10 is stored in conjunction with the calendar application, the controller can be configured to delete only the information associated with the calendar application.

According to the description above, by displaying a menu for storing an electronic receipt according to a predetermined input applied to the electronic receipt, the user can manage electronic receipts easily with a simple operation.

FIGS. 14 to 20*b* illustrate displaying information in a calendar application or utilizing receipt specific information according to one embodiment of the present invention.

Figure 14:
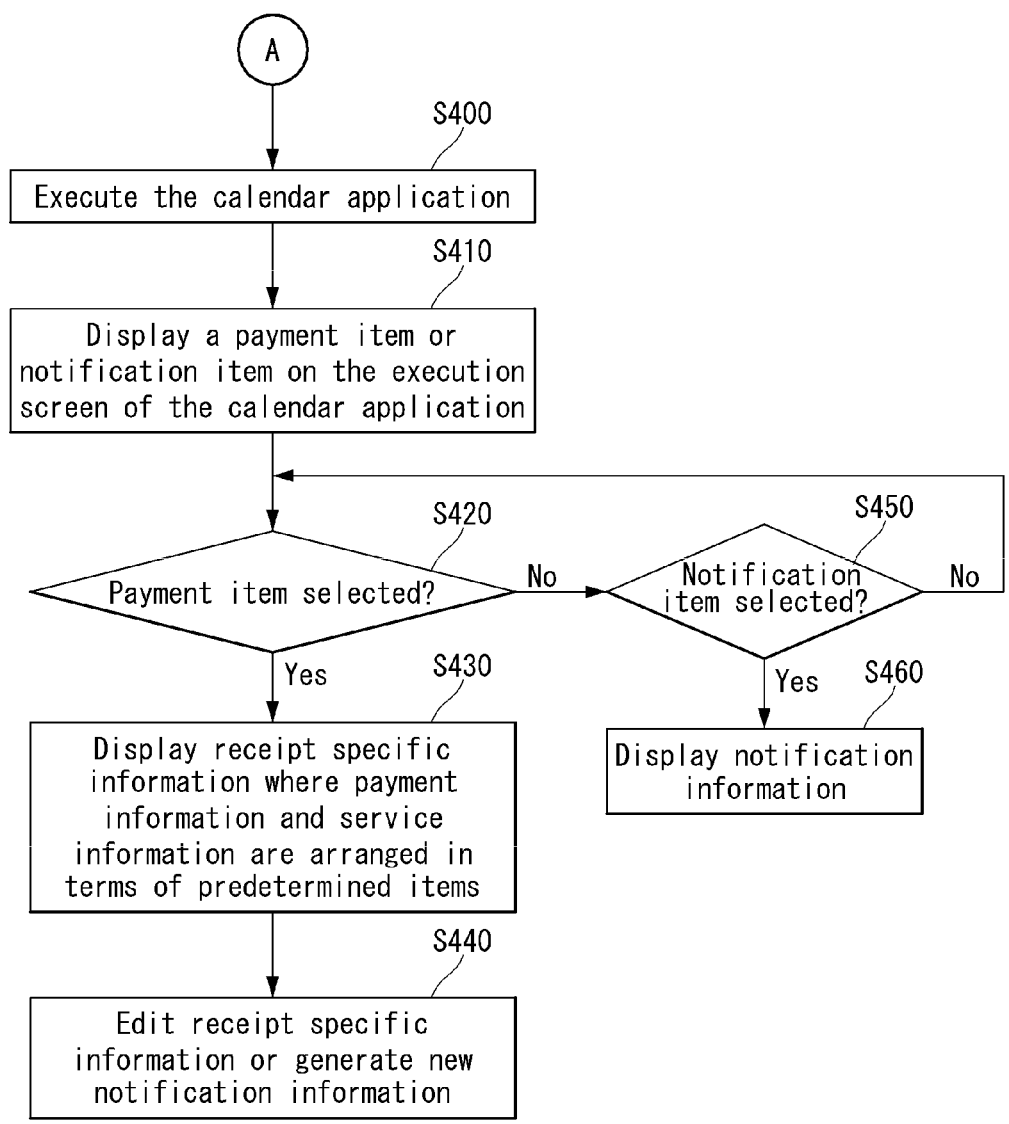
FIGS. 14 to 20b illustrate displaying information in a calendar application or utilizing receipt specific information according to one embodiment of the present invention.
Figure 15A:
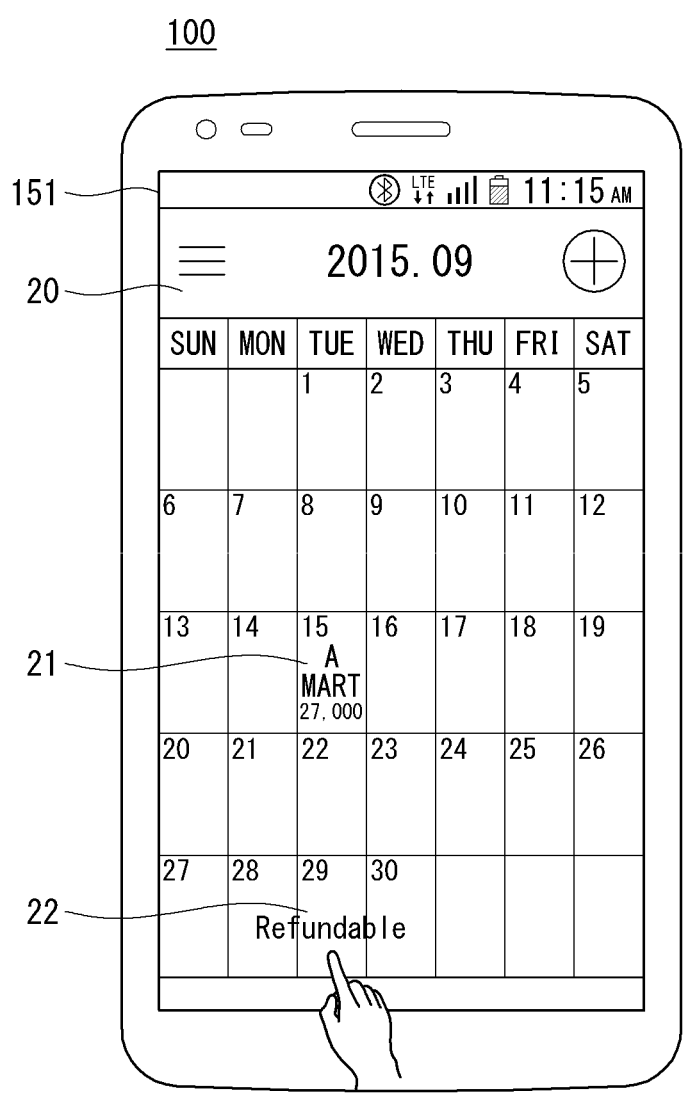

With reference to FIG. 14, if the user selects a calendar application, the controller 180 can display the execution screen 20 of the calendar application on the touch screen 151, S400. As shown in FIG. 15*a*, the controller 180 can display a payment item 21 indicating that payment of a product has been performed on the execution screen 20 according to payment time S410. Also, the controller 180 can display a notification item 22 indicating that notification information has been configured on the execution screen 20 according to generated notification time S410.

With reference to FIG. 15*a*, according to one embodiment, the payment item 21 can be displayed in terms of seller information and amount of payment. However, this is only an example, and the present invention is not limited thereto. As long as a processed payment can be indicated, the payment item 21 can be expressed in various ways by using a particular symbol, figure, or character.

With reference to FIG. 15*a*, according to one embodiment, the notification item 22 can be displayed in terms of contents of the configured notification information, such as refundable. However, this is only an example, and the present invention is not limited thereto. As long as configuration of the notification information can be indicated, the notification item 22 can be expressed in various ways by using a particular symbol, figure, or character.

Referring again to FIG. 14, the controller 180 can receive an input for selecting a payment item 21 from the execution screen 20 of the calendar application S420. In this case, the controller 180 can display receipt specific information 30 in which the payment information and the service information are arranged in terms of predetermined items on the touch screen 151, S430. Since displaying the receipt specific information 30 has been already described with reference to FIGS. 6 and 7, detailed descriptions thereof will be omitted.

The controller 180 can display on the receipt specific information 30 a user interface for editing receipt specific information 30 or entering a condition for generating notification information from the receipt specific information 30, S440. Displaying a user interface will be described again with reference to FIGS. 16*a* to 20*b*.

Figure 15B:
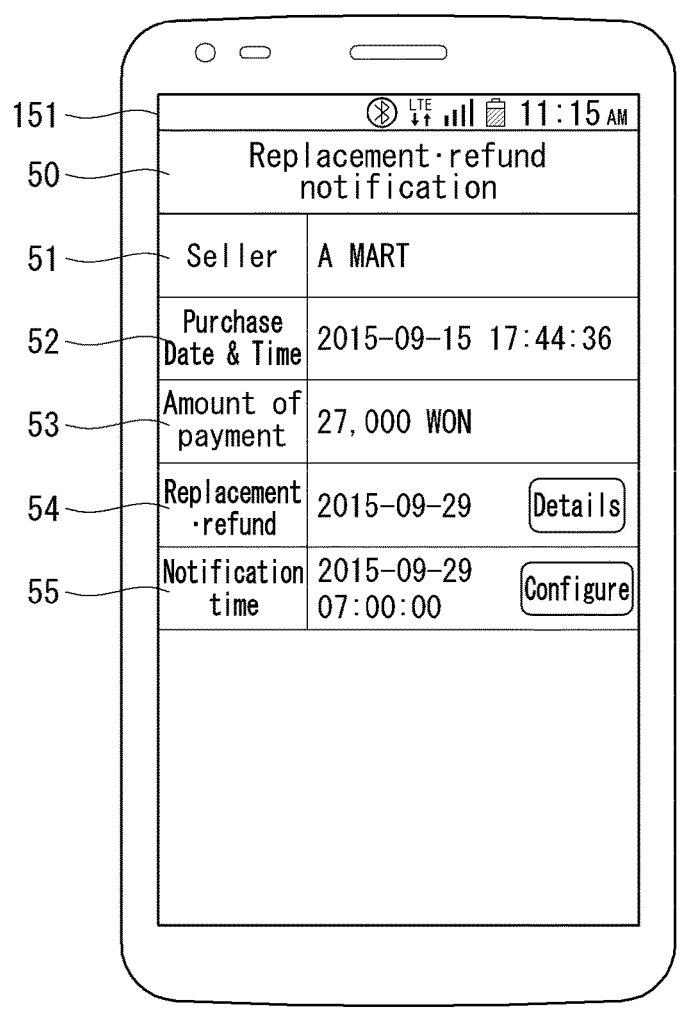

Referring again to FIG. 14, the controller 180 can receive an input for selecting a notification item 22 from the execution screen 20 of the calendar application S450. As shown in FIG. 15*a*, if the user selects the notification item 22, the controller 180 can display generated notification information on the touch screen 151, S460. FIG. 15*b* shows a case where notification information 50 configured with respect to refund • replacement information is displayed on the touch screen 151.

The notification information 50 can include items such as a seller name 51, payment time 52, amount of payment 53, refund • replacement information 54 and notification time 55. However, this is only an example, and the present invention is not limited thereto. The items included in the notification information 50 can be configured differently according to generated notification information.

Figure 16A:
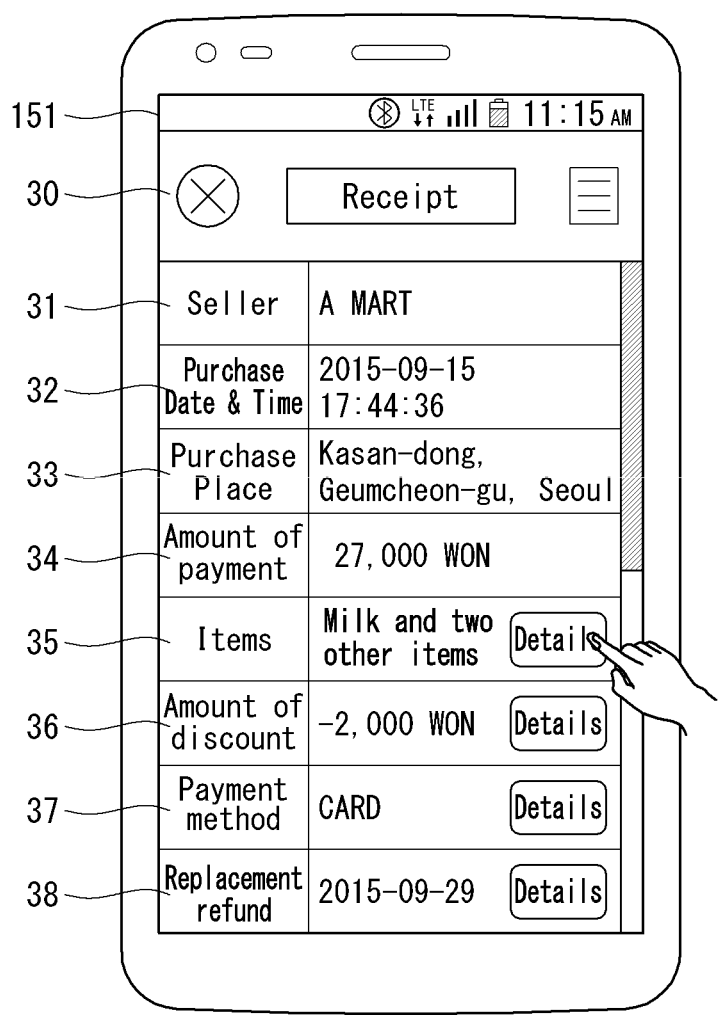
Figure 16B:
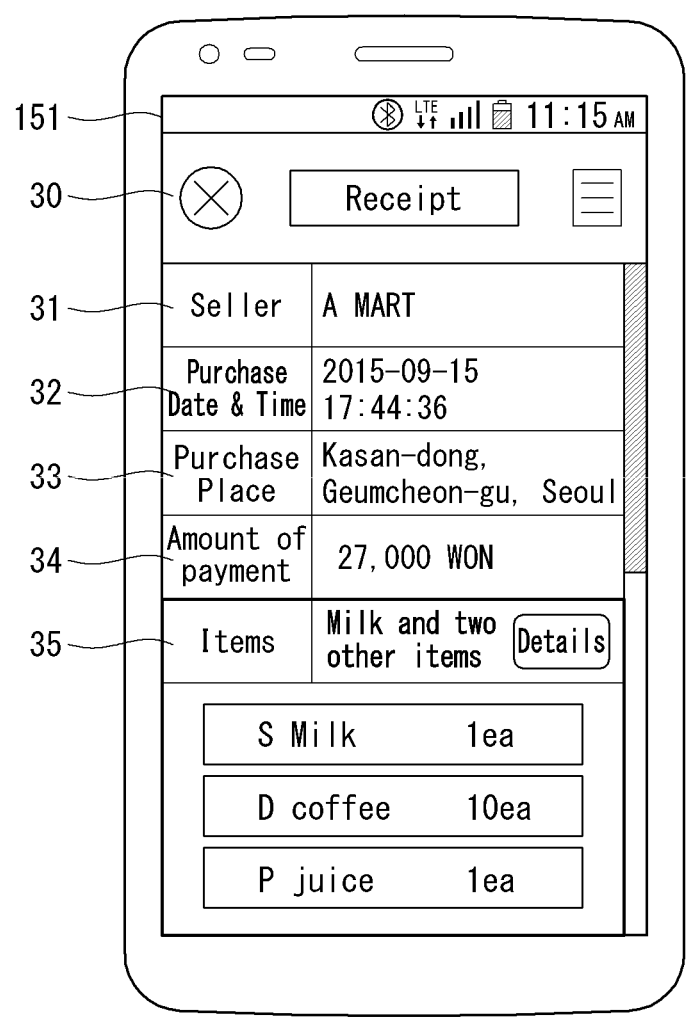

FIG. 16*a* shows a case where receipt specific information 30 is displayed on the touch screen 151. In case a detail button displayed along with the transaction items 35 is selected, the controller 180 can display a list of paid products as shown in FIG. 16*b*. If the user selects a particular product, the controller 180 can generate notification information according to a predetermined condition with respect to the selected product.

Or according to one embodiment, the controller 180 can display a screen for configuring notification information with respect to the selected product. The screen for configuring the notification information can include an interface through which notification contents and notification time can be configured with respect to service information such as refund, replacement, after-sales service, or warranty of a product.

According to one embodiment, the user can apply an input touching a particular product from among the list of paid products and dragging the particular product to the outside of the touch screen 151. Receiving the input, the controller 180 can delete the particular product from the receipt specific information 30. Accordingly, the controller 180 can modify the amount of payment 34.

If a detail button displaying along with amount of discount 36, payment method 37, or refund • replacement information 38 shown in FIG. 16*a* is selected, the controller 180 can display the contents corresponding to each item on the touch screen 151. In case a detail button displayed along with the refund • replacement information 38 is selected, the controller 180 can further display the screen for generating notification information related to the refund • replacement information.

Figure 17A:
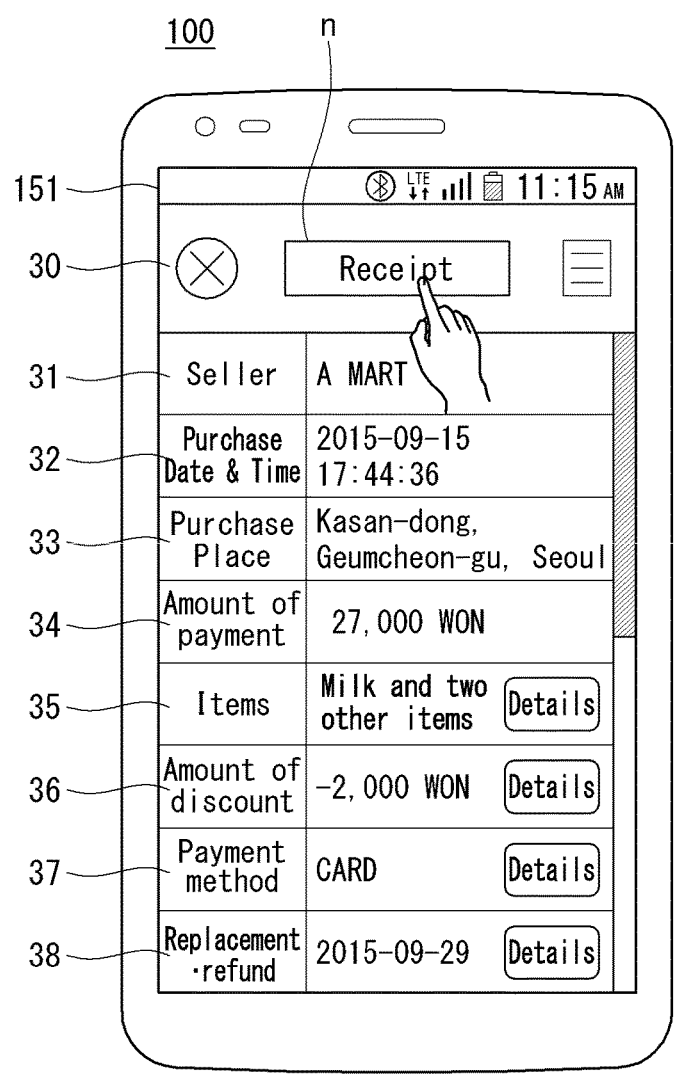
Figure 17B:
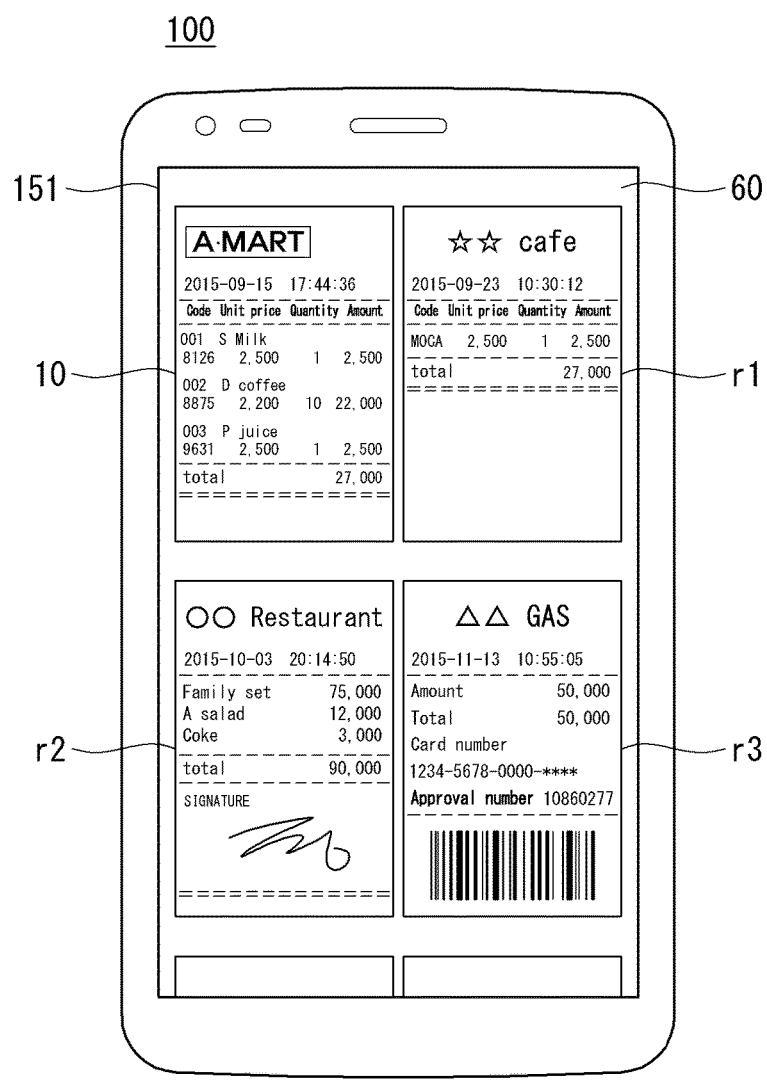

With reference to FIG. 17*a*, the user can select the area n in which the name of receipt specific information 30 is displayed. As shown in FIG. 17*b*, the controller 180 can display the screen 60 including electronic receipts 10, r1, r2, r3 stored in the memory 170 on the touch screen 151. According to one embodiment, the screen 60 can be an execution screen of an application which manages electronic receipts. Or according to another embodiment, the screen 60 can be an execution screen of a gallery application which manages images of electronic receipts.

According to one embodiment, the controller 180 can display an electronic receipt related to the receipt specific information 30 in the upper left part of the screen 60. However, this is only an example, and the present invention is not limited thereto; thus, the electronic receipt 10 can be displayed in another part of the screen depending on the needs.

FIG. 17*b* shows electronic receipts 10, r1, r2, r3 displayed on the screen 60 in the order of payment time according to one embodiment. The screen 60 can be scrolled up/down or left/right according to a flick touch input. Accordingly, other electronic receipts not displayed can be displayed on the touch screen 151. However, this is only an example, and the present invention is not limited thereto. According to another embodiment, the controller 180 can display an electronic receipt which has the same seller information as the electronic receipt 10 related to the receipt specific information 30.

Figure 18A:
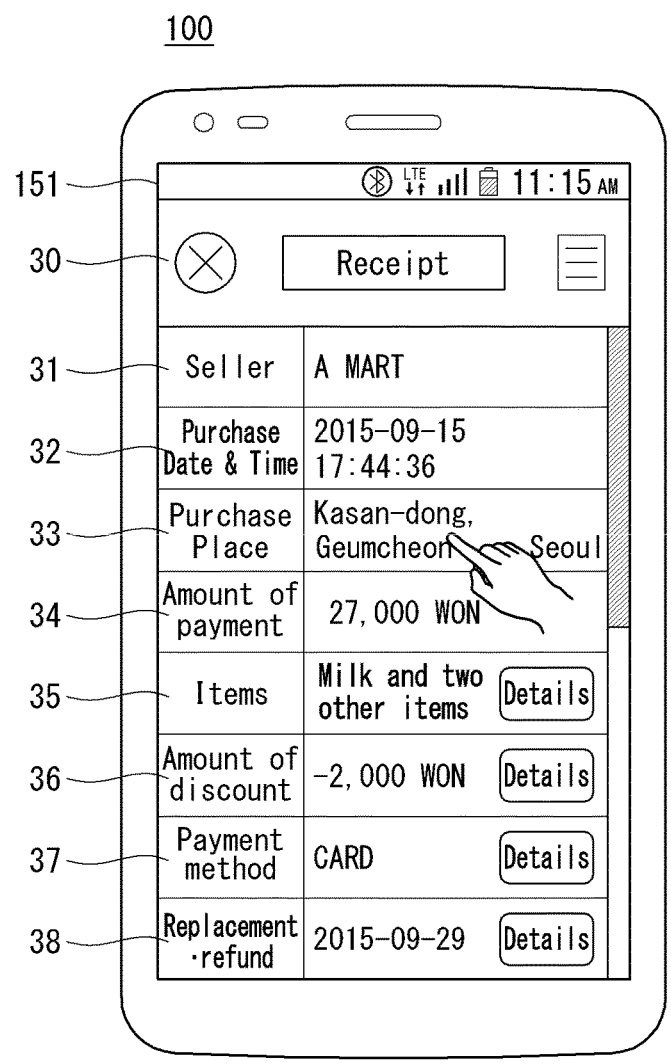

With reference to FIG. 18*a*, the user can select place of payment 33 among the items of the receipt specific information 30 displayed on the touch screen 151. Receiving an input selecting the place of payment 33, the controller 180 can display map information representing the place of payment on the touch screen 151, as shown in FIG. 18*b*.

The controller 180 can request and receive map information from the sales system 300 through the wireless communication unit 110. Or the controller 180 can search an external communication network for the map information through the wireless communication unit 110.

Figure 18B:
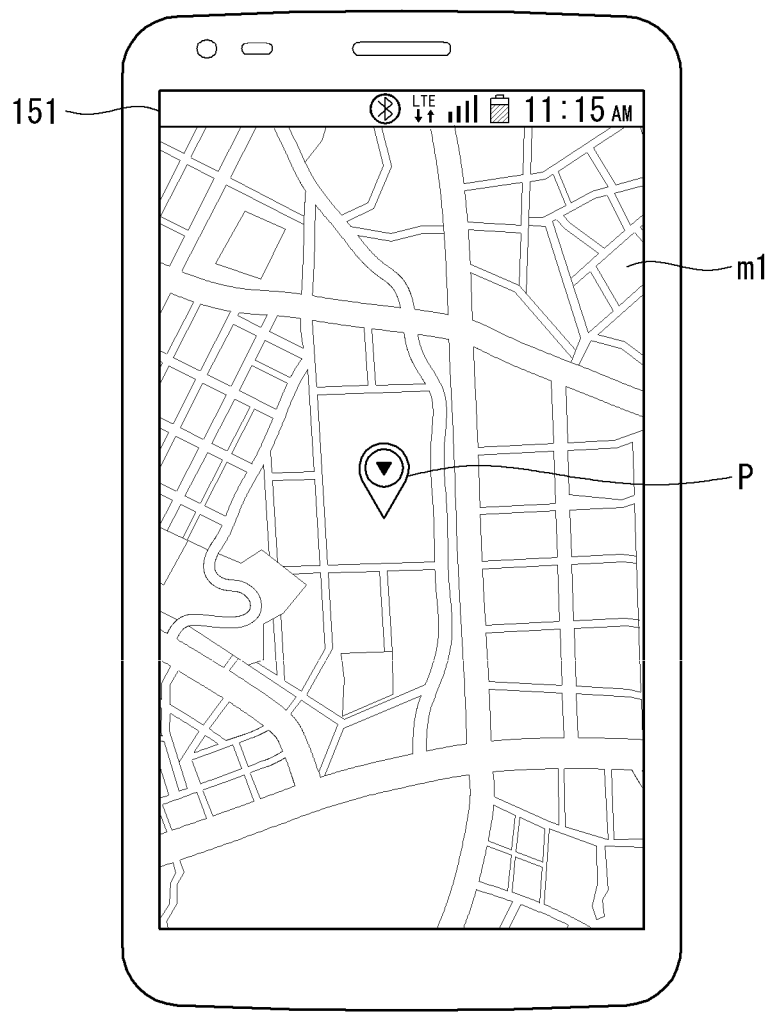

Descriptions related to the place of payment 33 as shown in FIGS. 18*a* and 18*b* can also be applied in the same way for a case where a seller name 31 is selected. The controller 180 can either request information related to the seller from the sales system 300 or search for the information related to the seller through an external communication network. For example, the controller 180 can display a homepage of the seller directly on the touch screen 151.

Figure 19A:
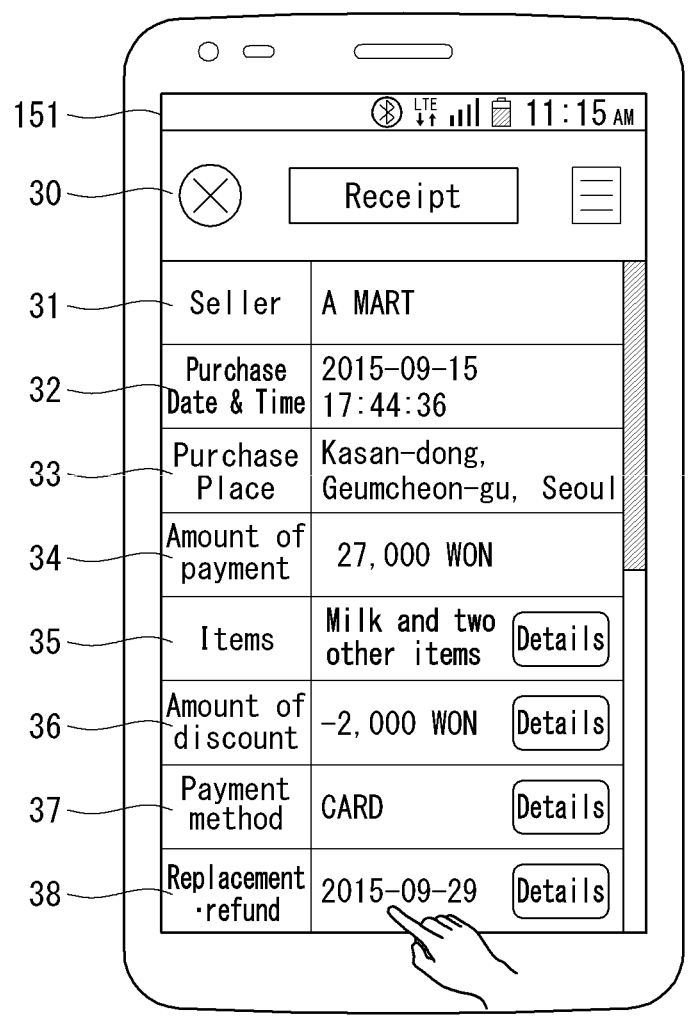
Figure 19B:
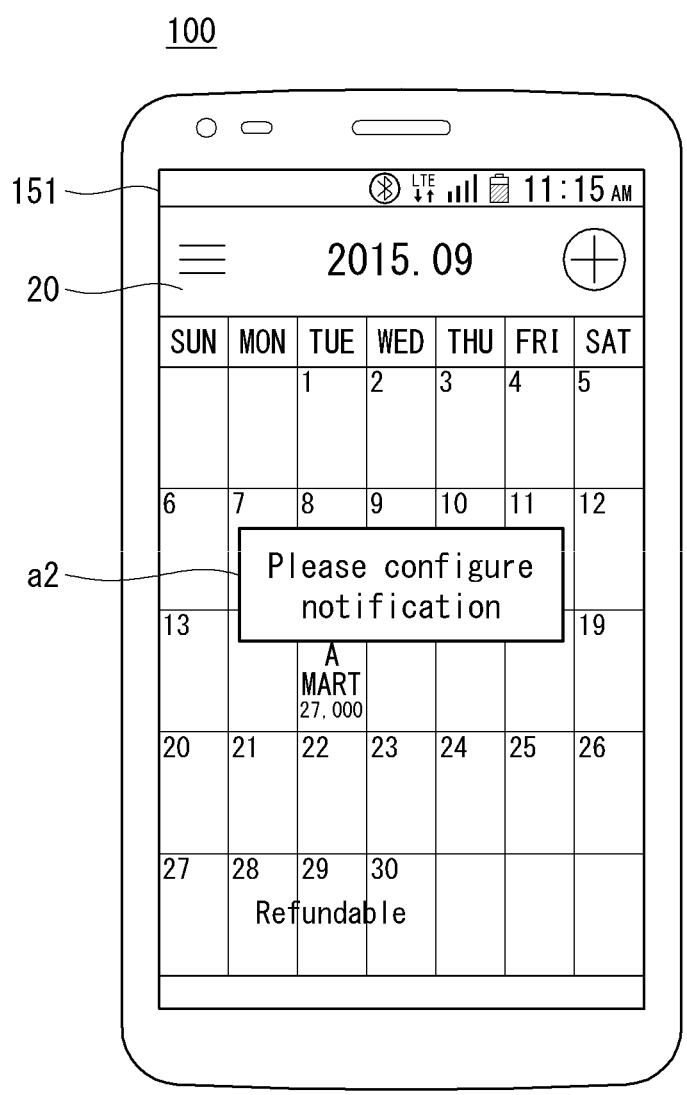

With reference to FIG. 19a, the user can select refund • replacement information 38 from among the items of the receipt specific information 30 displayed on the touch screen 151. Receiving an input selecting the refund • replacement information 38, the controller 180 can display an execution screen 20 of the calendar application on the touch screen 151 as shown in FIG. 19b. A notification item representing notification information related to refund can be displayed on the execution screen 20.

The controller 180 can display notification a2 on the touch screen 151, which states that notification information can be configured. The user can change notification time or contents of notification by selecting pre-configured notification information. Or the user can newly configure contents of notification and notification time by selecting a particular date displayed on the execution screen 20.

Figure 20A:
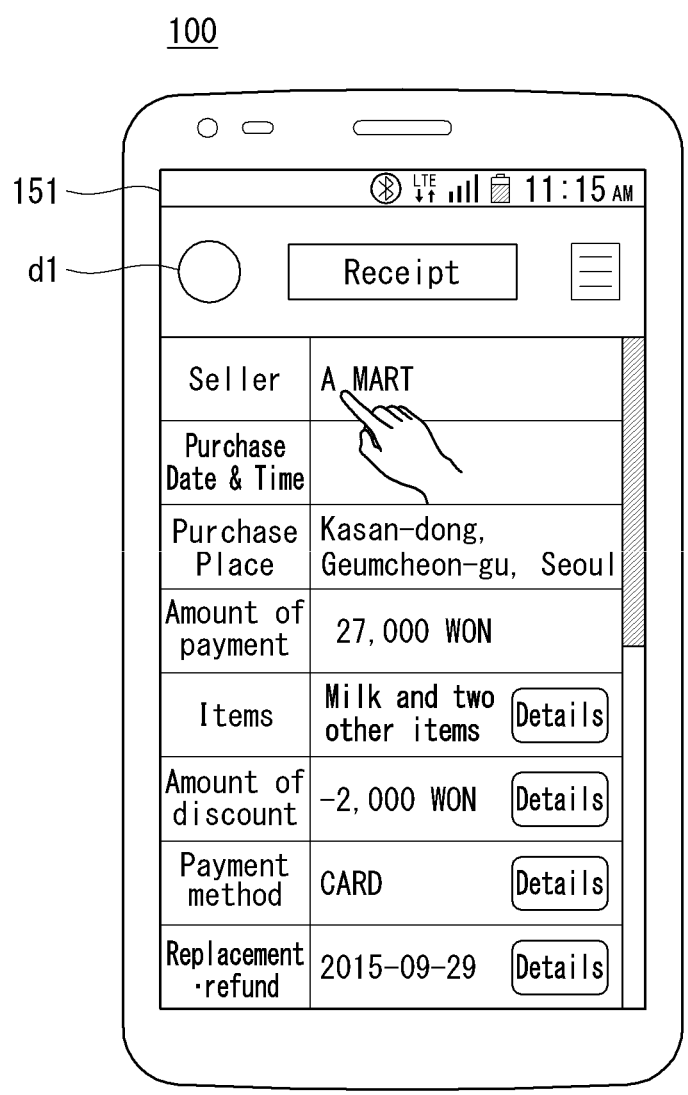
Figure 20B:
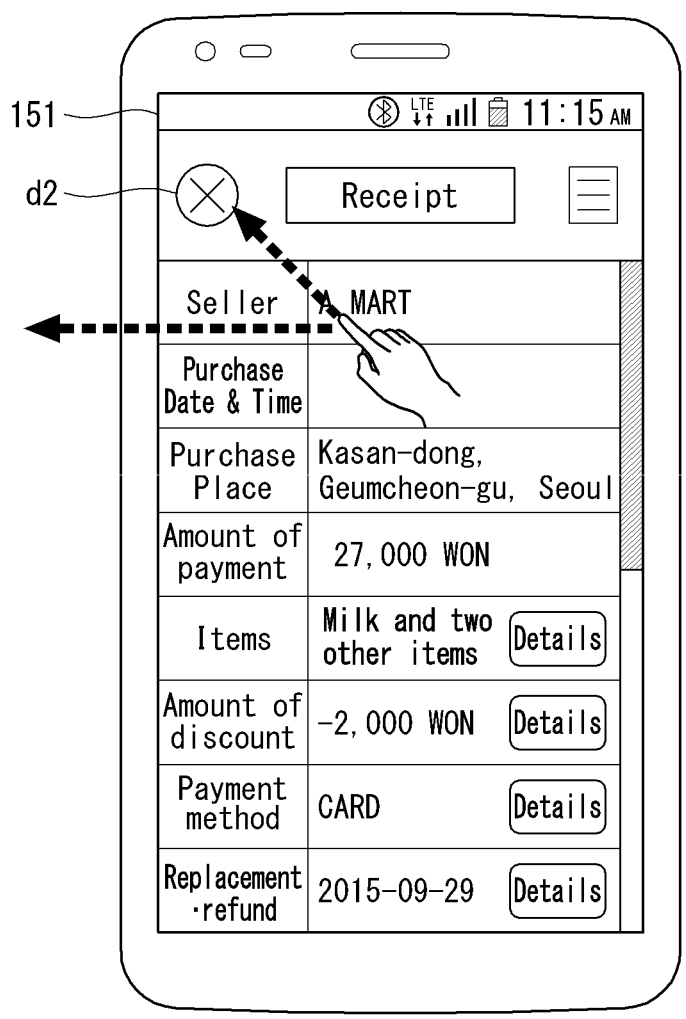

With reference to FIG. 20a, the user can apply a predetermined touch input to one part of the receipt specific information 30 to delete the receipt specific information 30 displayed on the touch screen 151. According to one example, as shown in FIG. 20b, the predetermined touch input can be an input touching the one part and dragging the part along a particular direction. In case the user drags the part outside the touch screen 151, the controller 180 can delete the receipt specific information 30.

The user can touch the one part and drag it to a deletion indicator d1. In this case, the controller 180 can activate d2 the deletion indicator d1 of the receipt specific information 30 as shown in FIG. 20b. However, this is only an example, and the deletion indicator can always be displayed as being activated. In case the user touches the one part and drags it to the deletion indicator d2, the controller 180 can delete an item corresponding to the touched part from the receipt specific information 30.

According to the description above, by displaying payment information or an item representing notification information in the calendar application on the basis of an electronic receipt, the user can easily recognize the information related to the electronic receipt from the execution screen of the calendar application. Also, since the receipt specific information is displayed when a payment item displayed on the execution screen of the calendar application is selected, the user can easily check the receipt specific information in conjunction with the calendar application.

Also, since a user interface for entering a condition for editing receipt specific information or generating notification information is provided, the user can utilize information related to the electronic receipt according as needed. Also, since generated notification information is displayed when a notification item displayed on the execution screen of the calendar application is selected, the user can easily check configured notification information in conjunction with the calendar application.

Figure 21:
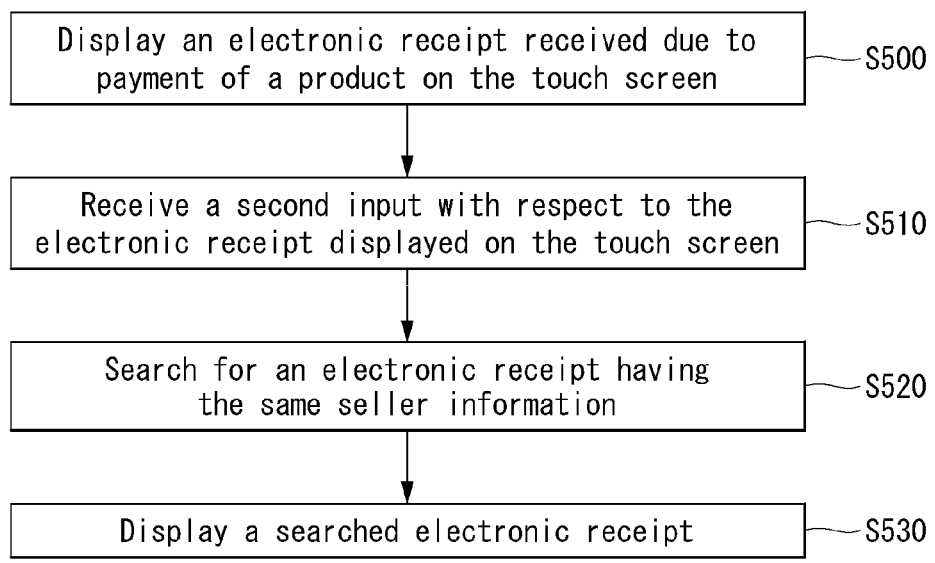
FIGS. 21 to 23 illustrate searching for an electronic receipt having the same seller information and displaying a searched electronic receipt according to one embodiment of the present invention.
Figure 22A:
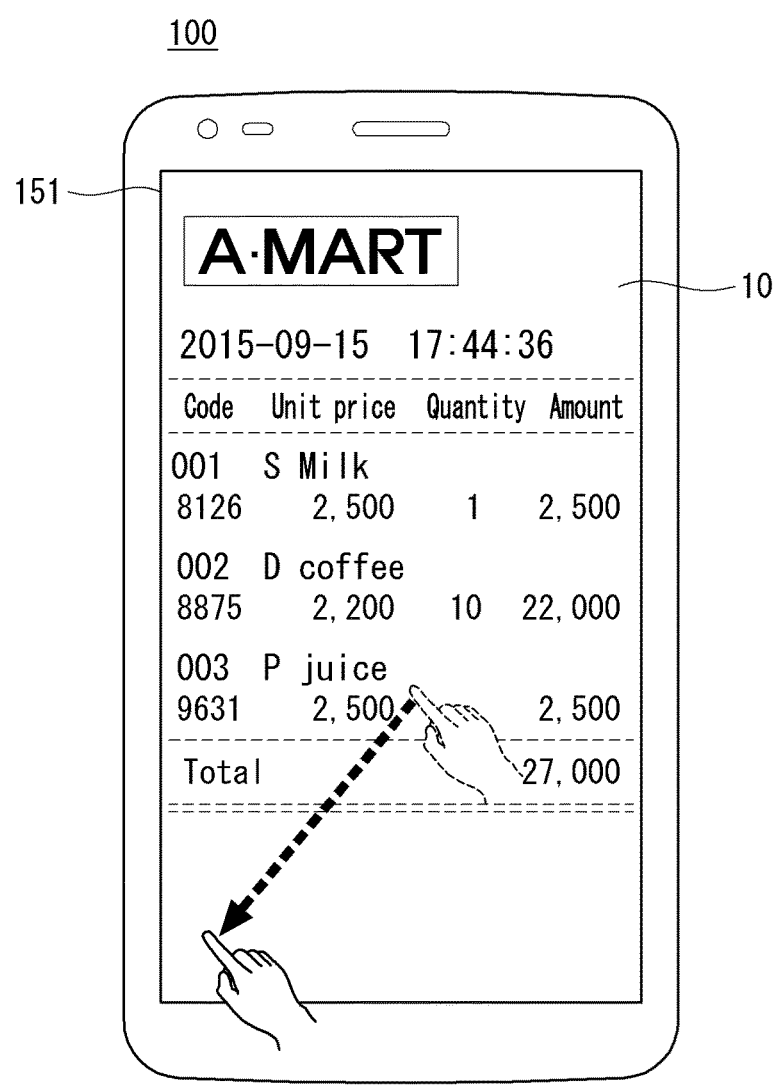
Figure 22B:
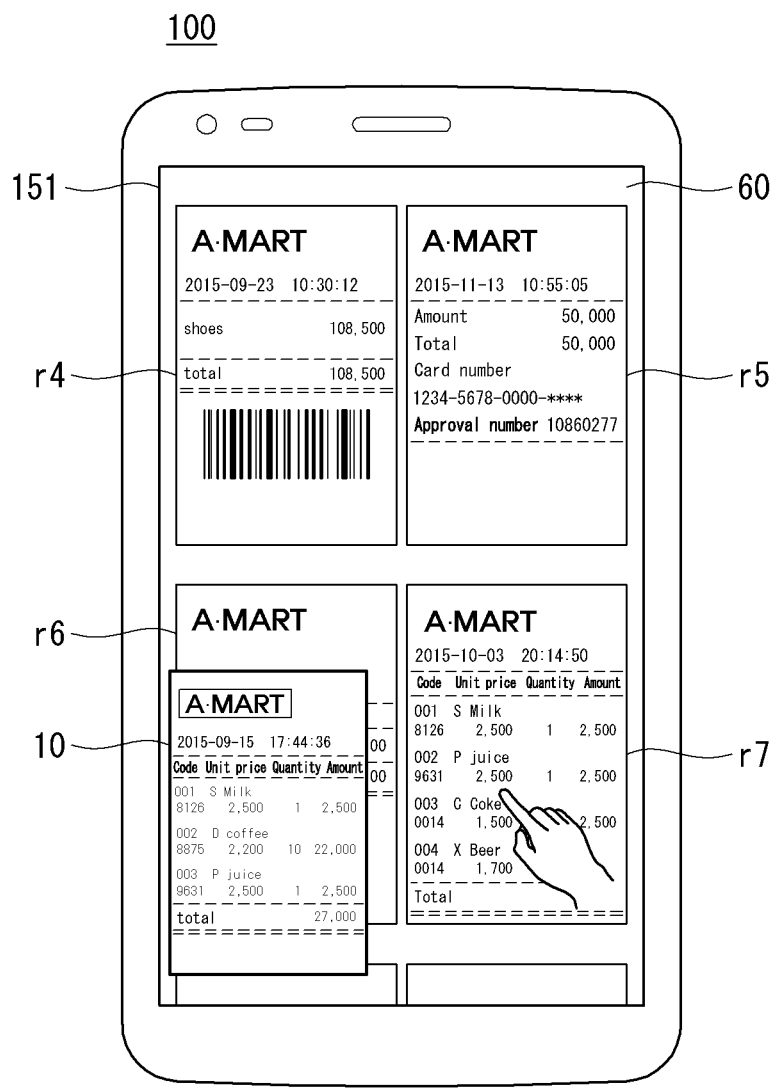
Figure 23:
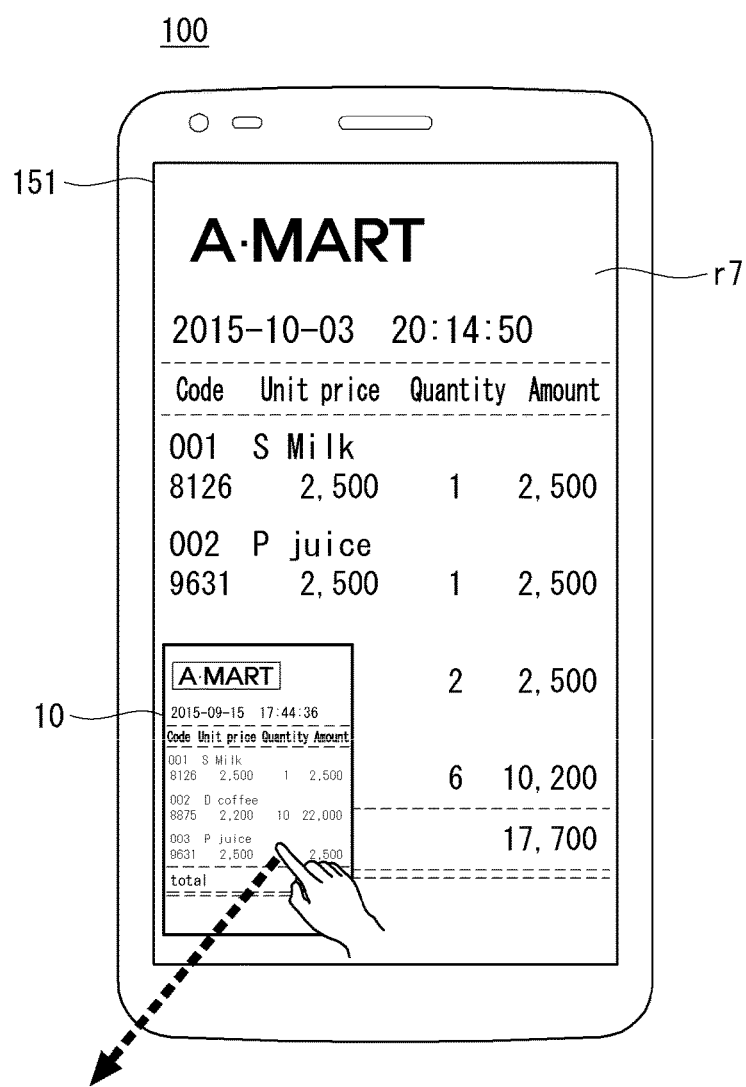

FIGS. 21 to 23 illustrate searching for an electronic receipt having the same seller information and displaying a searched electronic receipt according to one embodiment of the present invention.

With reference to FIG. 21, the controller 180 can display an electronic receipt 10 received due to payment of a product on a touch screen 151, S500. Since descriptions of this step are the same as given previously for the S100 step of FIG. 2, detailed descriptions will be omitted.

The controller 180 can receive a second input with respect to the electronic receipt 10 displayed on the touch screen 151, S510. According to one embodiment, as shown in FIG. 22a, the second input can be an input dragging a part in the central area of the electronic receipt 10 along a lower left direction. The controller 180 can decrease the area displaying the electronic receipt 10 according to the second input.

Referring again to FIG. 21, the controller 180 can search the memory 170 for an electronic receipt having the same seller information as the above-mentioned electronic receipt 10, S520. As shown in FIG. 22b, the controller 180 can display a screen including searched electronic receipts r4, r5, r6, r7 on the touch screen 151, S530. The controller 180 can display the electronic receipt 10 being overlaid on top of the screen 60.

The user can select an electronic receipt r7 for comparison. As shown in FIG. 23, if receiving an input selecting the electronic receipt r7, the controller 180 can magnify and display the selected electronic receipt r7. The user can compare the payment information of the diminished electronic receipt with that of the magnified electronic receipt r7.

If the user wants to delete the electronic receipt 10, the user can touch the electronic receipt 10 and drag it to the outside of the touch screen 151. The controller 180 can delete the electronic receipt 10 according to the dragging input. According to one embodiment, the controller 180 can be configured to retain receipt specific information 30 while deleting the corresponding electronic receipt 10. Or according to another embodiment, the controller 180 can be configured to delete the receipt specific information 30 together.

Though FIG. 22a assumes that the second input drags the electronic receipt 10 from the center thereof along a lower-left direction, the present invention is not limited to the aforementioned assumption. According to another embodiment, the dragging direction can be configured differently. For example, if a dragging input is applied along an upper-right direction, the electronic receipt 10 can be displayed being reduced in its size at the upper-right corner of the touch screen 151.

According to the description above, since electronic receipts having the same seller information are displayed according to a predetermined input applied to a currently displayed electronic receipt, the user can easily check the information related to electronic receipts.

Figure 24:
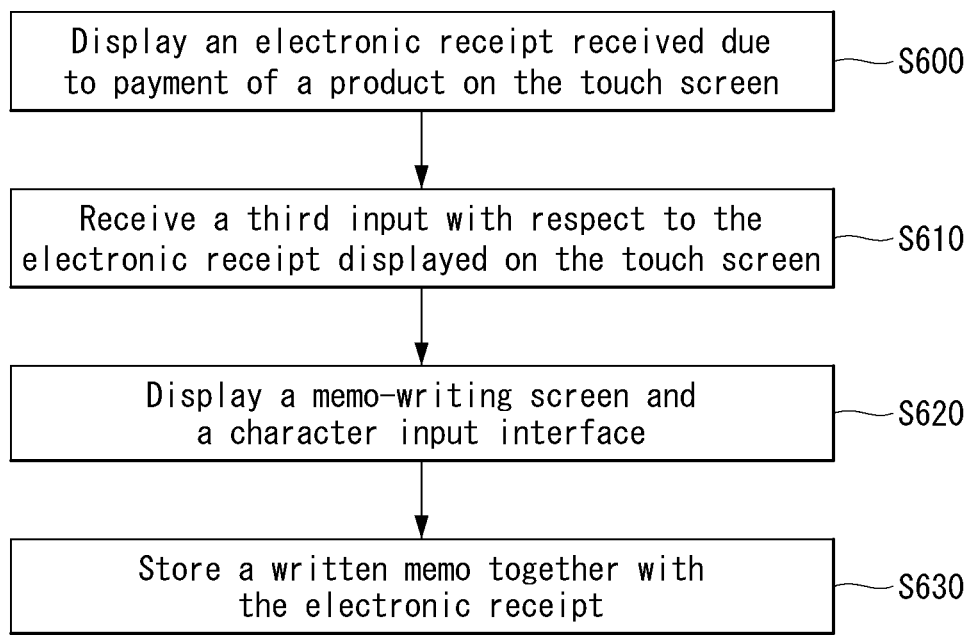
FIGS. 24 and 25b illustrate writing a memo in an electronic receipt according to one embodiment of the present invention.
Figure 25A:
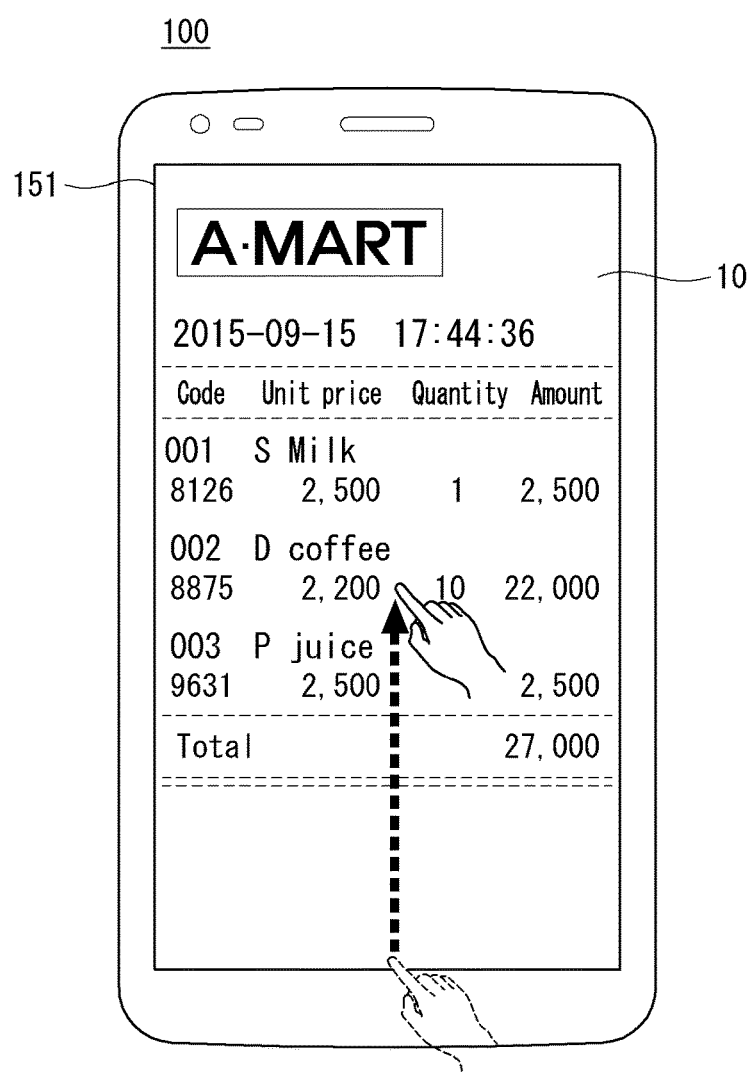
Figure 25B:
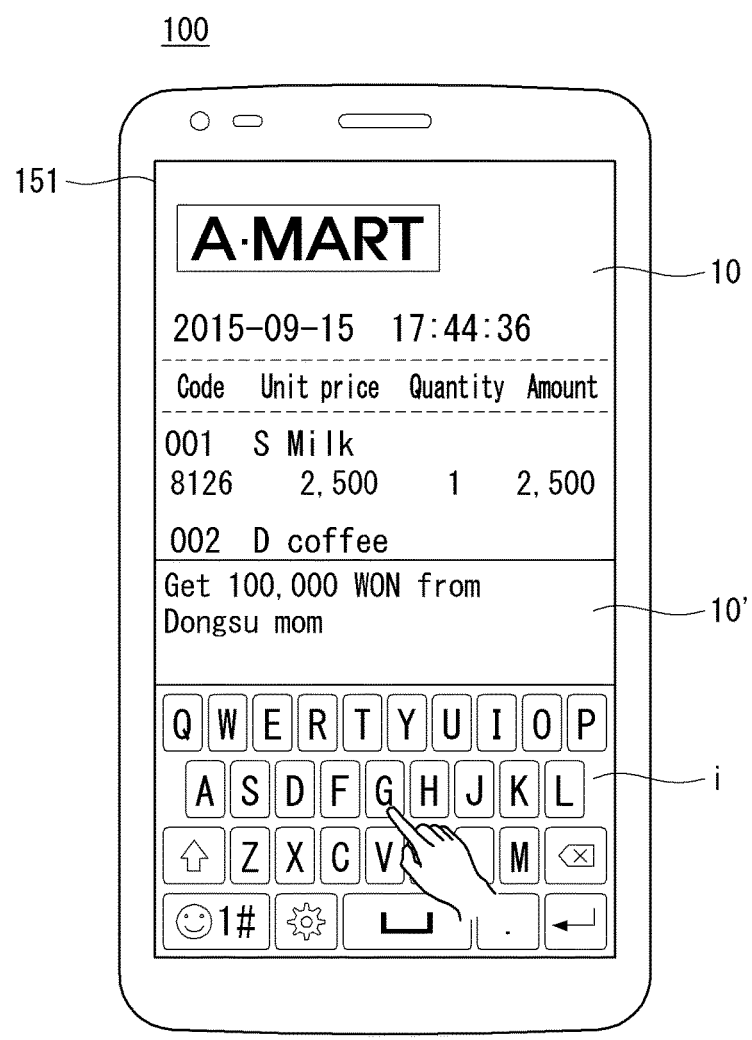

FIGS. 24 and 25b illustrate writing a memo in an electronic receipt according to one embodiment of the present invention.

With reference to FIG. 24, the controller 180 can display an electronic receipt received due to payment of a product on the touch screen 151, S600. Since descriptions of this step are the same as given previously for the S100 step of FIG. 2, detailed descriptions will be omitted.

The controller 180 can receive a third input with respect to the electronic receipt 10 displayed on the touch screen 151, S610. According to one embodiment, as shown in FIG. 25a, the third input can be a dragging input from the bottom of the electronic receipt 10 toward the upper part thereof. However, this is only an example, and the present invention is not limited thereto. According to another embodiment, the third input can be implemented by various touch methods such as a short touch, long touch, multi-touch, drag touch, flick touch, pinch-in touch, pinch-out touch, swipe touch, and hovering touch; and a combination thereof. In this case, too, the third input should be configured differently from the first and the second input. And this scheme of implementing inputs will be applied in the same way for other inputs to be described below.

If receiving the third input with respect to the electronic receipt 10, the controller 180 can display a user interface for writing a memo into the electronic receipt 10, S620. With reference to FIG. 25*b*, the controller 180 can display a screen for writing a memo 10' and a character input interface i. According to one embodiment, the controller 180 can display an effect of folding the electronic receipt 10 from its lower part according to the third input which drags the electronic receipt from its lower part toward the upper part thereof. In this case, the screen for writing a memo 10' can be regarded as the back of the electronic receipt 10.

Referring again to FIG. 24, the controller 180 can store a written memo together with the electronic receipt 10, S630. If the user writes a memo through the character input interface i, the controller 180 can store the written memo in the memory 170 in conjunction with the electronic receipt 10. According to one embodiment, the controller 180 can delete an indicator of the character input interface i and make an effect of unfolding the lower part of the electronic receipt 10.

Afterwards, if the user drags his or her finger from the lower part of the electronic receipt 10 to the upper part thereof, the controller 180 can display the stored memo at the top of the screen for writing a memo 10'. The user can modify the stored memo through the character input interface i.

Though FIGS. 24 to 25*b* illustrate writing a memo on the back of an electronic receipt 10 according to one embodiment, the present invention is not limited to the embodiment. According to another embodiment, if the third input is received, the controller 180 can activate a memo-writing function on the front of the electronic receipt 10. If the user writes a memo through the character input interface i or by using a stylus pen, the controller 180 can overlay the memo on the front of the electronic receipt 10.

According to one embodiment, the controller 180 can recognize the contents of a written memo. The controller 180 can generate notification information on the basis of the recognized contents. The present embodiment assumes that a memo is written so that the price of a particular product can be displayed in the form of notification information when payment of the particular product included in the electronic receipt 10 is performed again. In this case, if payment is performed again for the same product, the controller 180 can display the price of the same product on the touch screen 180.

Accordingly, since a memo can be written to an electronic receipt according to a predetermined input applied to the electronic receipt, the user can write a memo required with respect to the electronic receipt easily.

Figure 26:
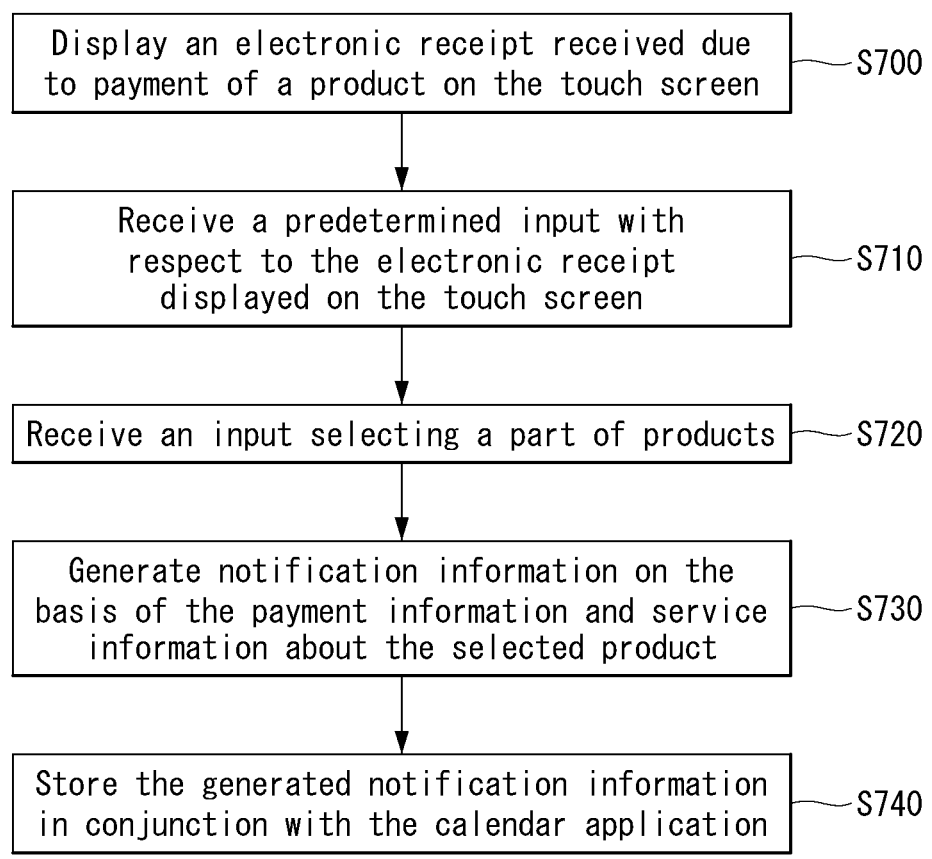
FIGS. 26 to 27b illustrate generating notification information with respect to a selected product according to one embodiment of the present invention.
Figure 27A:
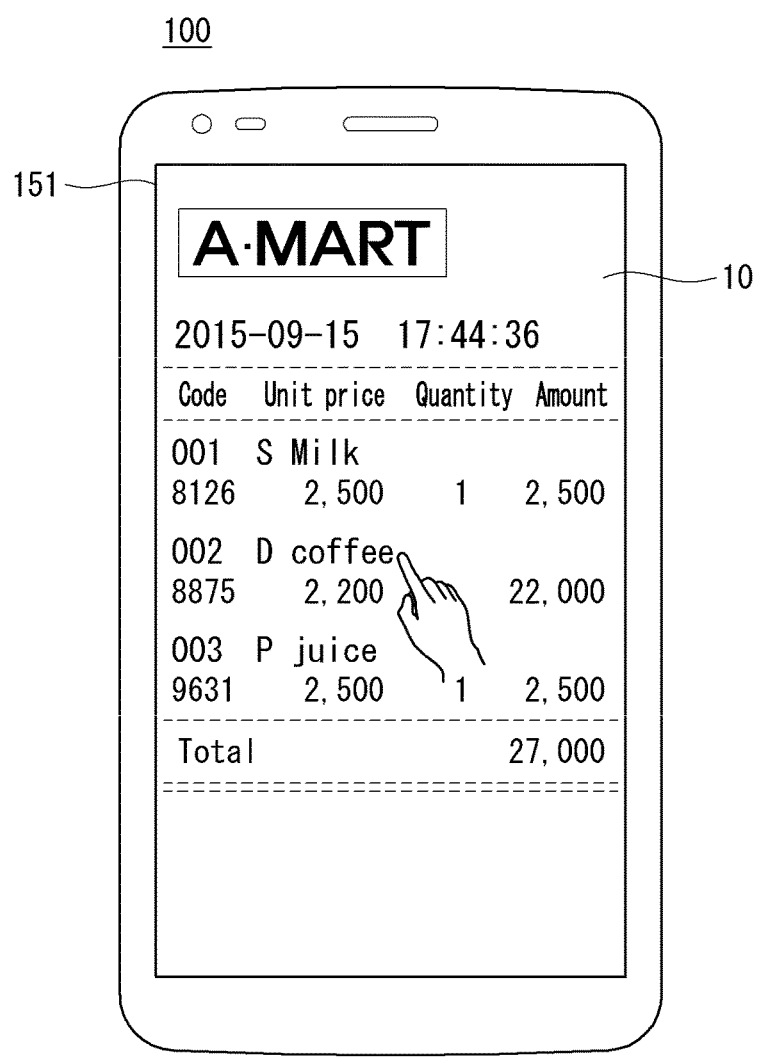
Figure 27B:
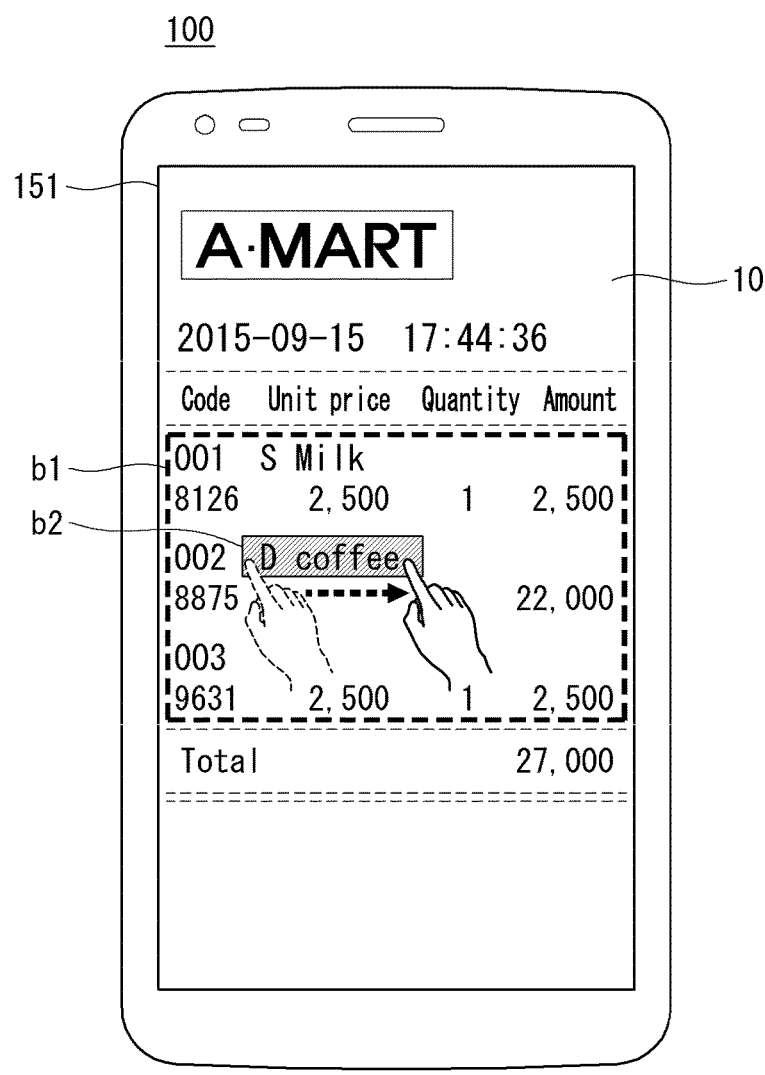

FIGS. 26 to 27*b* illustrate generating notification information with respect to a selected product according to one embodiment of the present invention.

With reference to FIG. 26, the controller 180 can display an electronic receipt 10 received according to payment of a product on the touch screen 151, S700. Since descriptions of this step are the same as given previously for the S100 step of FIG. 2, detailed descriptions will be omitted.

The controller 180 can receive a predetermined input with respect to the electronic receipt 10 displayed on the touch screen 151, S710. As shown in FIG. 26*a*, the predetermined input can be implemented by various touch methods such as a short touch, long touch, multi-touch, drag touch, flick touch, pinch-in touch, pinch-out touch, swipe touch, and hovering touch; and a combination thereof. In this case, too, the predetermined input should be configured differently from what are used for the first, the second, and the third input.

In case the electronic receipt 10 includes a plurality of products, the controller 180 can receive an input for selecting a part of the products S720. As shown in FIG. 27*b*, if the controller 170 receives the predetermined input, the controller 180 can display an indicator b1 for distinguishing the area in which a list of products displayed in the electronic receipt 10. The form of the indicator b1 is only an example, and the present invention is not limited thereto. The indicator b1 can be applied in various forms depending on the needs.

To select a product for which the user wants to generate notification information, the user can drag the area showing a product name from the product list. According to one embodiment, the controller 180 can perform highlighting b2 to distinguish a selected product. However, this is only an example, and various other methods such as change of text color can be used as long as they can be used to distinguish a selected product.

Referring again to FIG. 26, the controller 180 can generate notification information on the basis of the payment information and the service information with respect to a selected product S730. The controller 180 can store the generated notification information in conjunction with the calendar information S740. Except that the receipt specific information is stored, and the notification information is generated with respect to a selected product, descriptions given in the S110 and S120 step of FIG. 2 can be applied in the same way for the S740 step, detailed descriptions thereof will be omitted.

Accordingly, since information about part of the products included in an electronic receipt can be stored selectively, the user can easily store and manage required contents.

Figure 28:
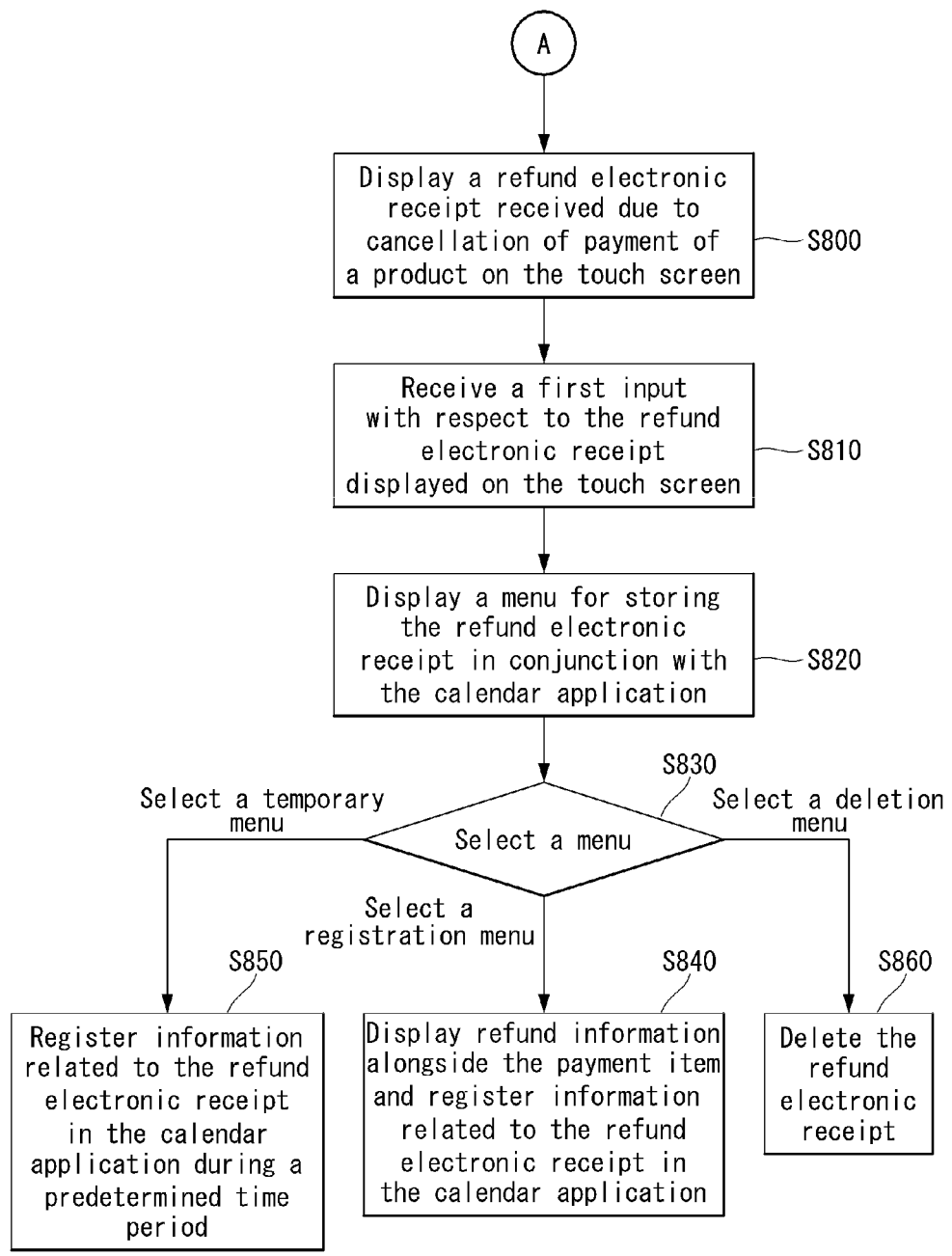
FIGS. 28 to 29b illustrate reflecting information due to payment cancellation in a calendar application according to one embodiment of the present invention.
Figure 29A:
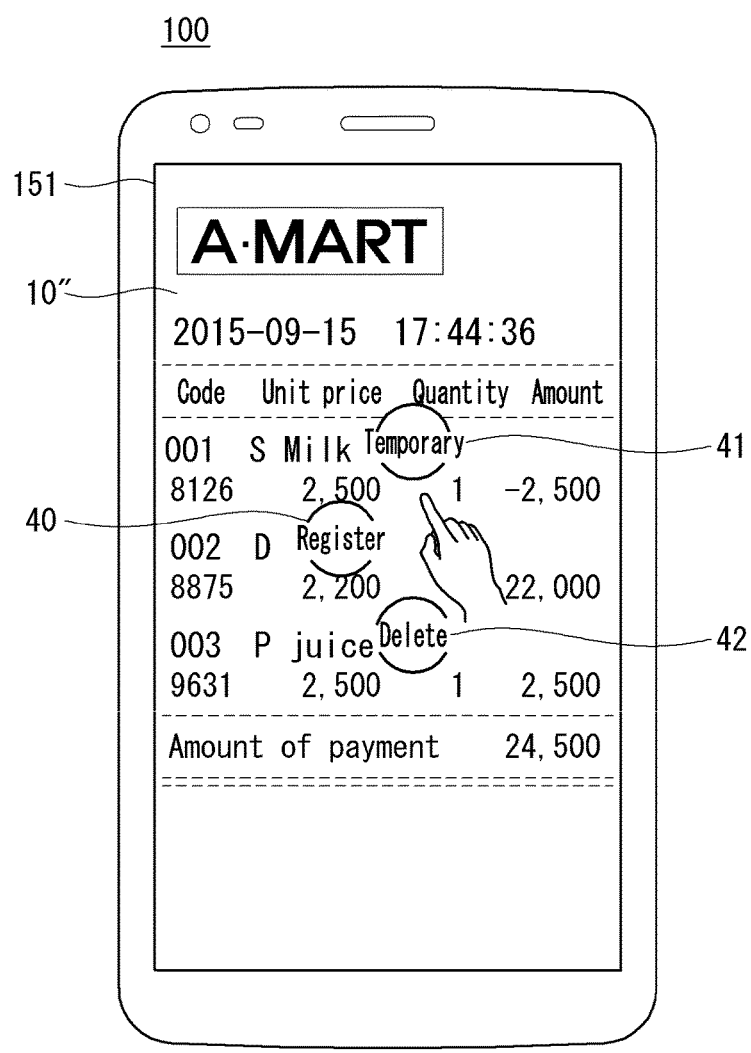
Figure 29B:
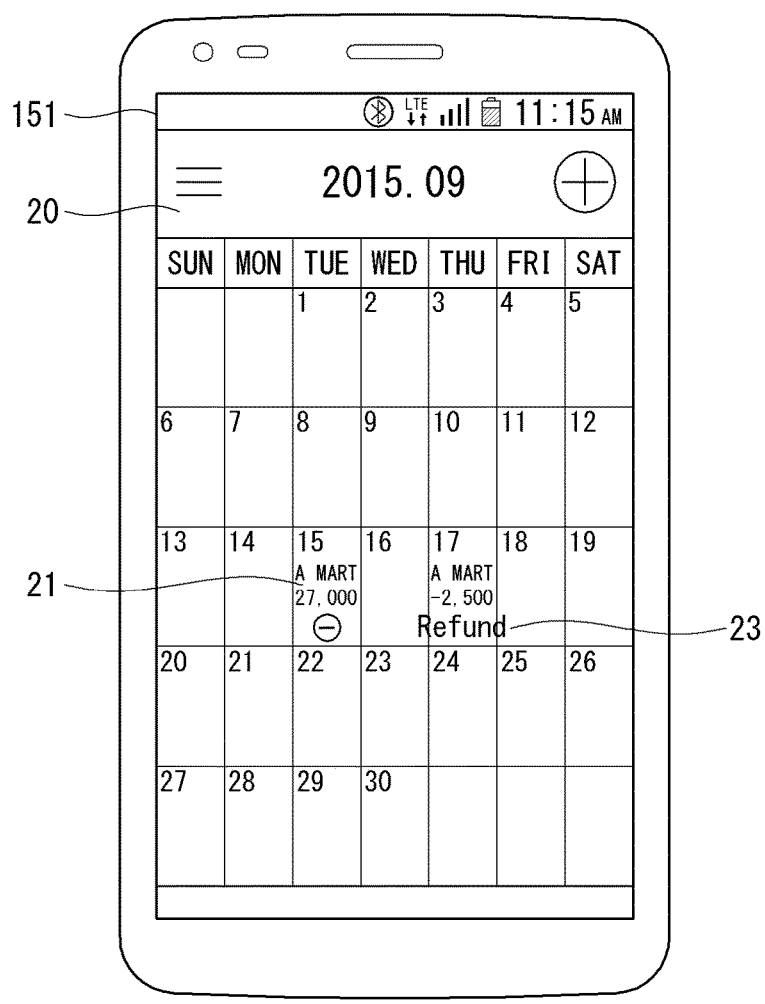

FIGS. 28 to 29*b* illustrate reflecting information due to payment cancellation in a calendar application according to one embodiment of the present invention.

With reference to FIG. 28, the controller 180 can display an electronic receipt received due to cancellation of payment of a product on the touch screen 151, S800. According to one embodiment, to cancel payment for a product, the user can put the mobile terminal 100 storing a mobile credit card to the payment terminal of the sales system 300. The sales system 300 can transmit a payment cancellation request for the product to the server of the corresponding card company 200 along with the information of the mobile credit card received through the payment terminal. The server of the card company 200 can perform an authentication process on the received information of the mobile credit card.

In case the transmitted mobile credit card is authenticated, the server of the card company 200 can transmit payment cancellation approval information with respect to the transmitted payment cancellation request to the sales system 300. In case payment cancellation is approved, the sales system 300 can transmit an electronic refund receipt due to cancellation of payment for a product to the mobile terminal 100. Also, the server of the card company 200 can transmit information about the details of the payment cancellation to the mobile terminal 100.

The controller 180 can receive the electronic refund receipt through the wireless communication unit 110. As shown in FIG. 29*a*, the controller 180 can display the electronic refund receipt 10" due to payment cancellation on the touch screen 151. According to one embodiment, the electronic refund receipt 10" can include cancelled payment information and service information due to the payment.

The controller 180 can receive a first input with respect to the electronic refund receipt 10" displayed on the touch screen 151, S810. As described with reference to FIG. 12, the first input can be a long touch input which touches one part of the electronic refund receipt 10" for more than a predetermined time period. However, this is only an example, and the present invention is not limited thereto. According to another embodiment, the first input can be implemented by various touch methods such as a short touch, long touch, multi-touch, drag touch, flick touch, pinch-in touch, pinch-out touch, swipe touch, and hovering touch; and a combination thereof.

Referring again to FIG. 28, the controller 180 can display a menu for storing the electronic refund receipt 10" in conjunction with the calendar application S820. FIG. 29a illustrates a case where the menu 40, 41, 42 is displayed on the touch screen 151. According to one embodiment, the menu 40, 41, 42 can be disposed in circular positions with respect to the touch position. However, this is only an example, and the position or type of the menu 40, 41, 42 can be configured differently depending on the needs.

To select each menu 40, 41, 42, the user can apply a dragging input toward the position of each menu 40, 41, 42. The controller 180 can receive an input for selecting a particular one among the menu 40, 41, 42, S830.

In case the user selects a registration menu 40, the controller 180 can display refund information alongside the payment item and register information related to the electronic refund receipt 10" for the calendar application S840. The information related to the electronic refund receipt 10" can indicate the receipt specific information 30 which reflects the electronic refund receipt 10" or payment cancellation. In this case, the receipt specific information 30 can be obtained from the electronic receipt 10 as described above.

In case the user executes the calendar application, the controller 180 can display refund information alongside the payment item 21 on the execution screen of the calendar application as shown in FIG. 29b. A minus sign which indicates that refund has been performed can be attached to the bottom of the original payment information of the payment item 21. However, this is only an example, and the present invention is not limited thereto. The refund information can be replaced with a different symbol or character depending on the needs.

Also, the controller 180 can display a refund item 23 which indicates that refund has been performed on the execution screen 20 of the calendar application. If the user selects the refund item 23, the controller 180 can display the receipt specific information 30 reflecting the payment cancellation on the touch screen 151. Or in case the refund item 23 is selected, the controller 180 can display the electronic refund receipt 10" on the touch screen 151.

However, this is only an example, and in case the electronic refund receipt 10" is received, the controller 180 can be configured to store information related to the electronic refund receipt 10" in conjunction with the calendar application even without the user input received.

Referring again to FIG. 28, in case the user selects a temporary menu 41, the controller 180 can register information related to the electronic refund receipt 10" for the calendar application for a predetermined time period S850. According to one embodiment, if the temporary menu 41 is selected, the controller 180 can display a time configuration screen through which the user can configure the predetermined time period on the touch screen 151.

In case the user executes the calendar application, the controller 180 can display the payment item 21 or refund item 23 on the execution screen 20 of the calendar application for the predetermined time period. For example, in case the predetermined time is 24 hours, the payment item 21 or refund item 23 can be deleted after being displayed for 24 hours.

Referring again to FIG. 28, in case the user selects a deletion menu 42, the controller 180 can delete the electronic refund receipt 10", S860. According to one embodiment, the controller 180 can be configured to store receipt specific information reflecting payment cancellation in the memory 170 even when the electronic refund receipt 10" is deleted. Or in case the information related to the electronic refund receipt 10" is stored in conjunction with the calendar application, the controller 180 can be configured to delete only the information related to the calendar application.

According to the method above, since the information due to payment cancellation is reflected in the calendar application, the user can easily check the information due to payment cancellation.

FIGS. 30 to 34b illustrate storing a warranty for a product in conjunction with an electronic receipt according to one embodiment of the present invention.

Figure 30:
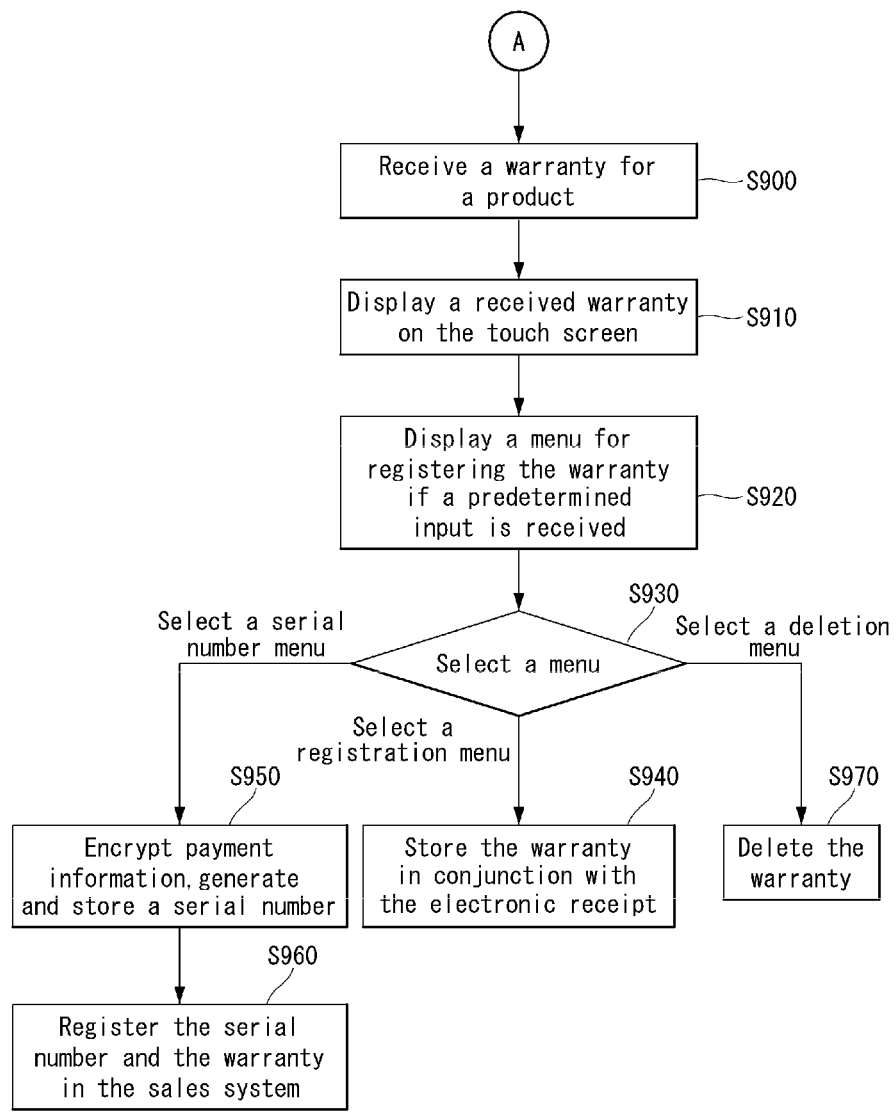
FIGS. 30 to 34b illustrate storing a warranty for a product in conjunction with an electronic receipt according to one embodiment of the present invention.

With reference to FIG. 30, the controller 180 can receive a warranty for the product through the wireless communication unit at the time of payment S900. According to one embodiment, the controller 180 can store a received warranty in conjunction with the electronic receipt 70 due to payment for the corresponding product.

Figure 31A:
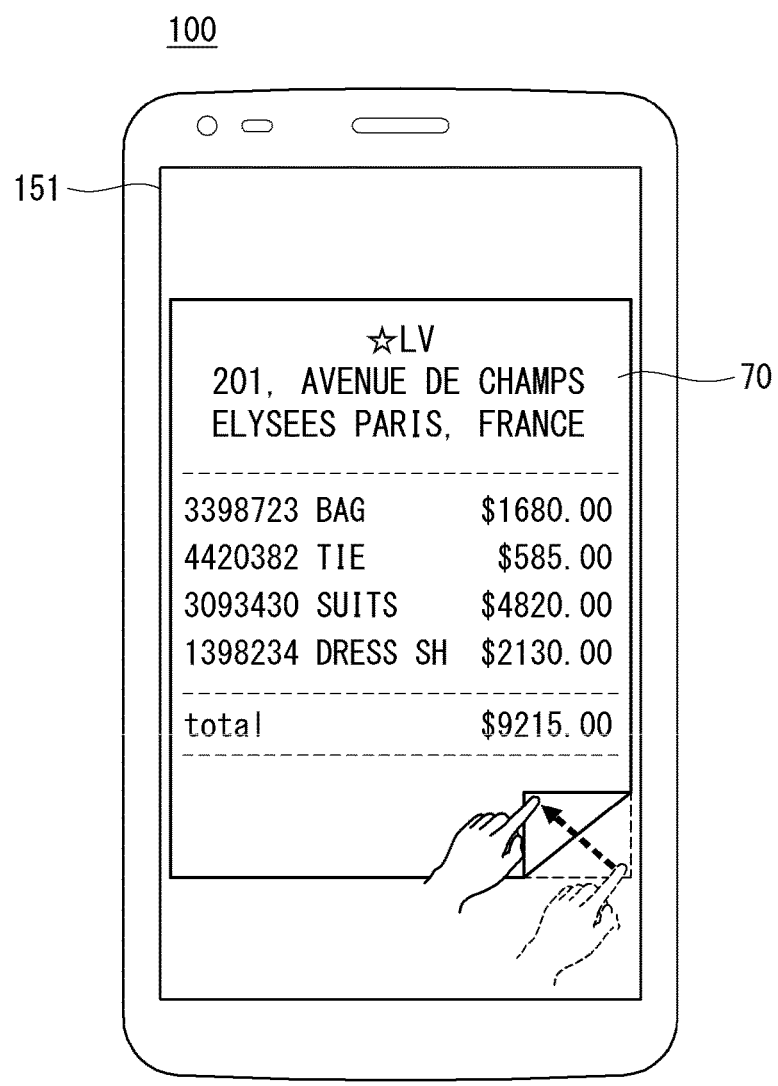

The controller 180 can display the received warranty on the touch screen 151, S910. FIG. 31a shows a case where the electronic receipt 70 due to payment for the product is displayed on the touch screen 151. According to one embodiment, the user can touch and drag the corner of the electronic receipt 70. According to the user's dragging input, the controller 180 can realize the effect of turning over the electronic receipt 70 being folded from the corner thereof.

Figure 31B:
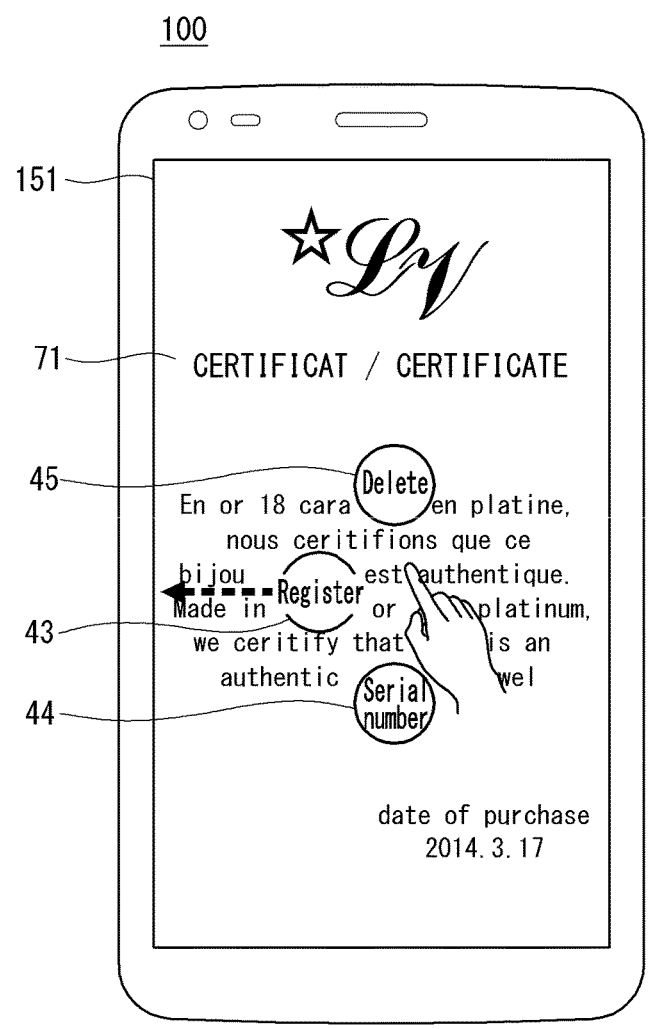

If the effect of turning over the receipt is completed, the controller 180 can display a warranty 71 for the paid product as shown in FIG. 31b. In other words, the warranty 71 can be understood as being displayed on the back of the electronic receipt 70. However, this is only an example, and the warranty 71 can configured to be displayed when a predetermined input for the electronic receipt 70 is received.

Referring again to FIG. 30, the controller 180 can display a menu for registering the warranty 71 if a predetermined input for the warranty 71 displayed on the touch screen 151 is received S910. The predetermined input can be implemented by various touch methods such as a short touch, long touch, multi-touch, drag touch, flick touch, pinch-in touch, pinch-out touch, swipe touch, and hovering touch; and a combination thereof.

FIG. 31b illustrates a case where the menu 43, 44, 45 is displayed on the touch screen 151. According to one embodiment, the menu 43, 44, 45 can be disposed in circular positions around a touch position. However, this is only an example, and the position or type of the menu 43, 44, 45 can be configured differently depending on the needs.

To select each menu 43, 44, 45, the user can apply a dragging input toward the position of each menu 43, 44, 45. The controller can receive an input selecting a particular one from among the menus 43, 44, 45, S930.

Figure 32:
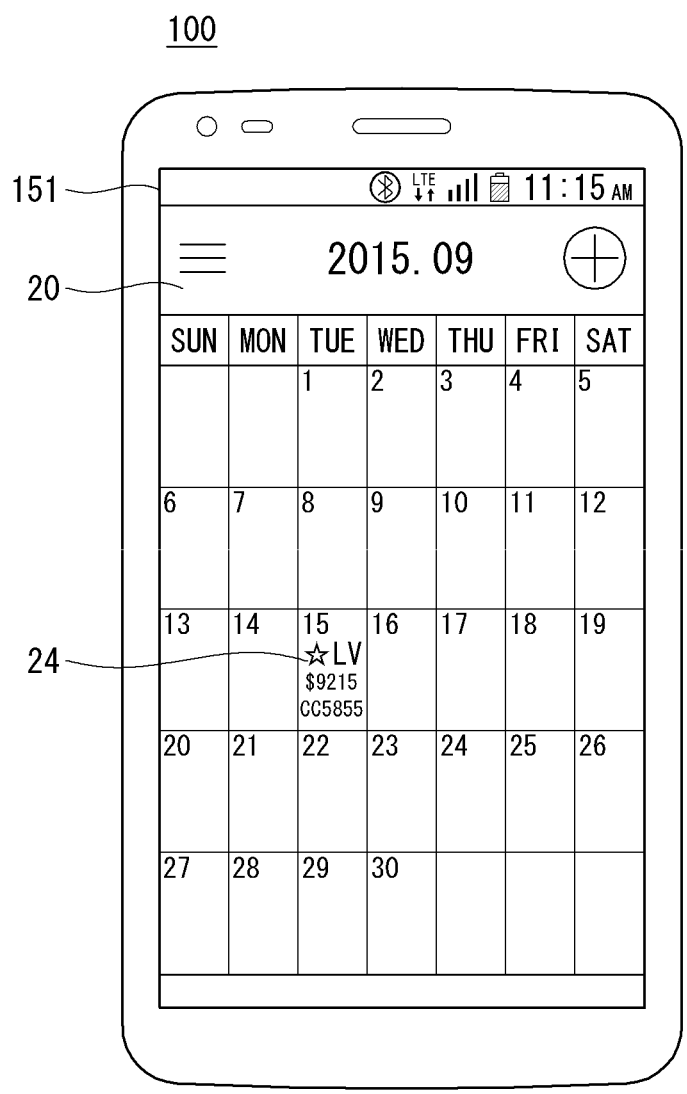

In case the user selects the registration menu 43, the controller 180 can store the warranty 71 in conjunction with the electronic receipt S940. Also, the controller 180 can store the information related to the warranty 71 in conjunction with the calendar application. As shown in FIG. 32, in case the user executes the calendar application, the controller 180 can display a warranty item 24 which indicates that the warranty has been received on the execution screen 20 of the calendar application. The form of the warranty item 24 shown in FIG. 32 is only an example, and the present invention is not limited thereto. The warranty item 24 can be displayed by a different symbol or character depending on the needs. In case the user selects the warranty item 24, the controller 180 can display the warranty 71 on the touch screen 151.

However, this is only an example, and in case the warranty 71 is received, the controller 180 can be configured to store the information related to the warranty 71 in conjunction with the calendar application even without the user's input.

Figure 33:
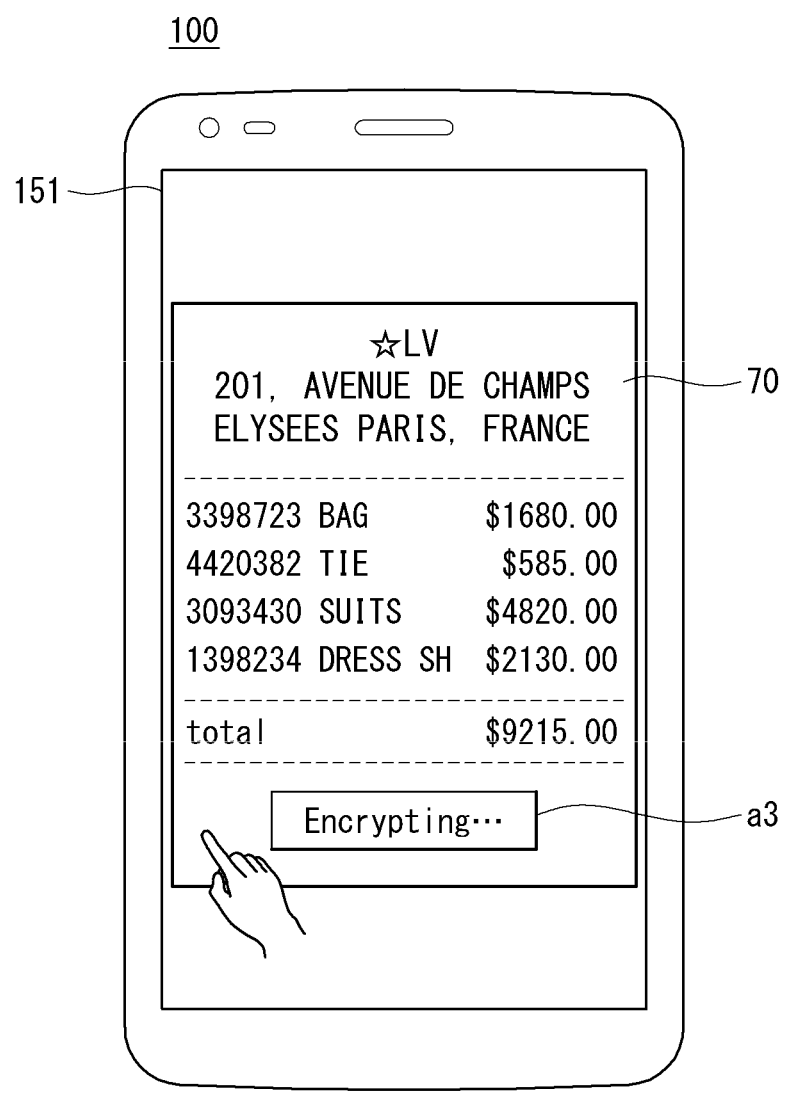

Referring again to FIG. 30, in case the user selects a serial number menu 44, the controller 180 can generate a serial number by encrypting payment information and store the generated serial number in the memory 170, S950. As shown in FIG. 33, the user can apply a predetermined input to the electronic receipt 70 to generate a serial number with which to replace the warranty. The predetermined input can be implemented by various touch methods such as a short touch, long touch, multi-touch, drag touch, flick touch, pinch-in touch, pinch-out touch, swipe touch, and hovering touch; and a combination thereof. According to one embodiment, the controller 180 can encrypt payment information and display notification a3 which notifies that a serial number is being generated.

Referring again to FIG. 30, the controller 180 can transmit the generated serial number and warranty 71 to the sales system 300 for registration S960. To perform the registration, the controller 180 can display an interface for user authentication such as a fingerprint authentication interface.

Figure 34A:
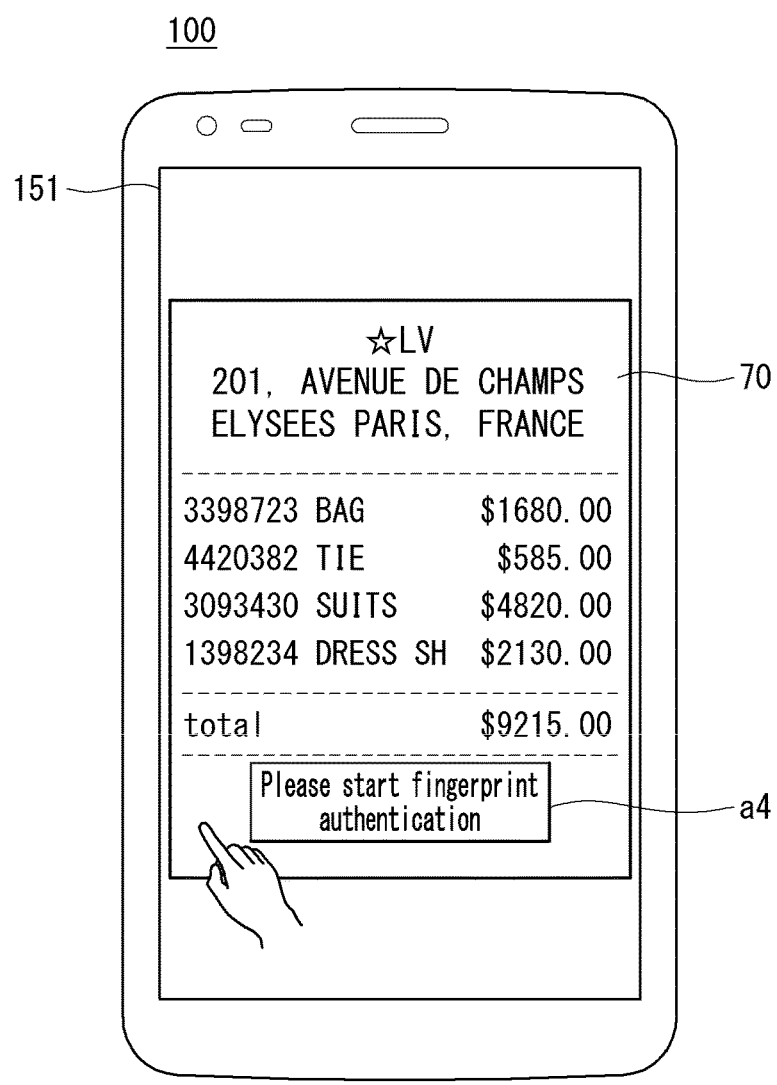

Now suppose the user tries to get a service which requires the warranty 71. As shown in FIG. 34a, the user can apply a predetermined input to the electronic receipt 70. The predetermined input can be implemented by various touch methods such as a short touch, long touch, multi-touch, drag touch, flick touch, pinch-in touch, pinch-out touch, swipe touch, and hovering touch; and a combination thereof.

Figure 34B:
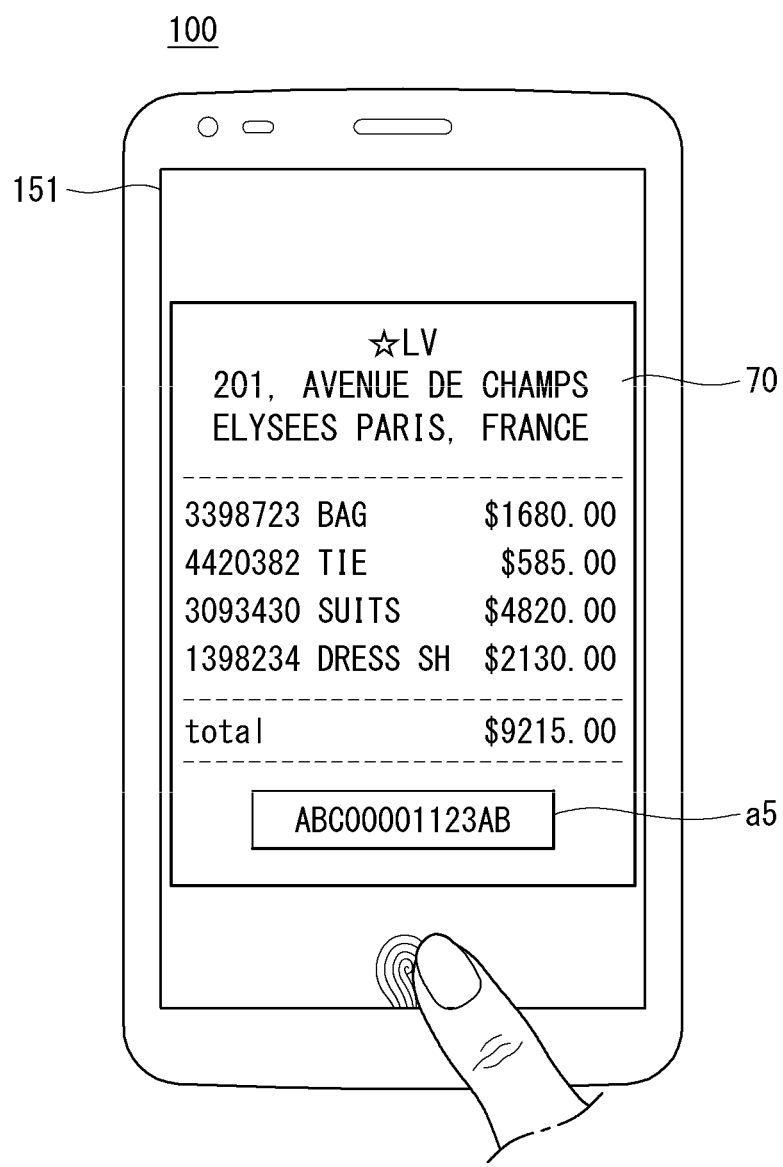

If the predetermined input is received, the controller 180 can display notification a14 which notifies that a user authentication is needed. The controller 180 can display an interface for user authentication such as a fingerprint authentication interface. As shown in FIG. 34b, in case user authentication is performed, the controller 180 can display a previously generated serial number a15. The controller 180 can request the sales system 300 to check the registered warranty 71 by using the serial number.

Referring again to FIG. 30, in case the user selects the deletion menu 45, the controller 180 can delete the warranty 71, S970. According to one embodiment, in case the information related to the warranty 71 is stored in conjunction with the calendar application, the controller 180 can be configured to delete only the information related to the calendar application.

According to the descriptions above, by storing the warranty received at the time of payment of a product in conjunction with the corresponding electronic receipt, the user can easily manage the warranty for the product. Also, since a serial number is generated and is registered in the sales system together with the warranty, the user can replace the warranty with the serial number.

Figure 35:
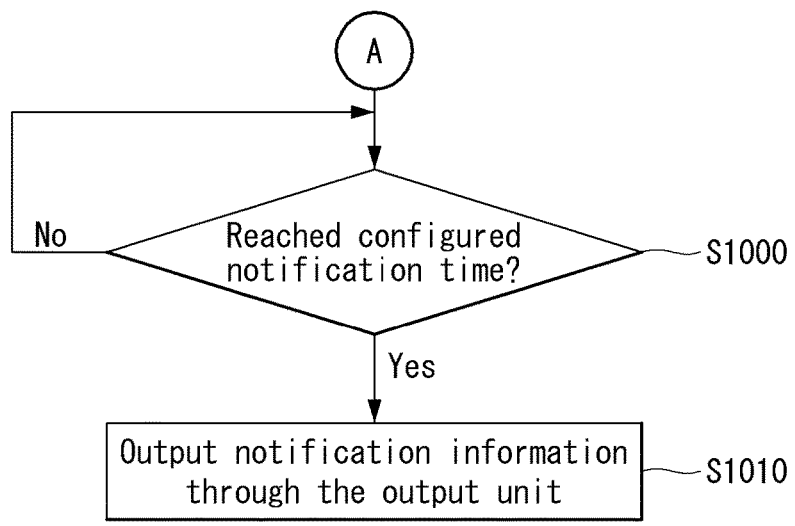
FIGS. 35 and 36 illustrate displaying generated notification information at notification time according to one embodiment of the present invention.
Figure 36:
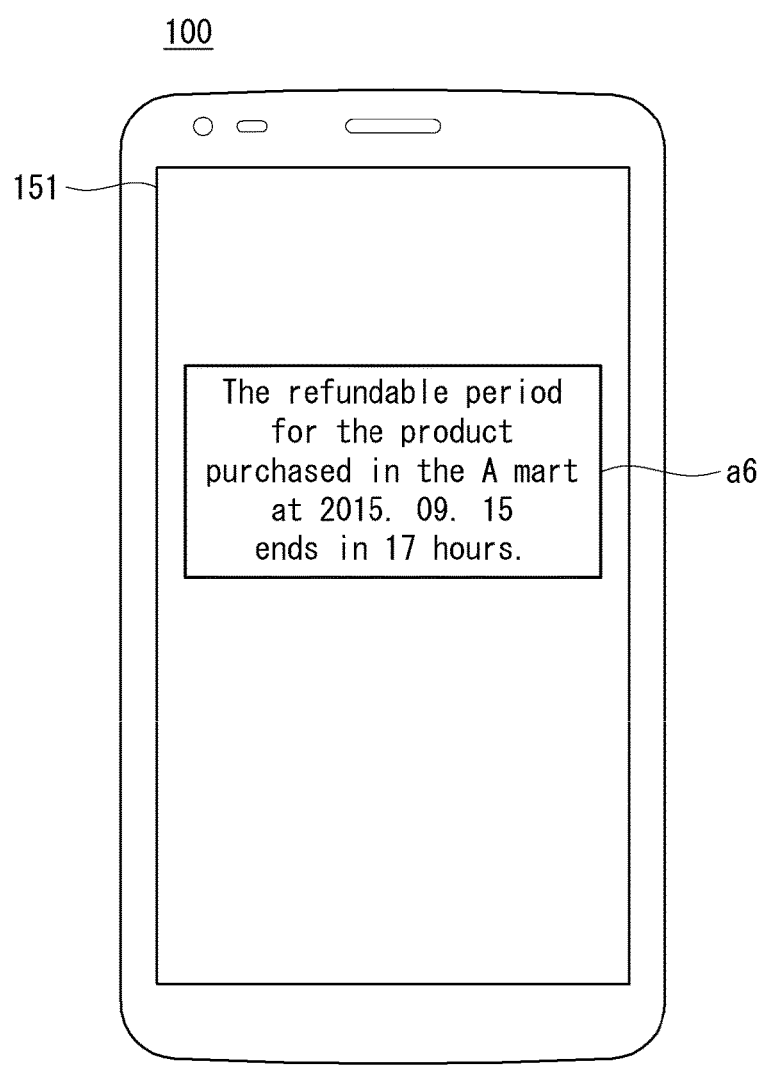

FIGS. 35 and 36 illustrate displaying generated notification information at notification time according to one embodiment of the present invention.

With reference to FIG. 35, the controller 180 can determine whether predetermined notification time has been reached S1000. In case the predetermined notification time has been reached, the controller 180 can display generated notification time on the touch screen 151.

FIG. 36 illustrates a case where notification information a6 is displayed on the touch screen 151. The notification information a6 is one example of generated notification information related to a refundable period, where the contents, display type, or display position of the notification information a6 can be configured differently depending on the situation.

According to the description above, since generated notification information is displayed at the corresponding notification time, the user can easily check the notification information.

Figure 37A:
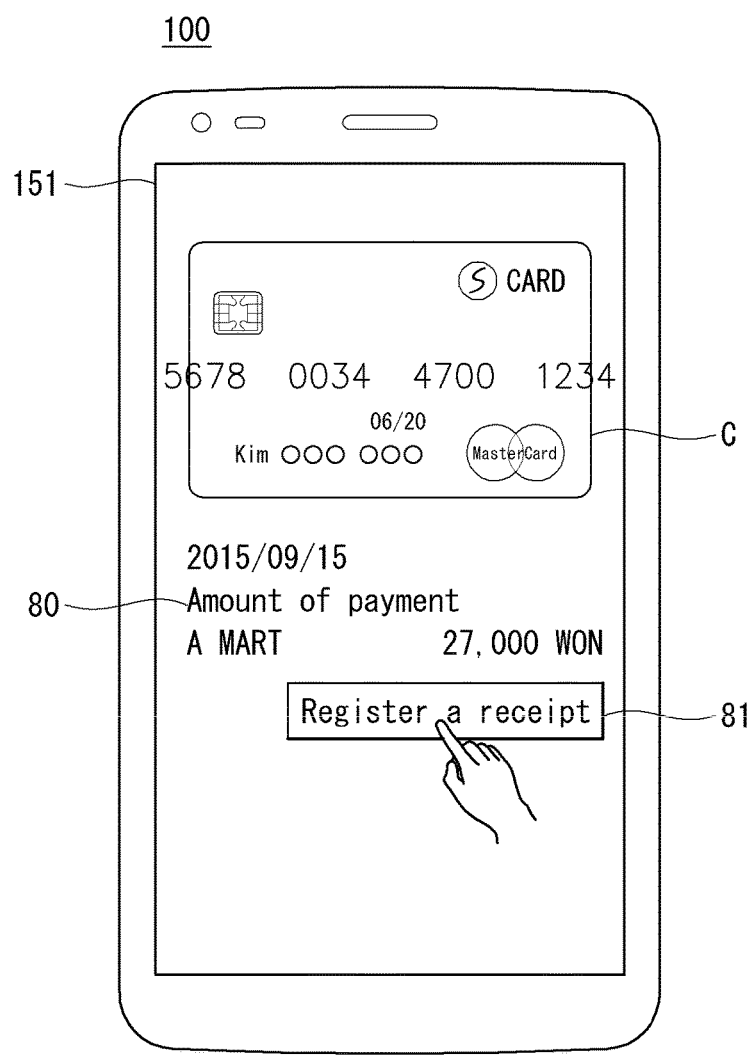
FIGS. 37a and 37b illustrate obtaining payment information and service information from an image of a receipt captured through a camera according to one embodiment of the present invention.
Figure 37B:
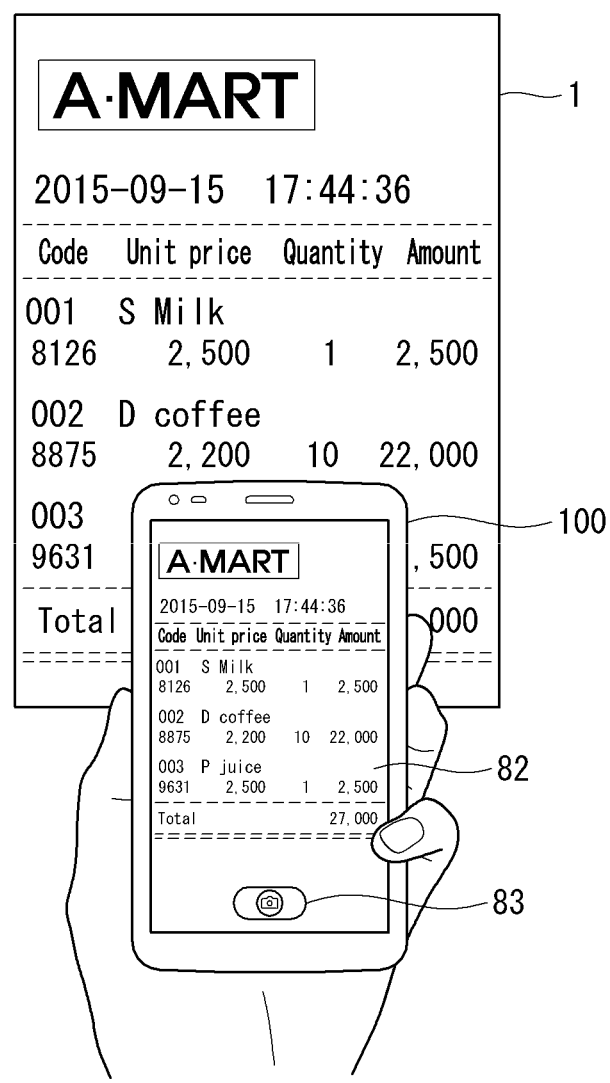

FIGS. 37a and 37b illustrate obtaining payment information and service information from an image of a receipt captured through a camera according to one embodiment of the present invention.

Now it is assumed that the user gets an actual receipt rather than an electronic one received through the wireless communication unit 110 when the user performs payment of a product. FIG. 37a illustrates a case where a mobile credit card c used for payment and information 80 about payment details received from the server of the card company 200 on the touch screen 151.

The controller 180 can display an indicator 81 for registering the receipt on the touch screen 151 together with the information 80 about the payment details. If the user selects the indicator 81, the controller 180 can operate the camera 121 (see FIG. 1).

FIG. 37b illustrates a case where a preview image 82 of the actual receipt 1 obtained through the camera 121 and a capture button 83 are displayed on the touch screen 151. The user can capture the image of the actual receipt 1 through the camera 121.

The controller 180 can obtain the payment information and the service information from the captured image of the receipt. Since the capture image of a receipt is used as an electronic receipt, the descriptions above related to utilizing an electronic receipt can be applied to this case virtually in the same manner.

According to the description above, since payment information is obtained from a capture image of a receipt obtained from a camera, the user can also manage offline receipts easily.

In what follows, as a specific example of generating notification information by using the aforementioned electronic receipt, a vehicle application will be described. Except for those irrelevant to vehicle applications, the descriptions given above can be applied virtually in the same way to the descriptions below, repeated descriptions will be omitted.

FIGS. 38 to 41 illustrate generating notification information on the basis of payment information, service information, and vehicle information according to one embodiment of the present invention.

Figure 38:
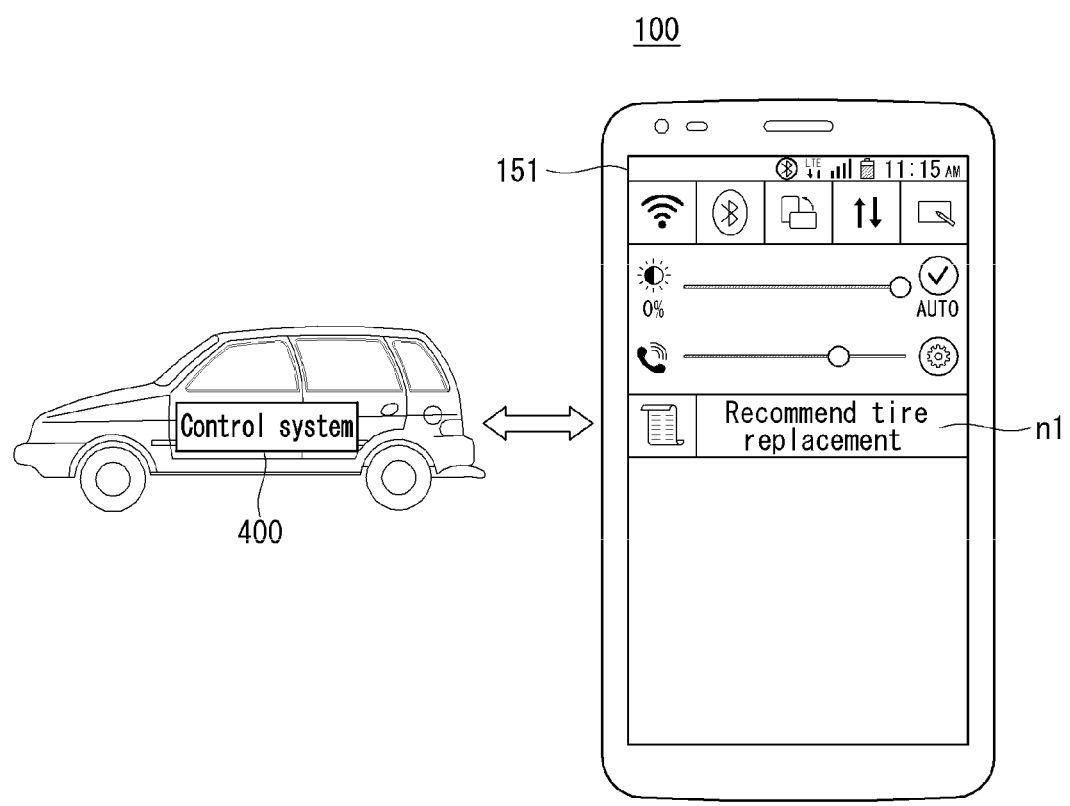
FIGS. 38 to 41 illustrate generating notification information on the basis of payment information, service information, and vehicle information according to one embodiment of the present invention.

With reference to FIG. 38, the controller 180 can establish a communication connection to a vehicle control system 400 through the wireless communication unit 110. The communication connection can be performed when the user is riding in a vehicle carrying the mobile terminal 100, but the present invention is not limited to the aforementioned situation. The tire replacement notification n1 displayed on the touch screen 151 is notification information generated on the basis of payment information, service information, and vehicle information, which will be described in detail below.

Figure 39:
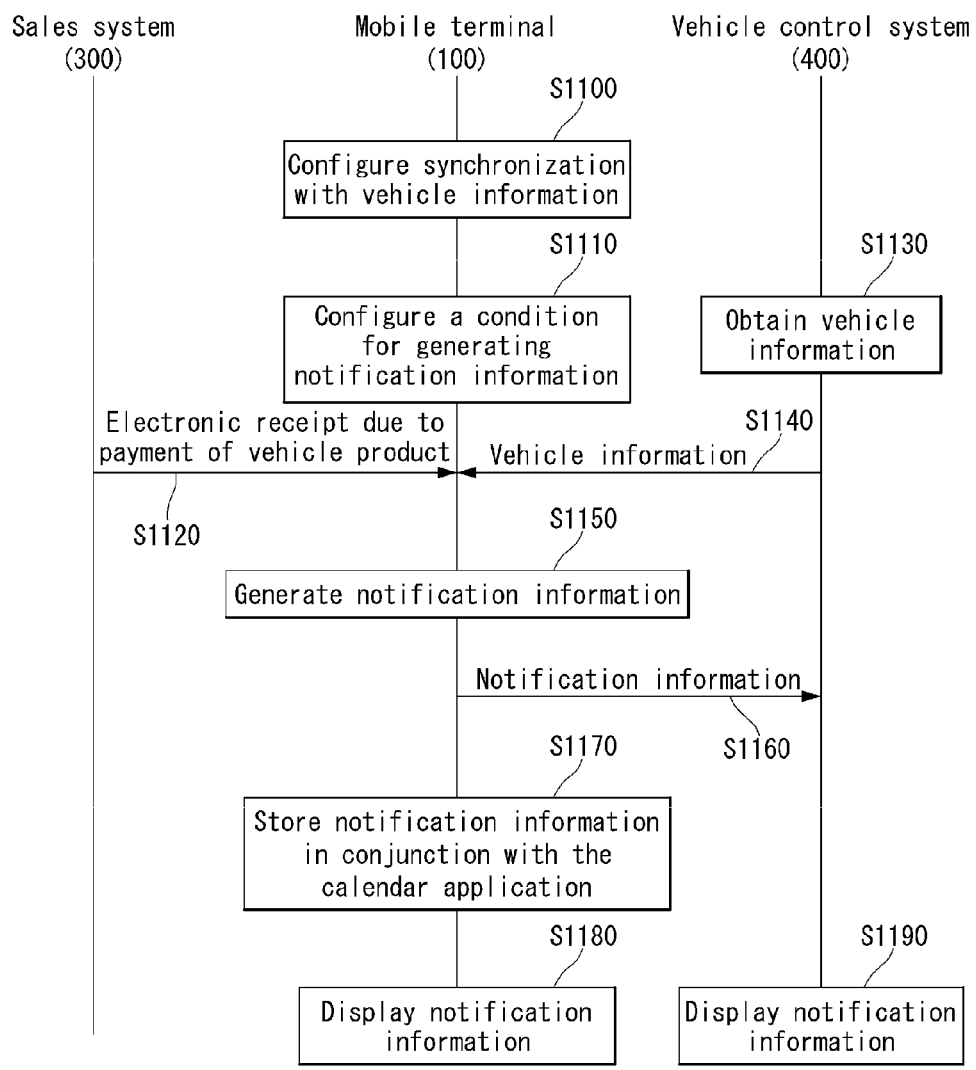
Figure 40A:
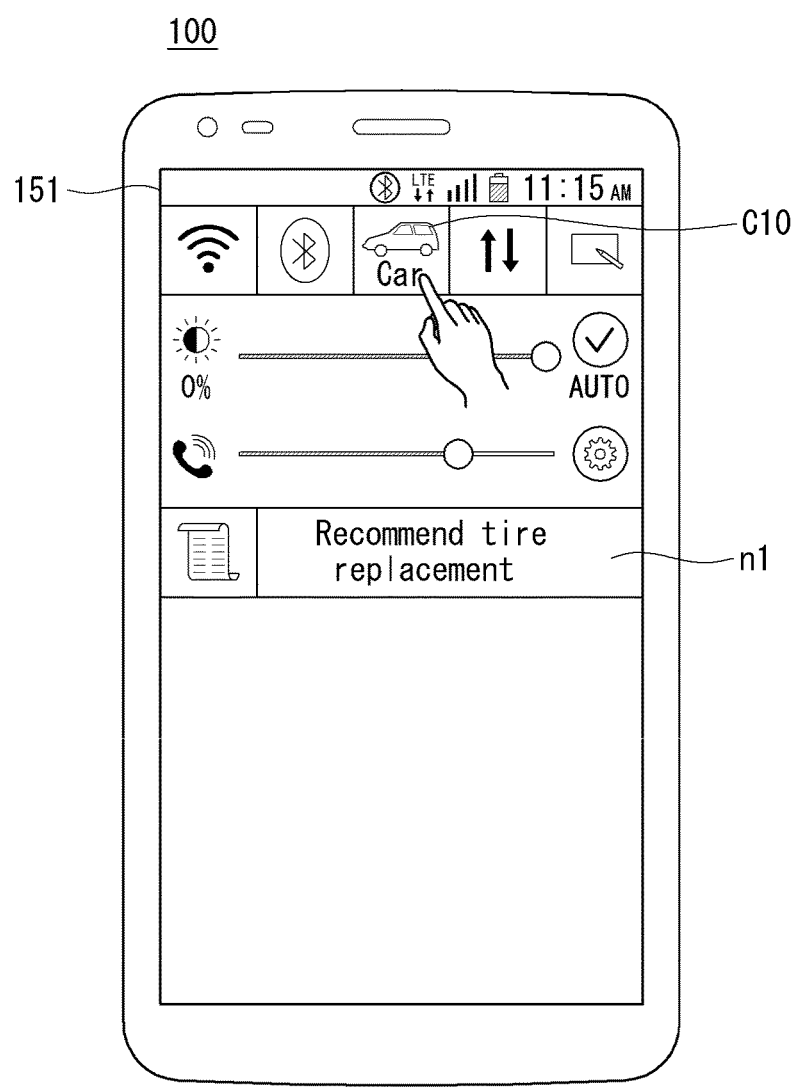

With reference to FIG. 39, the controller 180 can configure synchronization with the vehicle information transmitted from the vehicle control system 400, S1100. FIG. 40a shows a case where a status bar displays a vehicle management application C10. The vehicle management application can refer to any application irrespective of its name or type as long as the application is capable of various types of information related to a vehicle.

Figure 40B:
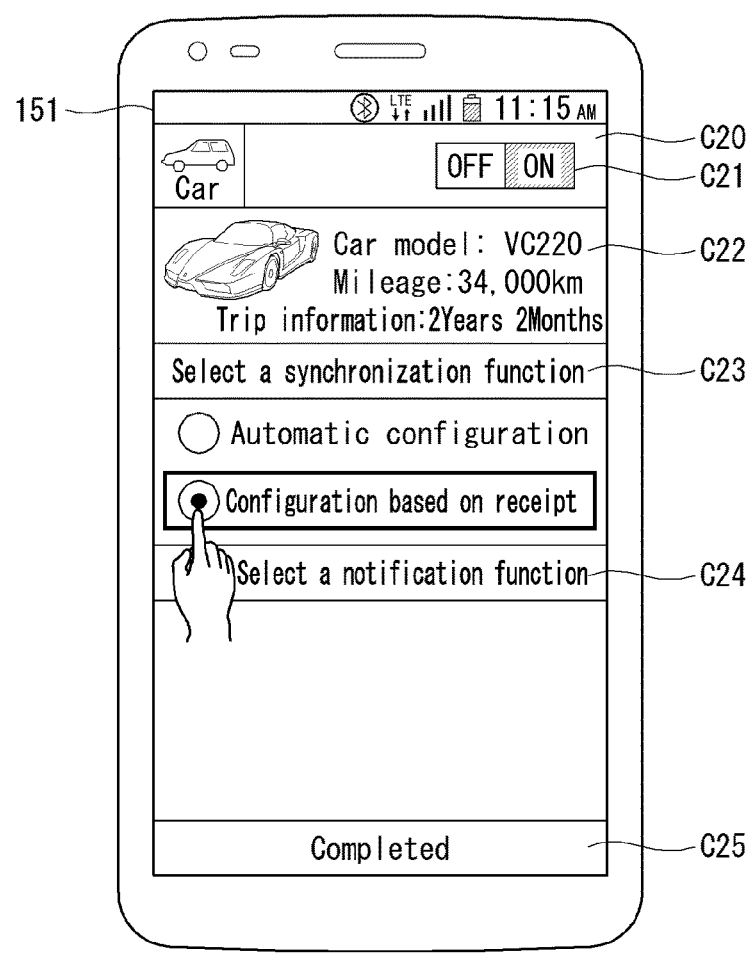

If the user selects the vehicle management application C10, the controller 180 can display the execution screen C20 of the vehicle management application as shown in FIG. 40b. The execution screen C20 can display a toggle-type synchronization button C21 by which synchronization can be activated. If the synchronization button C21 is set to ON state, the controller 180 can activate vehicle information C22, synchronization function selection area C23, notification function selection area C24, and configuration completion button C25.

Referring again to FIG. 39, the controller 10 can configure a condition for generating notification information S1110. With reference to FIG. 40b, the user can select a receipt-based configuration item from the synchronization function selection area C23. Suppose a receipt-based configuration item has been selected. In this case, the controller 180 can be configured to generate notification information by using an electronic receipt received due to payment of a vehicle-related product.

Figure 41:
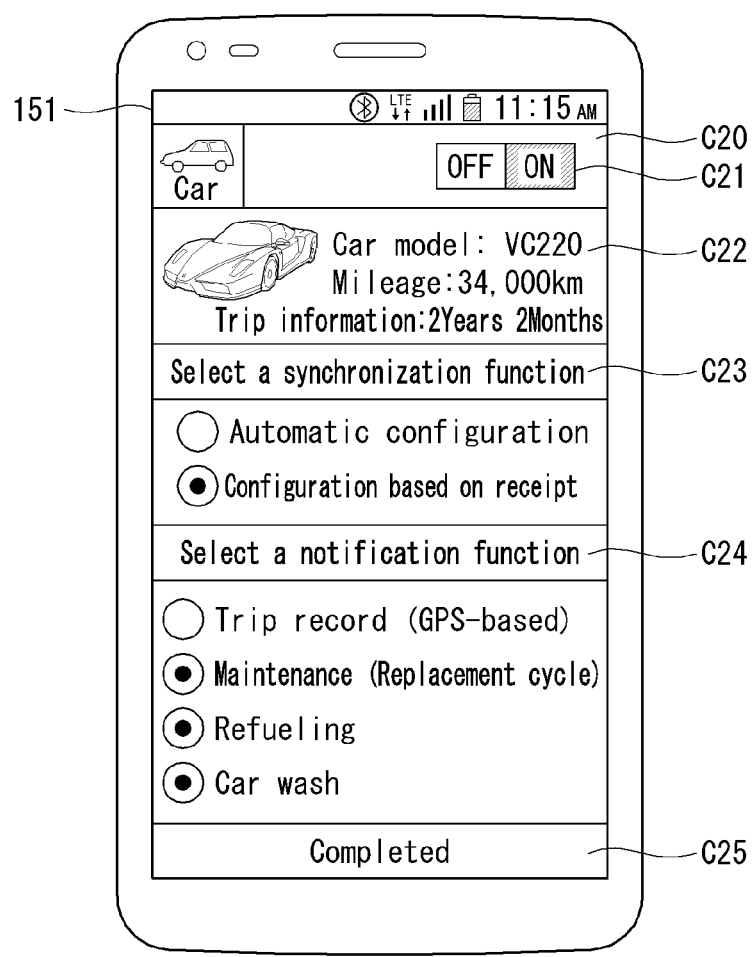

With reference to FIG. 41, the user can select an item according to which to generate notification information in the notification function selection area C24. FIG. 41 assumes that maintenance, refueling, and wash item have been selected. In this case, the controller 180 can be configured to generate notification information by using an electronic receipt related to maintenance, refueling, and wash; and vehicle information.

The vehicle information can include driving record, maintenance record, fueling record, and wash record of the vehicle. However, the present invention is not limited to the aforementioned information, but can further include additional vehicle information depending on the needs.

According to one embodiment, the controller 180 can provide an interface through which the user can configure a condition for generating notification information with respect to each item. For example, if maintenance item is selected, the controller 180 can display a list of replaceable parts. If a particular part is selected from among the list, the controller 180 can display a screen through which the user can configure a condition for generating notification information. For example, if tire is selected, a screen for setting a replacement cycle for a tire can be displayed.

Referring again to FIG. 39, the controller 180 can receive an electronic receipt due to payment of a vehicle product from the sales system 300, S1120. Also, the controller 180 can receive vehicle information obtained S1130 from the vehicle control system 400, S1140. Although FIG. 39 illustrates as if the S1120 and the S1140 steps are performed simultaneously, the present invention is not limited to this particular condition. The S1120 and the S1140 can be performed at different times from each other.

The controller 180 can store received vehicle information in the memory 170. In case pre-stored vehicle information is available, the controller 180 can update the pre-stored vehicle information with the received vehicle information.

According to one embodiment, reception of the vehicle information can be performed when the vehicle control system 400 is turned on. According to another embodiment, reception of the vehicle information can be performed at predetermined time intervals.

The controller 180 can generate notification information on the basis of the received electronic receipt and vehicle information S1150. Since obtaining payment information and service information from a received electronic receipt is actually the same as described above, detailed descriptions thereof will be omitted.

To describe generation of notification information, it is assumed that the user replaces tires and receives an electronic receipt. It is further assumed that the tire replacement cycle is set to when the mileage exceeds 30,000 km or one year after tire replacement. The controller 180 can generate notification information to advise replacing tires in case one year is passed since the payment time obtained from an electronic receipt or a driving mileage obtained from received vehicle information since the payment exceeds 30,000 km.

Referring again to FIG. 39, the controller 180 can transmit generated notification information to the vehicle control system 400. Also, the controller 180 can store notification information in conjunction with the calendar application S1170. Since descriptions of the S1170 step are actually the same as given previously for the S100 step of FIG. 2, detailed descriptions will be omitted.

Afterwards, if the set notification time is reached, the controller 180 can output the notification information S1180. The vehicle control system 400 can also output received notification information at notification time S1190.

According to the descriptions above, since notification information is generated on the basis of the vehicle information received from a vehicle control system and the information obtained from an electronic receipt, the user can manage payment of a vehicle-related product easily.

Figure 42:
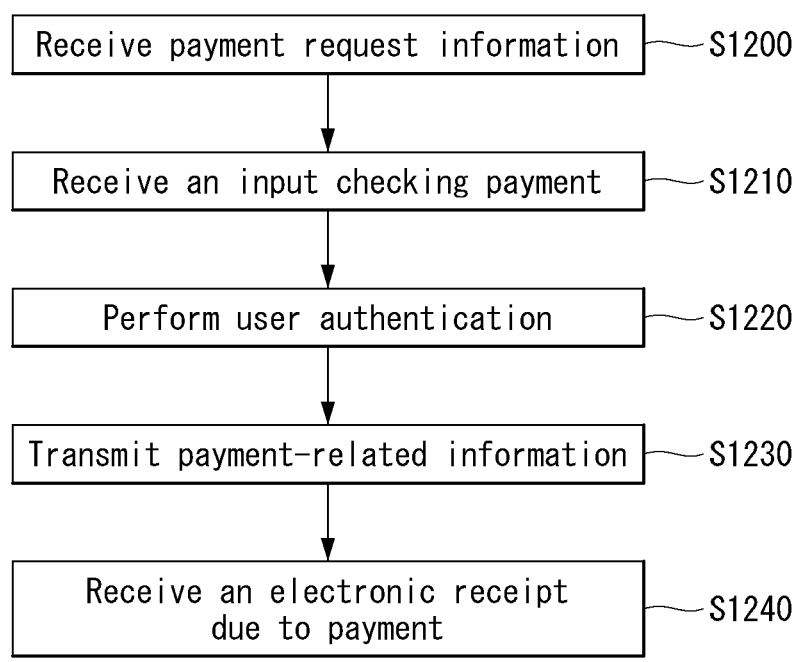
FIGS. 42 to 44 illustrate transmitting payment approval information according to a payment request received from a vehicle control system according to one embodiment of the present invention.
Figure 43:
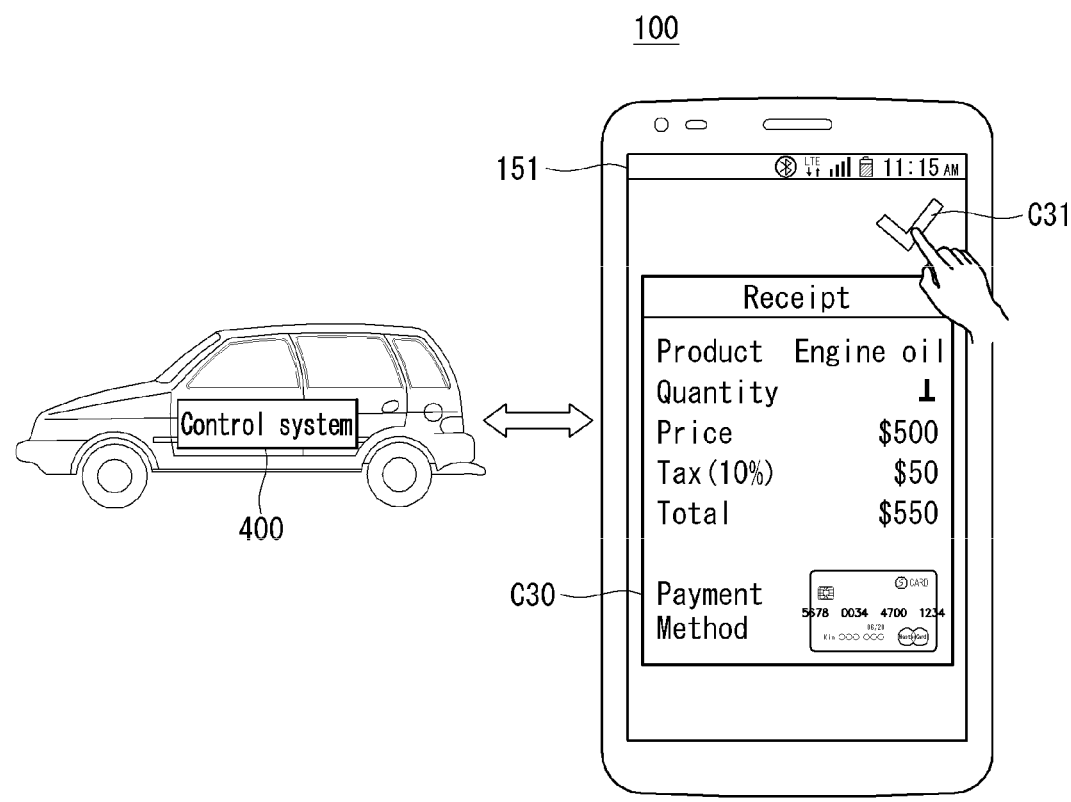
Figure 44:
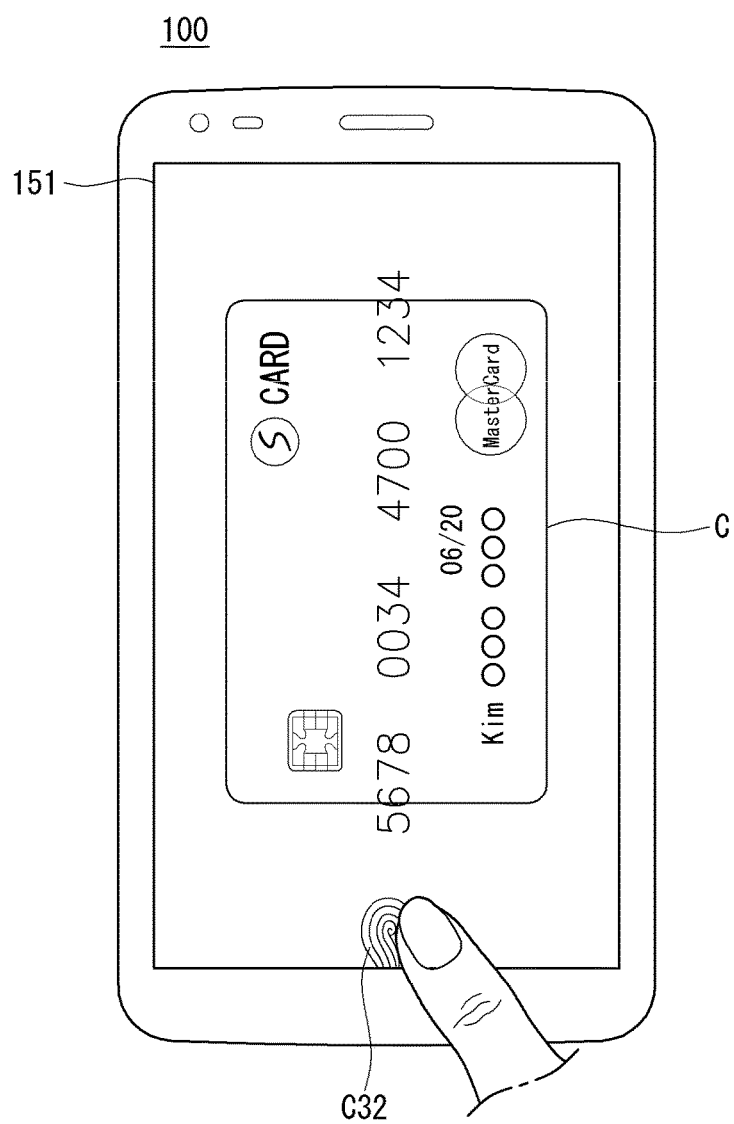

FIGS. 42 to 44 illustrate transmitting payment approval information according to a payment request received from a vehicle control system according to one embodiment of the present invention.

With reference to FIG. 42, the controller 180 can receive a payment request from the vehicle control system 400, S1200. Suppose the user returns home after requesting a service center to perform vehicle inspection. With reference to FIG. 43, the service center completes checking the vehicle and enters a service charge due to the vehicle inspection into the vehicle control system 400 through the sales system 300. The vehicle control system 400 can transmit a payment request due to the entered service charge to the mobile terminal 100.

The controller 180 can display received payment request information C30 and payment confirmation indicator C31 on the touch screen 151. If the user selects the payment confirmation indicator C31, the controller 180 can receive an input for selecting the payment confirmation indicator C31, S1210.

Accordingly, the controller 180 can perform the user authentication procedure S1220. With reference to FIG. 44, the controller 180 can display a mobile credit card C to be used for payment and display a fingerprint authentication interface C32 for user authentication. However, it should be noted that the fingerprint authentication interface C32 can be applied to the mobile terminal 100 as separate hardware.

Referring again to FIG. 42, if the user authentication is completed, the controller 180 can transmit payment approval information to the vehicle control system 400 through the wireless communication unit 110, S1230. The vehicle control system 400 can transmit payment approval information to the sales system 300 and receive an electronic receipt due to the payment. The controller 180 can receive the electronic receipt from the vehicle control system 400, S1240 and generate notification information by using the received electronic receipt.

According to the description above, since remote payment can be performed with respect to a payment request received from the vehicle control system, the user can perform payment for a vehicle-related product easily.

Figure 45A:
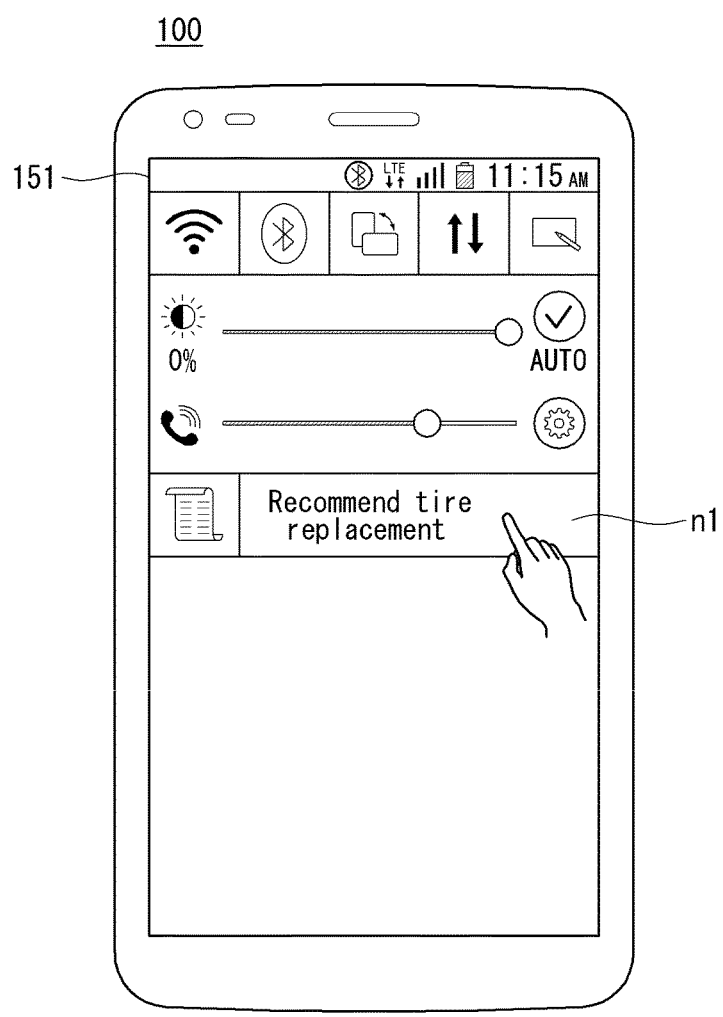
FIGS. 45a to 46 illustrate providing additional information related to notification information according to one embodiment of the present invention.
Figure 45B:
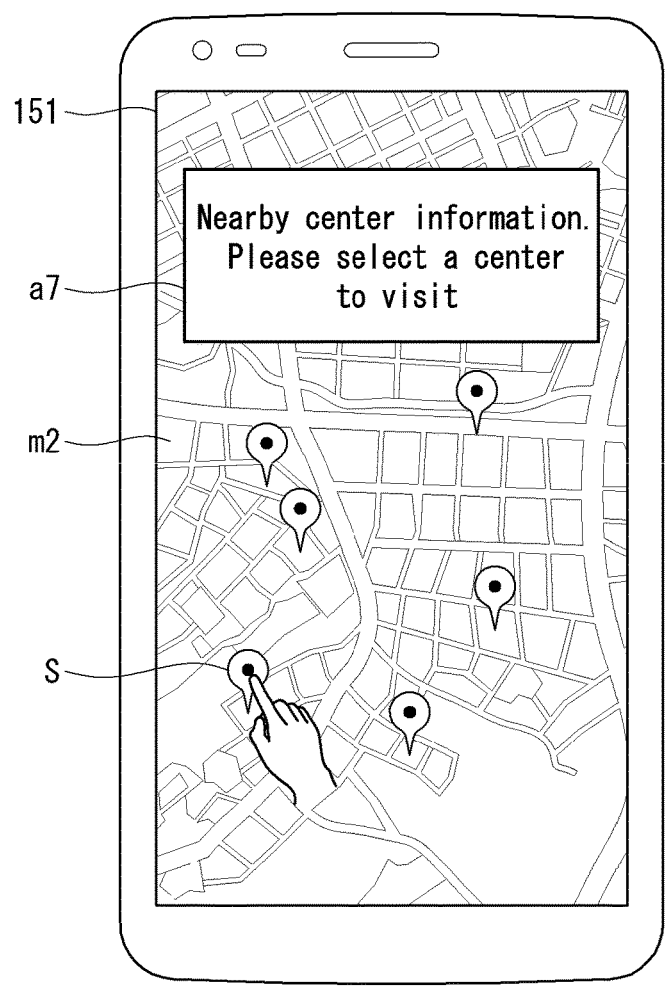
Figure 46:
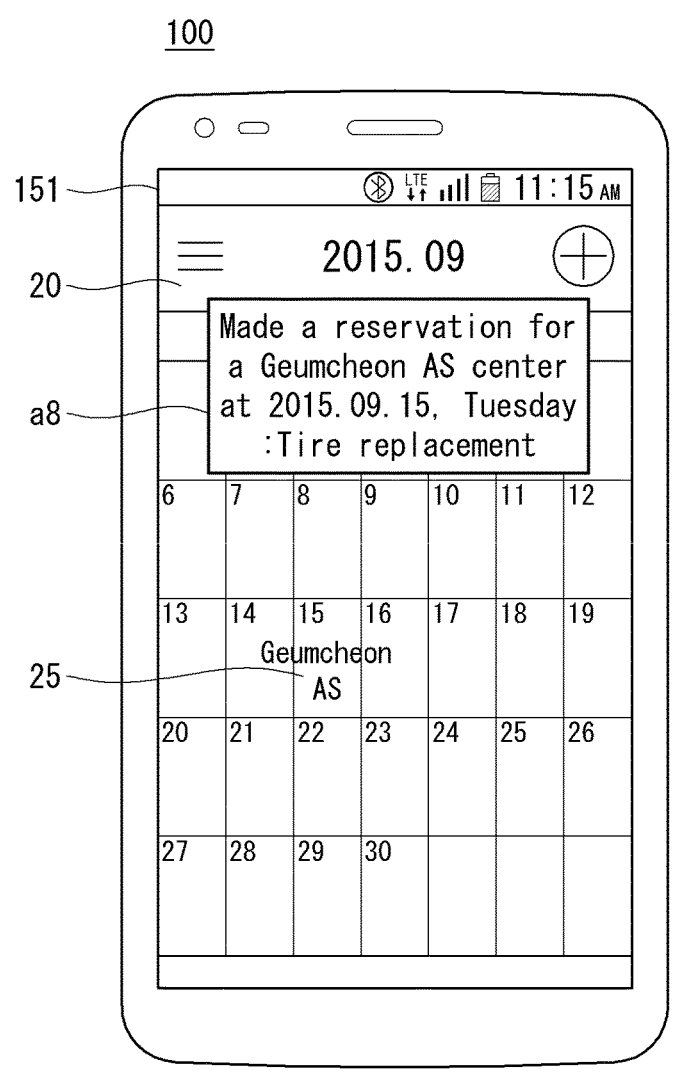

FIGS. 45a to 46 illustrate providing additional information related to notification information according to one embodiment of the present invention.

With reference to FIG. 45a, the controller 180 can display notification information n1 for tire replacement recommendation according to generated notification information. If the user selects the notification information n1, the controller 180 can display additional information related to the notification information n1. For example, if the notification information n1 is a recommendation for tire replacement, the controller 180 can display map information mc2 showing service centers for tire replacement close to the mobile terminal 100 as shown in FIG. 45b.

The controller 180 can also display notification a7 which notifies that the user can select a service center. If the user selects a service center S, the controller 180 can establish a communication connection to the sales system 300 of the selected service center S. The controller 180 can transmit reservation information for tire replacement to the sales system 300 and receive reservation confirmation information from the sales system 300.

The controller 180 can generate notification information which notifies that tire replacement has been reserved on the basis of received reservation confirmation information. The generated notification information can be stored in conjunction with the calendar application. As shown in FIG. 46, the controller 180 can display a notification item 25 representing configured notification information on the execution screen of the calendar application.

According to one embodiment, the controller 180 can display notification a8 which notifies of received reservation confirmation information. Though FIG. 46 assumes that the notification a8 is displayed along with the execution screen 20 of the calendar application, the present invention is not limited to the aforementioned assumption. The controller 180 can display the notification a8 when reservation confirmation information is received from the sales system 300.

According to the description above, since additional information related to notification information is provided, the user can check additional information related to the notification information easily.

Figure 47A:
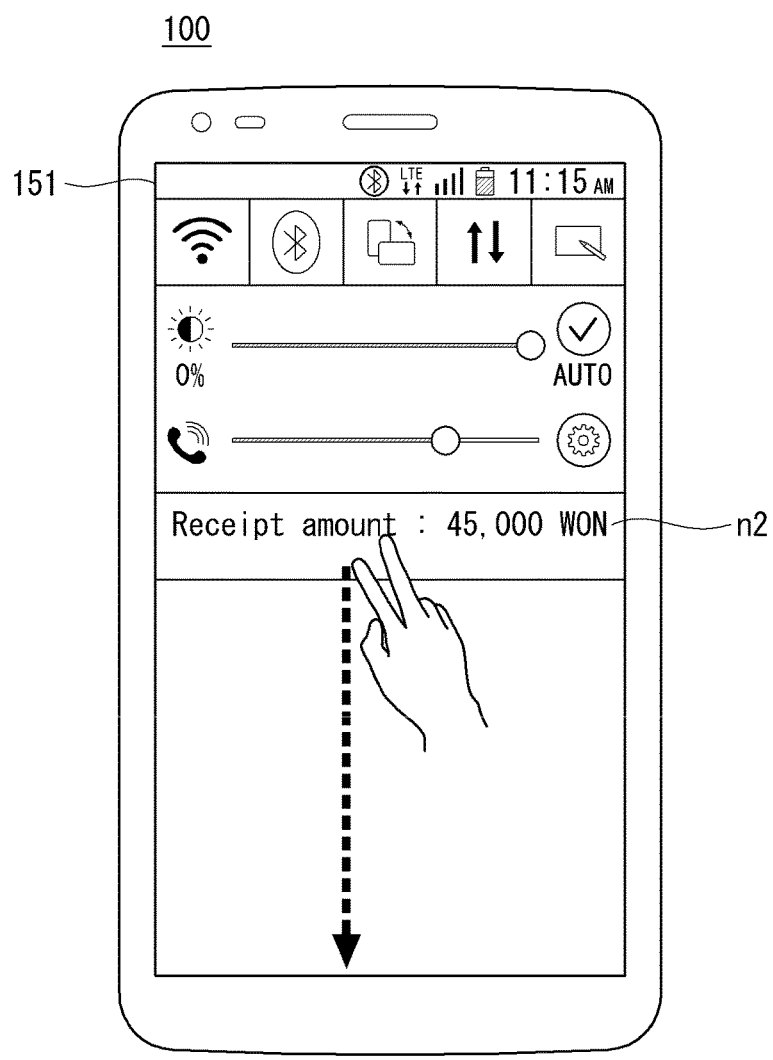
FIGS. 47a and 47b illustrate displaying an electronic receipt according to one embodiment of the present invention.
Figure 47B:
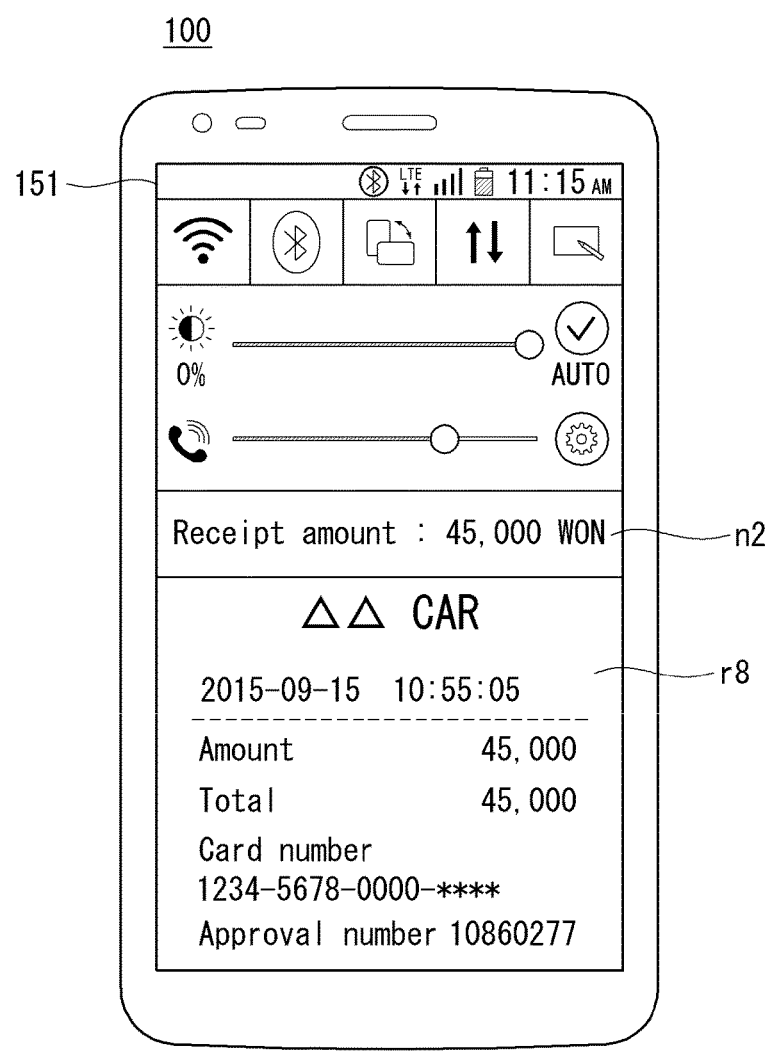

FIGS. 47a and 47b illustrate displaying an electronic receipt according to one embodiment of the present invention.

With reference to FIG. 47a, in case payment of a product is performed, summary notification n2 related to the payment can be displayed in a status bar. The user can apply a predetermined input to the notification n2 to check the electronic receipt. According to one embodiment, the predetermined input can be such an input multi-touching the notification n2 and dragging the notification downward. However, this is only an example, and the predetermined input can be implemented by various touch methods such as a short touch, long touch, multi-touch, drag touch, flick touch, pinch-in touch, pinch-out touch, swipe touch, and hovering touch; and a combination thereof.

As shown in FIG. 47b, if the predetermined input is applied, the controller 180 can display the electronic receipt r8 related to the notification n2 on the touch screen 151.

According to the description above, the user can easily check a received electronic receipt according to a simple touch input.

Figure 48A:
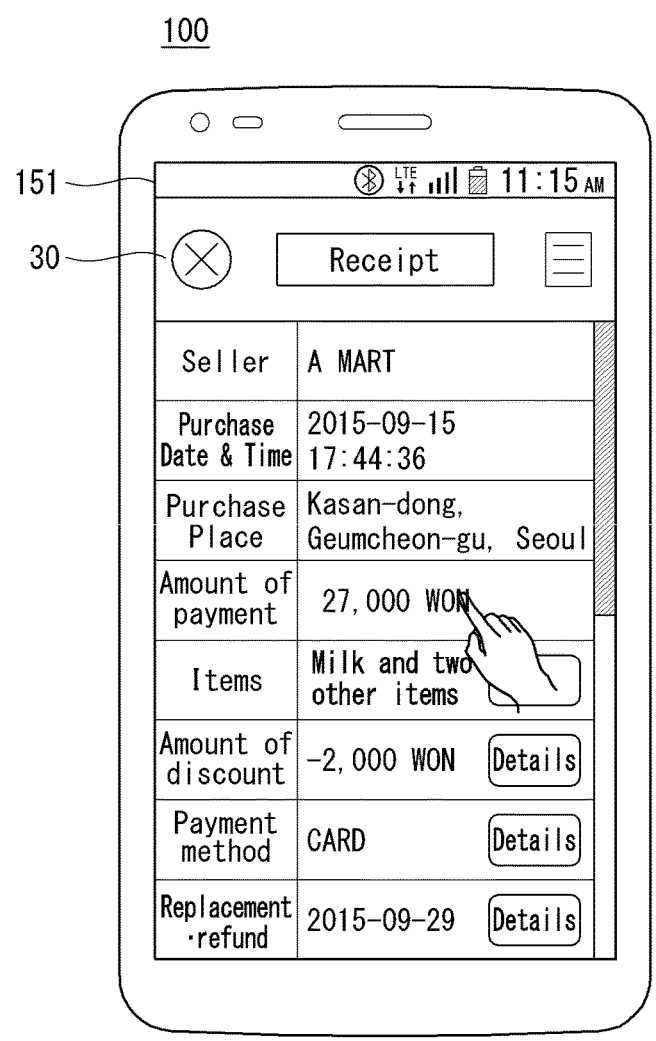
FIGS. 48a and 48b illustrate utilizing information included in an electronic receipt according to one embodiment of the present invention.
Figure 48B:
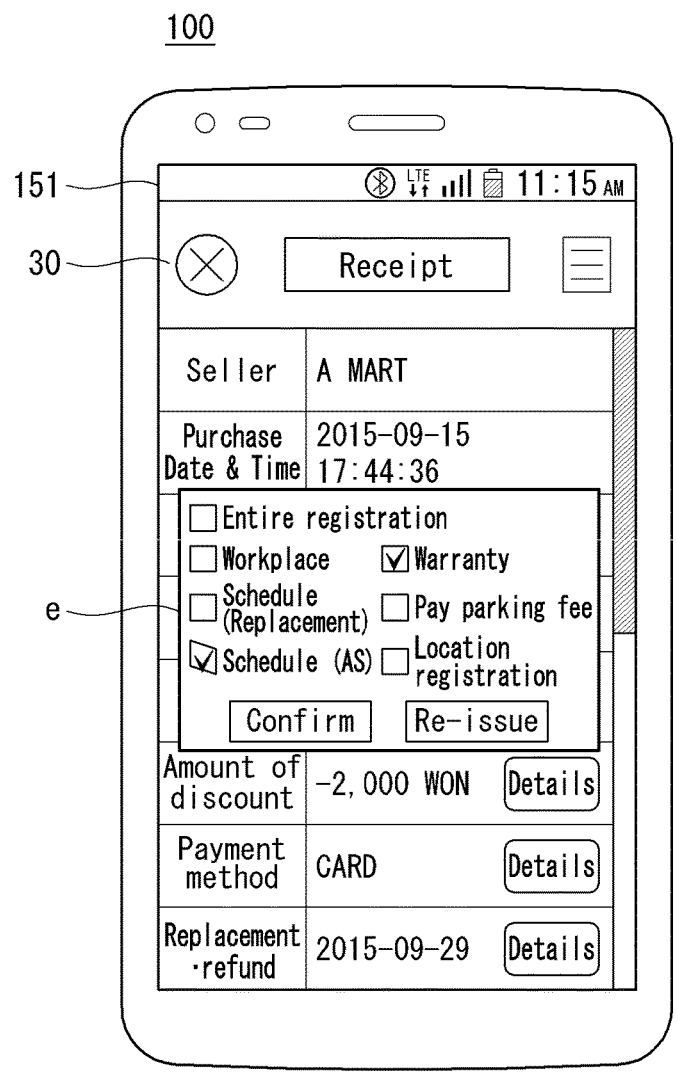

FIGS. 48a and 48b illustrate utilizing information included in an electronic receipt according to one embodiment of the present invention.

With reference to FIG. 48a, the user can apply a predetermined touch input to the receipt specific information 30. The predetermined input can be implemented by various touch methods such as a short touch, long touch, multi-touch, drag touch, flick touch, pinch-in touch, pinch-out touch, swipe touch, and hovering touch; and a combination thereof.

As shown in FIG. 48b, receiving the predetermined input, the controller 180 can display an interface e for registering information include in the electronic receipt. The interface e shown in FIG. 48b is only an example, and the present invention is not limited thereto. The interface e can further include other items depending on the needs.

The user can select an item to be stored in conjunction with a different application through the interface e. The controller 180 can display a list of applications in which to store the information of the selected item. If the user selects an application, the controller 180 can store information of the selected item in conjunction with the selected application.

For example, in case payment information or notification information is configured to be associated with the calendar application, information related to an electronic receipt can also be registered for a different application such as SNS application.

According to one embodiment, the user can select an item for which to request reissuance through the interface e and select a reissuance button. The controller 180 can request the sales system 300 to reissue the selected item. For example, if a warranty item is selected, the controller 180 can transmit a request for reissuance of the warranty to the sales system 300.

According to the description above, the user can manage electronic receipt-related information easily.

Figure 49A:
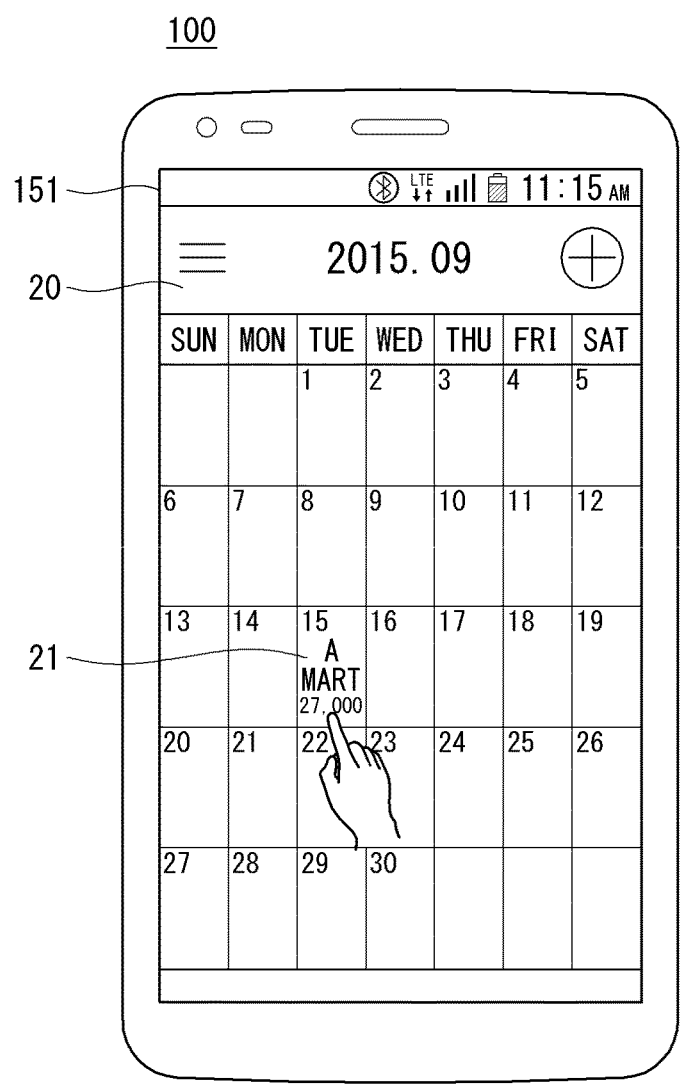
FIGS. 49a to 50 illustrate processing payment for the same product by using an electronic receipt according to one embodiment of the present invention.
Figure 49B:
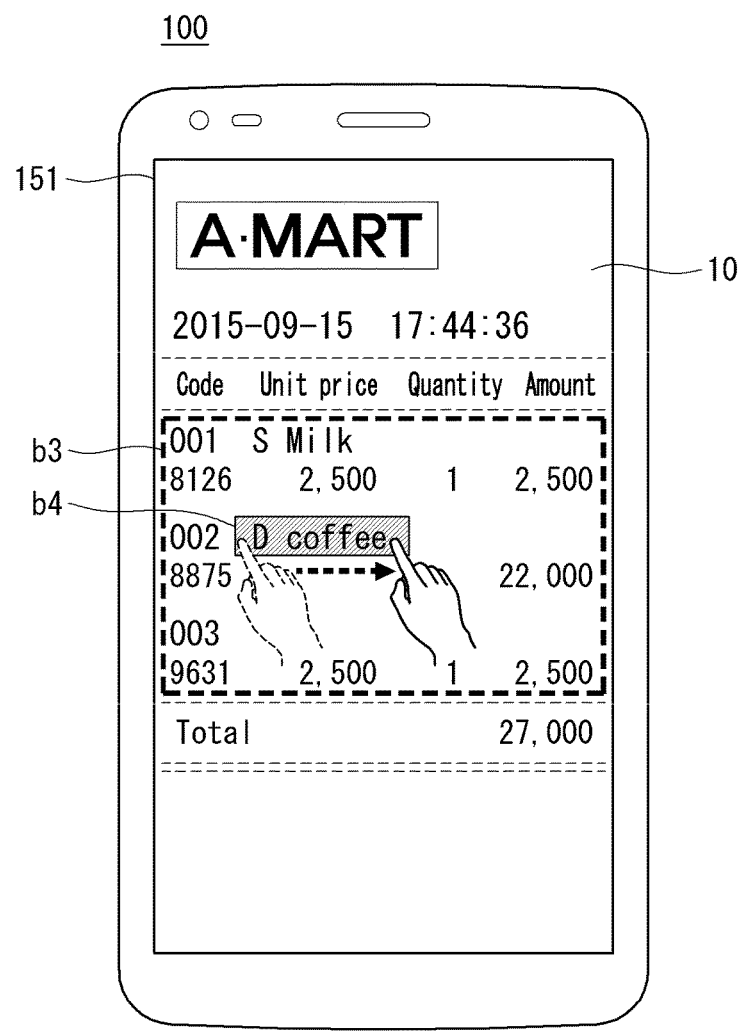
Figure 50:
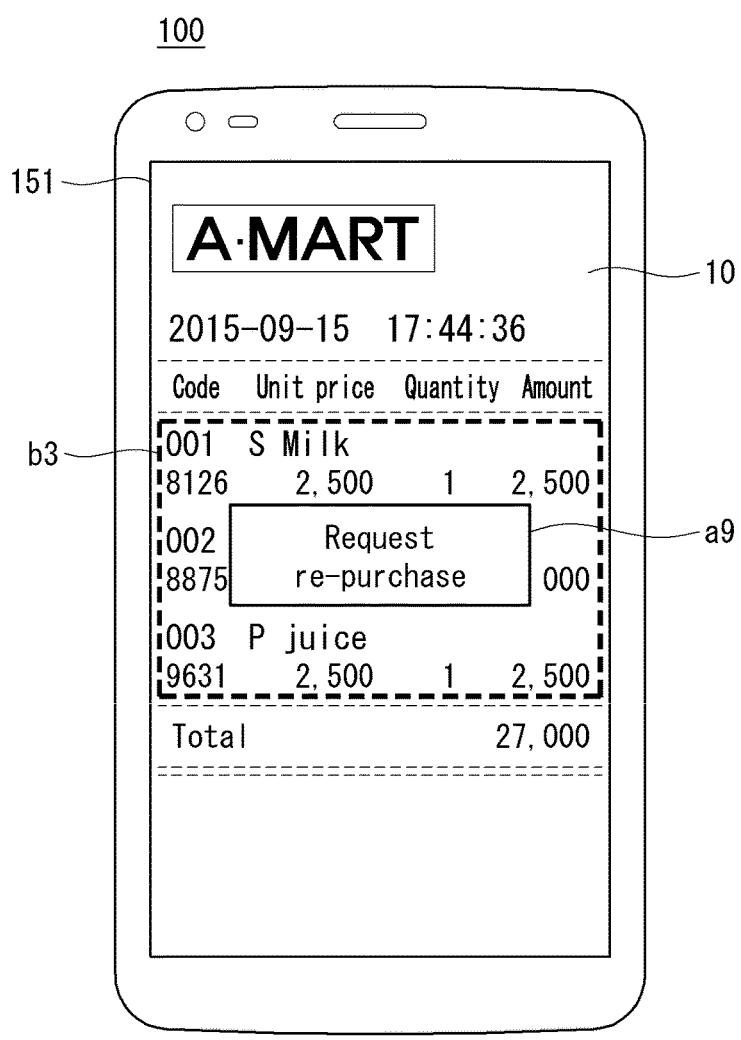

FIGS. 49a to 50 illustrate processing payment for the same product by using an electronic receipt according to one embodiment of the present invention.

With reference to FIG. 49a, a payment item 21 is displayed on the execution screen 20 of the calendar application. To purchase the same product again, the user can select the payment item 21. As shown in FIG. 49b, the controller 180 can display an electronic receipt 10. Or according to a different embodiment, receipt specific information 30 can be displayed.

The user can apply a predetermine input to purchase a product included in the electronic receipt 10 again. The predetermined input can be implemented by various touch methods such as a short touch, long touch, multi-touch, drag touch, flick touch, pinch-in touch, pinch-out touch, swipe touch, and hovering touch; and a combination thereof.

As shown in FIG. 49b, receiving the predetermined input, the controller 180 can display an indicator b3 intended for distinguishing an area displaying a product list in the electronic receipt 10. The form of the indicator b3 is only an example, and the present invention is not limited to the current example. The indicator b1 can be applied in various forms depending on the needs.

To select again a product to purchase, the user can drag the area displaying a product name from the product list. According to one embodiment, the controller 180 can perform highlighting b4 the selected product. However, this is only an example, and the present invention can use various methods including change of text color as long as they can be effective for distinguishing the selected product.

If selection of a product is completed, the controller 180 can establish a communication connection to the sales system 300. The controller 180 can transmit a signal requesting purchase of the selected product to the sales system 300. Along with the signal, the controller 180 can transmit information for performing payment. As shown in FIG. 50, according to one embodiment, the controller can display notification a9 notifying that repurchase is being requested on the touch screen 151.

Receiving repurchase request approval information from the sales system 300, the controller 180 can perform a payment procedure. In this case, the controller 180 can transmit information such as the user's address for product delivery. If the repurchase is completed, the controller 180 can receive an electronic receipt due to the payment.

As described above, the controller 180 can generate notification information such as refund on the basis of the received electronic receipt. The controller 180 can display a notification item indicating generated notification information on the execution screen 20 of the calendar application of FIG. 49*a*.

According to the description above, since repurchase of the same product is performed by using a stored electronic receipt, the user can easily purchase the same product.

Figure 51:
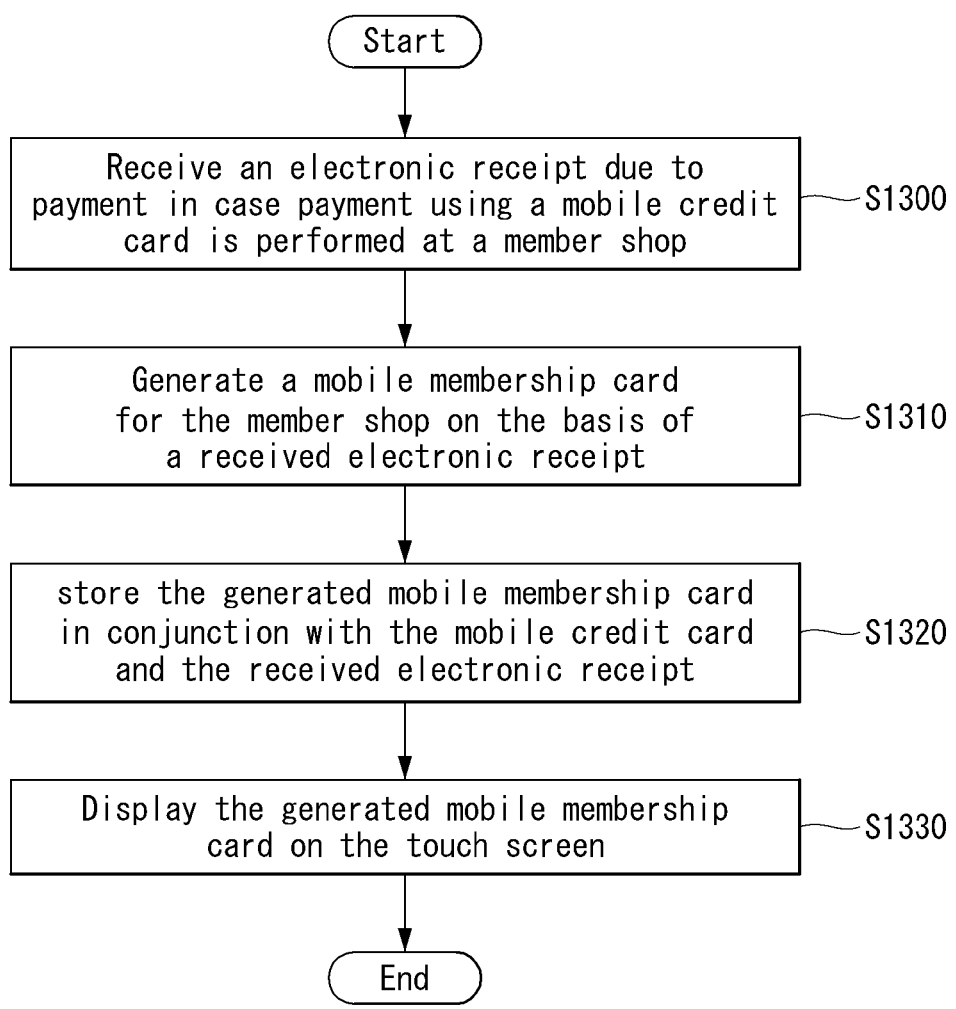
FIG. 51 is a flow diagram of a method for controlling a mobile terminal according to one embodiment of the present invention.
Figure 52:
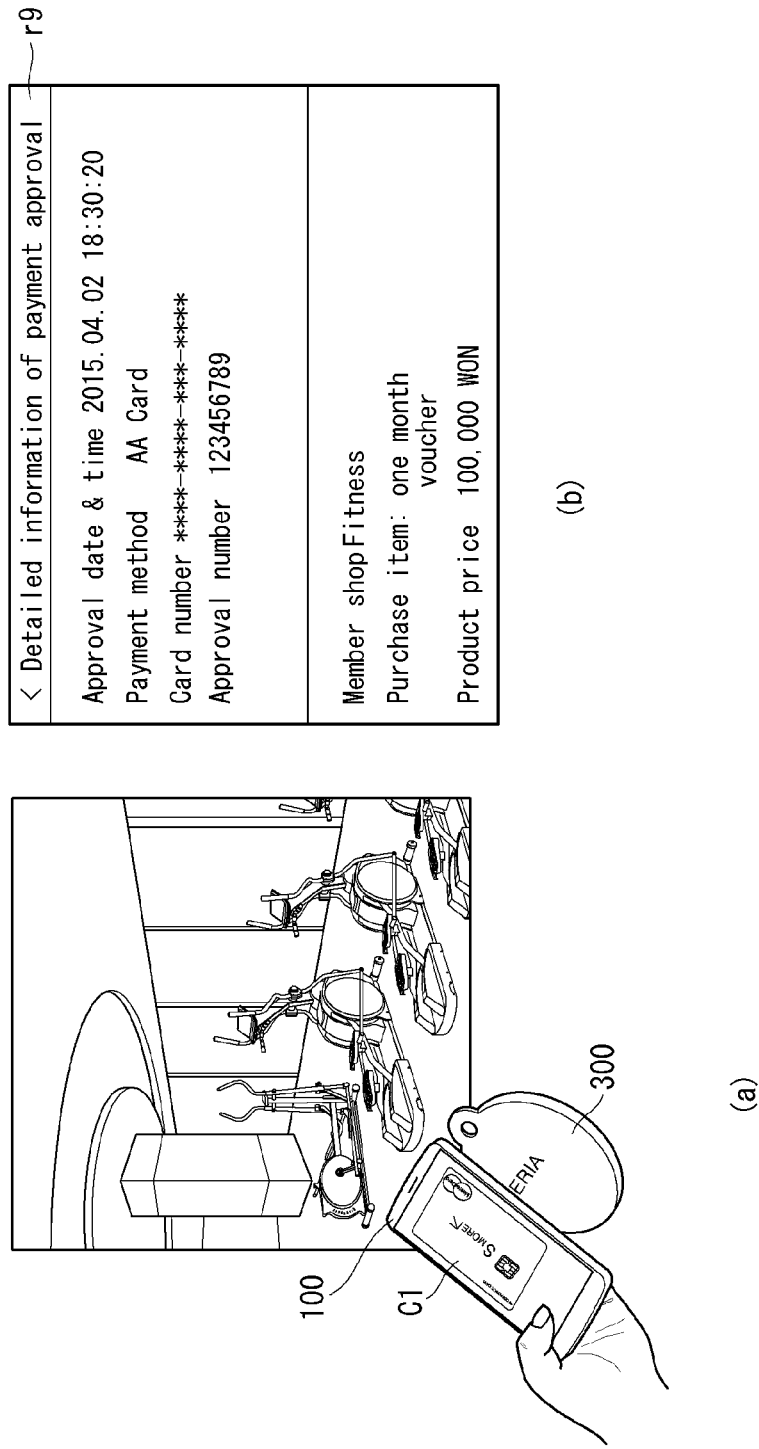
FIGS. 52 to 54 illustrate generating a mobile membership card on the basis of an electronic receipt according to one embodiment of the present invention.
Figure 53:
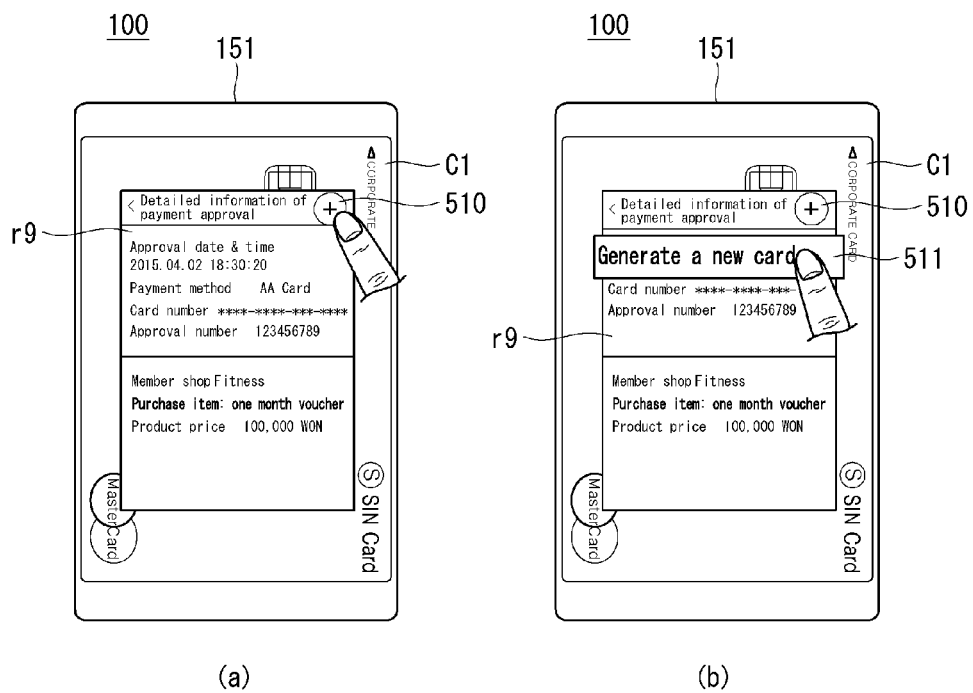
Figure 54:
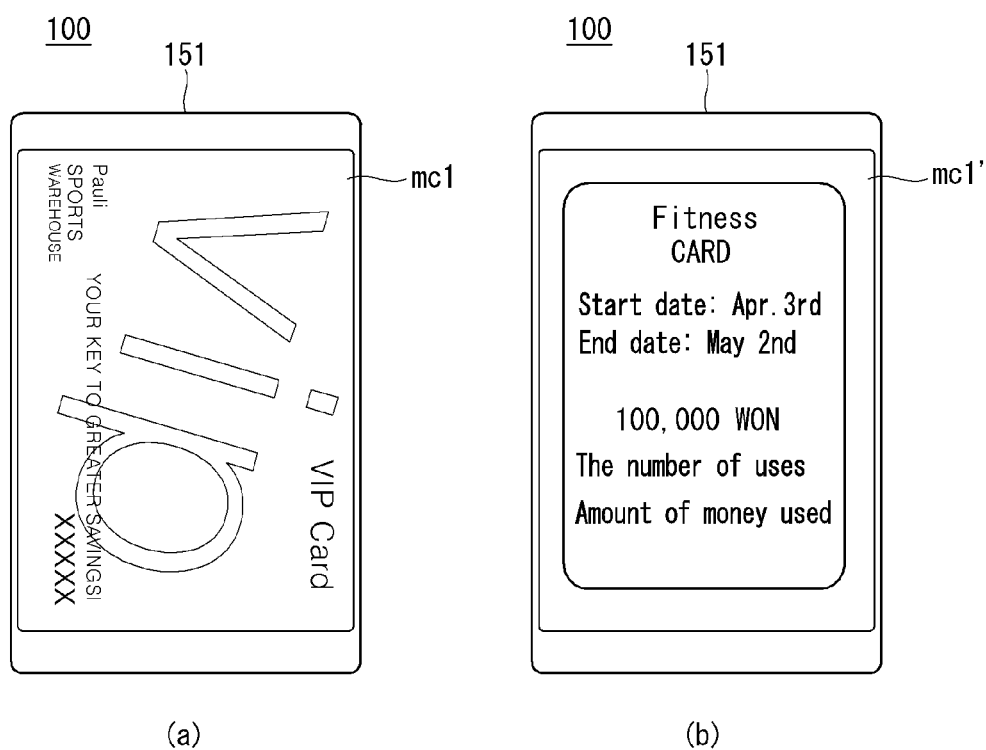

FIG. 51 is a flow diagram of a method for controlling a mobile terminal according to one embodiment of the present invention. FIGS. 52 to 54 illustrate generating a mobile membership card on the basis of an electronic receipt according to one embodiment of the present invention.

A method for controlling a mobile terminal according to one embodiment of the present invention can be implemented in the mobile terminal 100 described with reference to FIG. 1. In what follows, a method for controlling a mobile terminal according to one embodiment of the present invention and operation of the mobile terminal 100 to implement the method will be described in detail with reference to related drawings.

With reference to FIG. 51, in case payment based on a mobile credit card is performed in a member shop, the controller 180 can receive an electronic receipt due to the payment S1300.

The member shop can refer to a store receiving a mobile payment service based on the mobile credit card from a card company providing services related to a particular mobile credit card and paying a predetermined fee to the card company. In this case, the member shop can be equipped with a mobile payment system capable of providing a particular product and performing mobile payment for the product.

For example, the member shop can be a store such as a fitness center, library, or private academy, which provides a service product for which a period of use or the number of use is predetermined. However, the present invention is not limited to the aforementioned example, but a shop selling a particular product (for example, mobile terminal) can also be considered as the member shop once the description below can be applied thereto.

According to one embodiment, the mobile credit card can refer to the card information of a card for payment such as a credit card stored in the mobile terminal 100. Or as shown in FIG. 52(*a*), the mobile credit card can refer to the image of a credit card generated on the basis of the card information stored in the mobile terminal 100.

The controller 180 can perform mobile payment by using the information of a mobile credit card stored in the mobile terminal 100. For example, it is assumed that the user purchases a voucher at a fitness center, a member shop of a mobile credit card, by which the user can use the fitness center.

With reference to FIG. 52(*a*), to purchase the voucher, the user can put a mobile terminal 100 close to the payment terminal 300 of the member shop. In this case, the payment terminal 300. In this case, the payment terminal 300 can receive information of a mobile credit card from the mobile terminal 100. According to one embodiment, since a short range communication technology such as NFC is applied for receiving information of the mobile credit card, detailed description thereof will be omitted in what follows.

A member shop server can transmit a payment approval request of the voucher to the card company server of the mobile credit card together with the information of the mobile credit card received from the payment terminal 300. The card company server can perform an authentication procedure on the transmitted information of the mobile credit card.

In case the transmitted mobile credit card is authenticated, the card company server can transmit payment approval information with respect to the transmitted payment approval request to the member shop server. Also, the card company server can transmit information about the payment details to the mobile terminal 100.

With reference to FIG. 52(*b*), according to one embodiment, information about the payment details can include information about the price of a product for payment or period of use of the product. The electronic receipt r9 can include information about the payment details. According to one embodiment, the mobile terminal 100 can receive information including period of use and the number of use of a purchased product through the payment terminal 300 of the member shop. In this case, the electronic receipt r9 can include the received information including period of use and the number of use allowed for a purchased product.

So far, a procedure of mobile payment for the case of purchasing a product at a member shop according to one embodiment has been described. However, this is only an example, and the present invention is not limited thereto. A method for mobile payment according to the purchase of a product can be embodied by using any method as long as the electronic receipt r9 is transmitted to the mobile terminal 100.

Also, in the description above, it has been assumed that mobile payment is performed by using a mobile credit card according to one embodiment. However, the present invention is not limited to the aforementioned assumption. The descriptions given below can also be applied virtually in the same way for the case where the user pays for a product at a member shop by using an actual credit card, and the controller 180 receives an electronic receipt r9 with respect to the payment for the product.

Referring again to FIG. 51, the controller 180 can generate mobile membership card for the member shop on the basis of the received electronic receipt r9, S1310.

With reference to FIG. 53(*a*), the controller 180 can display the received electronic receipt r9 on the touch screen 151. According to one embodiment, the controller 180 can overlay the electronic receipt r9 on the mobile credit card c1 displayed on the touch screen 151.

In this case, the controller 180 can display the indicator 510 for generating a mobile membership card on the touch screen 151 together with the received electronic receipt r9. As shown in FIG. 53(b), if the user selects the indicator 510, the controller 180 can display notification for mobile card generation 511 which notifies that a new mobile membership card can be generated.

If the user selects generation of a new mobile membership card, the controller 180 can generate a mobile membership card on the basis of the received electronic receipt r9. The controller 180 can generate the information of the mobile membership card by reflecting the information about the product name, period of use, the number of use, and purchase price of the product included in the electronic receipt r9.

According to one embodiment, in case information about a form of the mobile membership card that the member shop provides is available, the controller 180 can receive the information through the payment terminal 300 from the member shop server. In this case, the controller 180 can generate an image or a data form of the mobile membership card according to the received information.

However, this is only an example, and the present invention is not limited thereto. In case information about a form of the mobile membership card that the member shop provides is unavailable, the controller 180 can generate the mobile membership card by using a predetermined form or image stored for a membership card. Or the controller 180 can generate the mobile membership card by receiving a form or an image about the membership card from an external server through the wireless communication unit 110.

Referring again to FIG. 51, the controller 180 can store the generated mobile membership card in conjunction with the mobile credit card and the received electronic receipt S1320 and display the generated mobile membership card on the touch screen S1330.

The controller 180 can store the information of the mobile membership card mc1 in conjunction with the received electronic receipt r9 and the mobile credit card used for payment of the product. As shown in FIG. 54(a), the controller 180 can display the generated mobile membership card mc1 on the touch screen 151.

According to one embodiment, in case the user applies a predetermined input to the mobile membership card mc1, the controller 180 can display information about a product for which payment has been processed on the back mc1' of the mobile membership card as shown in FIG. 54(b). The predetermined input can be implemented by various touch methods such as a short touch, long touch, multi-touch, drag touch, flick touch, pinch-in touch, pinch-out touch, swipe touch, and hovering touch; and a combination thereof.

In this case, according to one embodiment, the controller 180 can generate an animation effect of flipping over the mobile membership card mc1 displayed on the touch screen 151.

According to the description above, since a mobile membership card is generated on the basis of an electronic receipt received at the time of mobile payment, the user can easily receive a membership card related to a paid product. Also, since the generated mobile membership card is managed in conjunction with the electronic receipt and a mobile credit card used for the payment, the user can easily manage mobile membership card-related payment.

Figure 55:
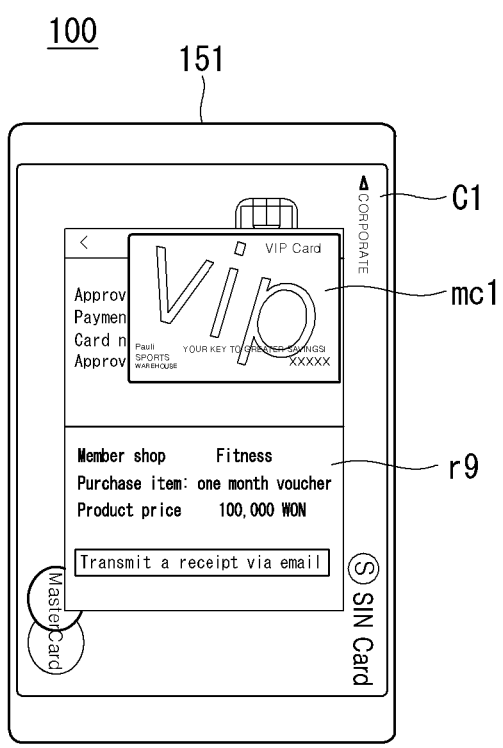
FIGS. 55 and 56 illustrate storing and displaying a mobile credit card, a received electronic receipt and a mobile membership card in conjunction with each other according to one embodiment of the present invention.
Figure 56:
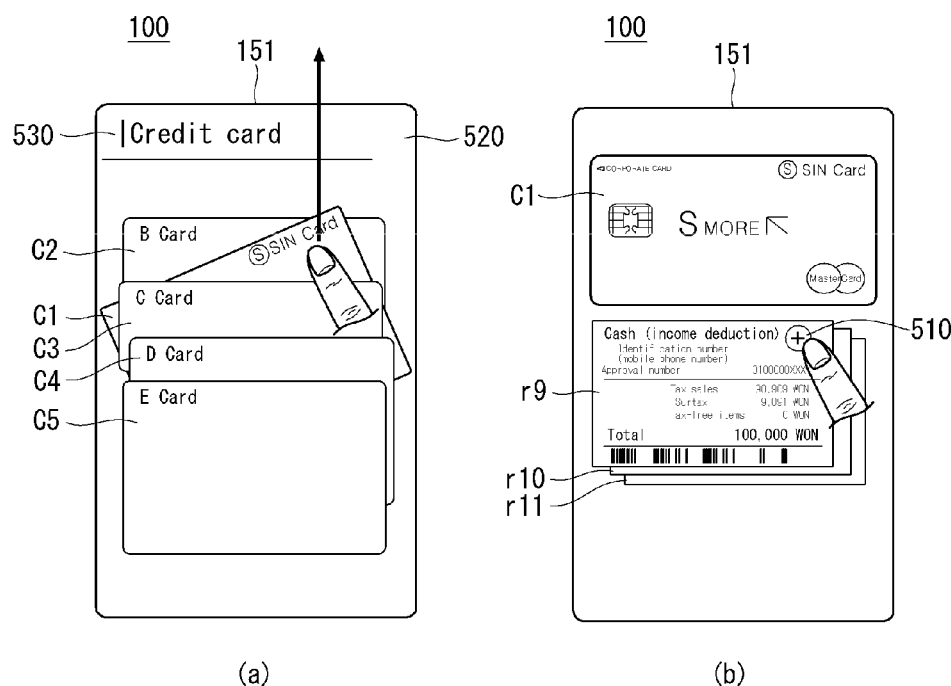

FIGS. 55 and 56 illustrate storing and displaying a mobile credit card, a received electronic receipt and a mobile membership card in conjunction with each other according to one embodiment of the present invention.

With reference to FIG. 55, a mobile credit card c1 is displayed on the touch screen 151, and on top of the mobile credit card c1, an electronic receipt r9 is displayed. As described above, the electronic receipt r9 is stored in conjunction with the mobile credit card c1 and can be displayed in the form of an attachment to the mobile credit card c1. According to one embodiment, the controller 180 can display the generated mobile membership card mc1 in one part of the displayed electronic receipt r9.

According to one embodiment, as described with reference to FIG. 52(a), it is assumed that a mobile membership card mc1 is already stored in the mobile terminal 100 when mobile payment is performed at a member shop. In this case, the controller 180 can store the generated mobile membership card mc1 directly in conjunction with the mobile credit card c1 used for payment and the received electronic receipt r9. Also, as shown in FIG. 55, the electronic receipt r9 and the mobile membership card mc1 can be displayed in the form of attachments to the mobile credit card c1.

Also, the electronic receipt r9 and the mobile membership card mc1 attached to the mobile credit card c1 shown in FIG. 55 can be displayed when the user selects the mobile membership card mc1 or electronic receipt r9. According to the description above, since the mobile membership card mc1, electronic receipt r9, and mobile credit card c1 with respect to a paid product are displayed at the same time, the user can easily recognize the paid product and mange payment.

With reference to FIG. 56(a), an execution screen 520 of a card management application which manages mobile cards stored in the mobile terminal 100 can be displayed on the touch screen 151. The controller 180 can manage the information of mobile cards stored in the mobile terminal 100 through the card management application in an integrated manner. The controller 180 can display the mobile credit card c1 and the mobile membership card mc1 on the execution screen 520 of the card management application which manages mobile cards stored in the mobile terminal 100 along with other mobile cards.

As shown in FIG. 56(a), a credit card category 530 can be displayed on the execution screen 520. In the credit card category 530, mobile credit cards c1 to c5 stored in the mobile terminal 100 can be displayed. Although FIG. 56(a) shows only the credit card category 530, the present invention is not limited to the example above. The execution screen 520 can include other categories representing various electronic payment methods related to mobile payment, such as membership card, gifticon, and electronic voucher, in addition to the credit card category.

However, the present invention is not limited to the description above, but according to another embodiment, the execution screen 520 can display all of the mobile cards stored in the mobile terminal 100 in a predetermined order without grouping the mobile cards according to the categories. For example, mobile cards can be displayed according to the order in which the mobile cards are stored in the mobile terminal 100 or frequency of use.

Also, the execution screen 520 of FIG. 56(a) is only an example, and the present invention is not limited to the example. The controller 180 can display an icon or text for each mobile card on the execution screen 520 instead of displaying an image of the mobile card as shown in FIG. 56(a).

Also, according to one example, each mobile card can be displayed according to a predetermined criterion such as frequency of use or amount of money used so that a display order or display size can be distinguished from each other. For example, the controller 180 can display the most used mobile card at the top of the corresponding category. Or the controller 180 can display the size of each mobile card in proportion to the amount of money used.

According to one embodiment, as shown in FIG. 52(*a*), it is assumed that a mobile membership card mc1 related to a paid product is not generated when mobile payment is performed at a member shop. The user can select a mobile credit card c1 used for payment from among the mobile credit cards c1 to c5 displayed on the execution screen 520 to generate the mobile membership card mc1.

As shown in FIG. 56(*a*), selection of the mobile credit card c1 can be performed by the user input which touches the mobile credit card c1 and dragging it upward. However, this is only an example, and the present invention is not limited thereto. Selection of the mobile credit card c1 can be implemented by various touch methods such as a short touch, long touch, multi-touch, drag touch, flick touch, pinch-in touch, pinch-out touch, swipe touch, and hovering touch; and a combination thereof.

With reference to FIG. 56(*b*), receiving an input selecting the mobile credit card c1, the controller 180 can display an electronic receipt r9 to r11 received after payment by the mobile credit card c1 on the execution screen 520.

According to one embodiment, the electronic receipt r9 to r11 can be displayed being overlapped with each other as shown in FIG. 56(*b*). In this case, according to the user's flick touch input, the electronic receipt displayed on top of the displayed electronic receipts r9 to r11 can be changed. For example, if a flick touch input is applied in a upward direction, the electronic receipt r9 displayed at the top moves to the bottom while the electronic receipt r10 at the second highest position can move to the top.

However, this is only an example, and the present invention is not limited to the example. The electronic receipts r9 to r11 can be displayed separately below the mobile credit card c1. In this case, the user can check electronic receipts not displayed on the touch screen 151 by scrolling the touch screen 151.

With reference to FIG. 56(*b*), in case mobile membership cards related to the respective electronic receipts r9 to r11 have not been generated, the controller 180 can display an indicator 510 for generating a mobile membership card in each electronic receipt r9 to r11. If the user selects the indicator 510, the controller 180 can generate a mobile membership card on the basis of the electronic receipt which includes the selected indicator 510. Since generation of a mobile membership card can be performed according to the descriptions above, further descriptions thereof will be omitted.

According to the description above, since a generated mobile membership card is managed in conjunction with an electronic receipt and a mobile credit card used for payment, the user can manage payment related to mobile membership cards easily. Also, by storing mobile credit cards and electronic receipts together, the user can manage mobile credit cards easily.

Figure 57:
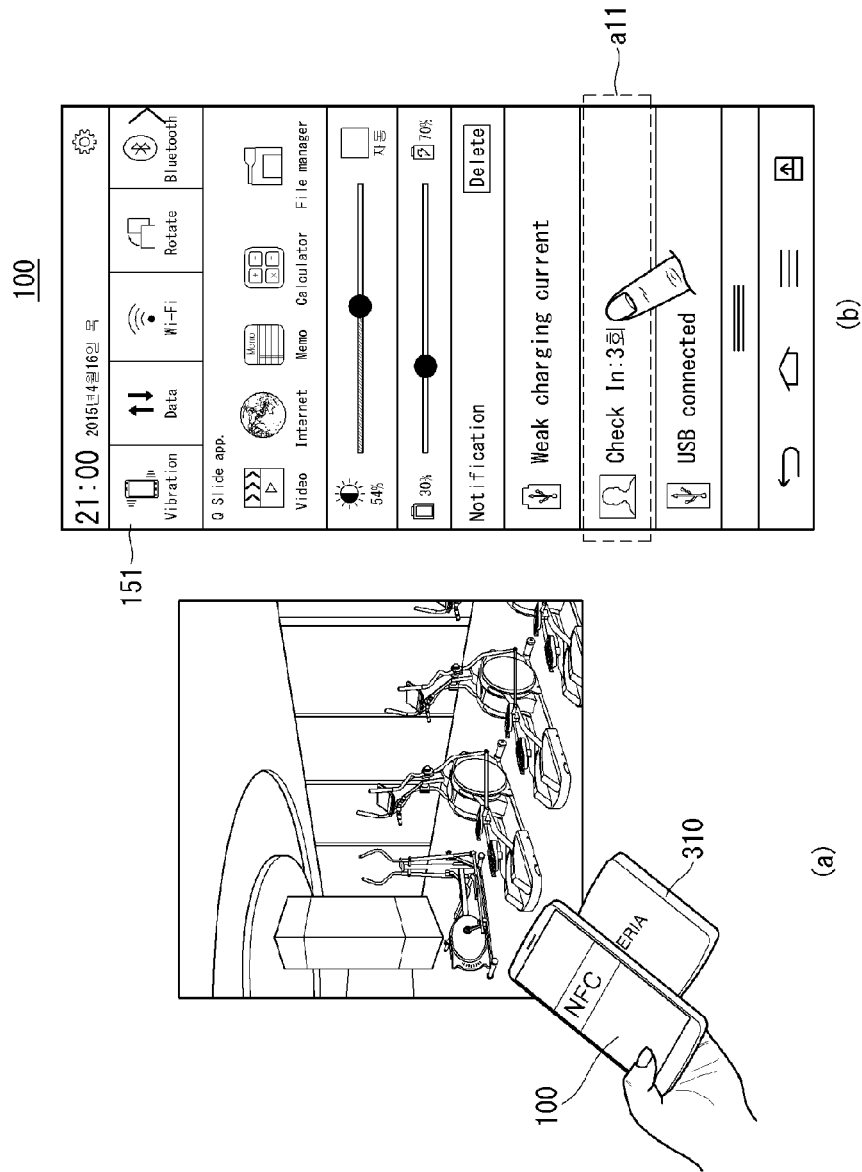
FIGS. 57 and 58 illustrate displaying period of use and the number of use of a product related to a mobile membership card according to one embodiment of the present invention.
Figure 58:
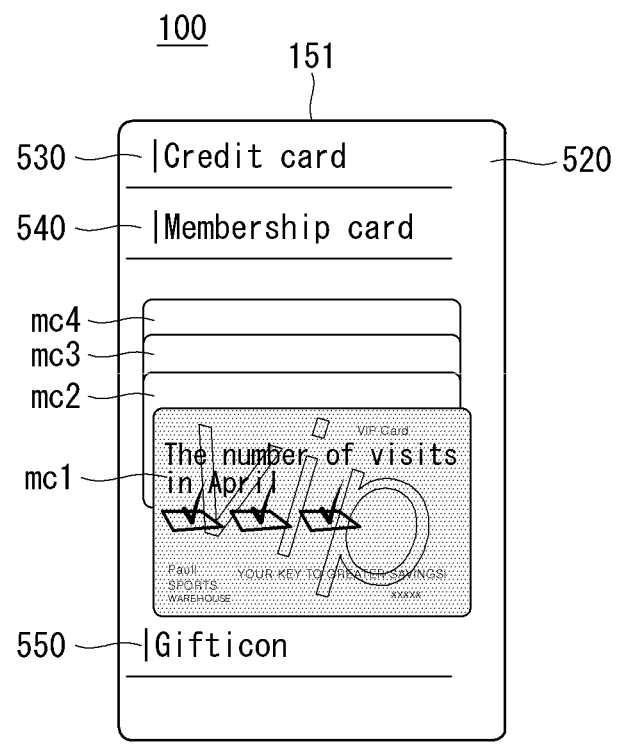

FIGS. 57 and 58 illustrate displaying period of use and the number of use of a product related to a mobile membership card according to one embodiment of the present invention.

With reference to FIG. 57(*a*), in case the user uses a fitness center, a member shop, the user can put the mobile terminal 100 close to the member management terminal 310 of the member shop. In this case, the member management terminal 310 and the mobile terminal 100 can exchange information related to the fitness center voucher for which payment has already been performed. The member shop server can perform management of members on the basis of the received information. According to one embodiment, since a short range communication technology such as NFC is applied for transmission and reception of the information, further descriptions thereof will be omitted.

According to one embodiment, the controller 180 can display period of use or the number of use allowed for a product paid at the member shop can be displayed on the generated mobile membership card mc1 on the basis of the electronic receipt r9. According to the information received from the member management terminal 310 of the member shop, the controller 180 can output notification about the period during which or the number of times the product has been used.

As shown in FIG. 57(*a*), if the user checks in by putting the user's mobile terminal 100 to the member management terminal 310 of the member shop, the controller 180 can display notification a11 about the number of uses of the product as shown in FIG. 57(*a*). In this case, according to one embodiment, the notification a11 can be displayed in the status bar of the mobile terminal 100 and can be displayed as shown in FIG. 57(*b*) according to a downward dragging input.

In case the notification a11 is selected, the controller 180 can execute a card management application. Referring to FIG. 58, in the membership card category 540 of the execution screen 520 of the card management application, mobile membership cards mc1 to mc4 stored in the mobile terminal 100 can be displayed. The controller 180 can display the mobile membership card mc1 related to the notification a11 at the top of the category and display the number of uses alongside the mobile membership card mc1.

According to the description above, since a period during which or the number of times a paid product has been used is displayed in the mobile membership card and related notification is displayed, the user can easily recognize the information about a product related to the mobile membership card.

Figure 59:
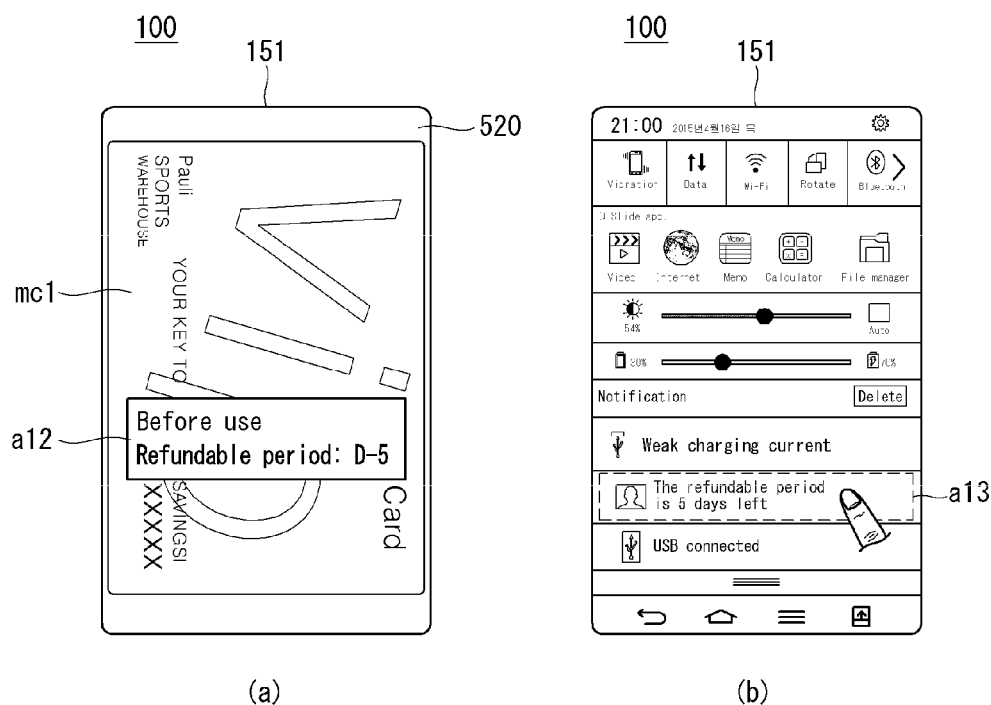
FIGS. 59 and 60 illustrate outputting notification with respect to payment cancellation and canceling payment according to one embodiment of the present invention.
Figure 60:
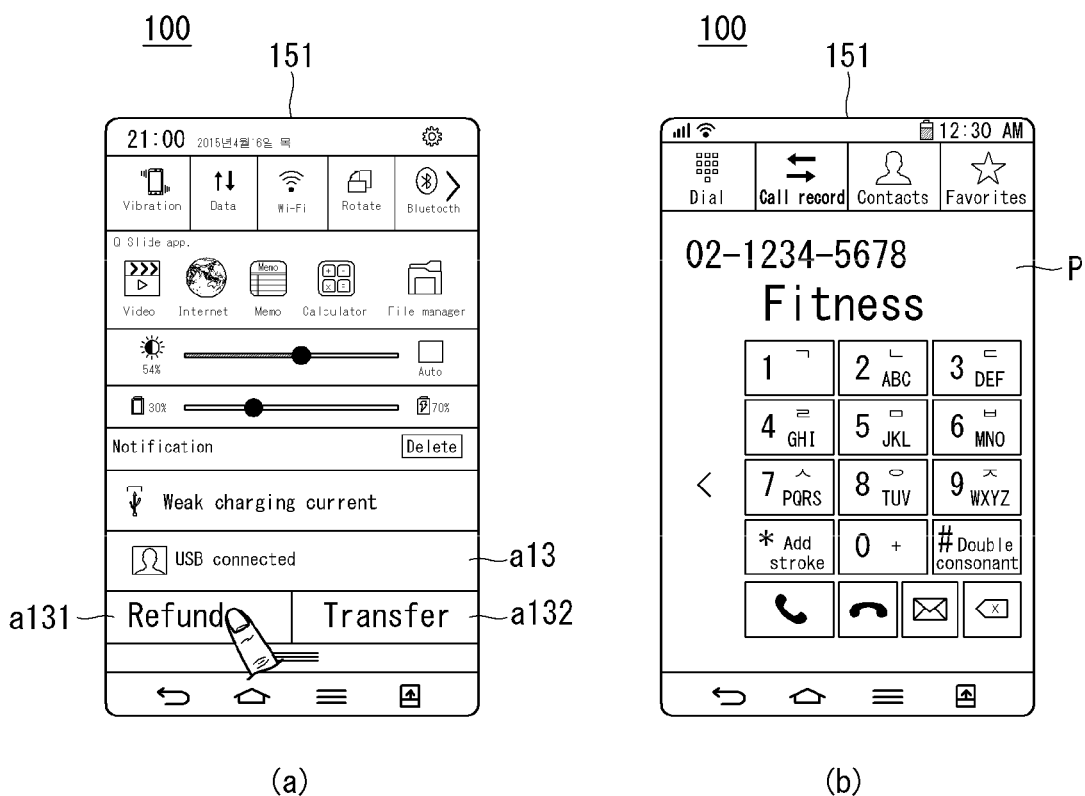

FIGS. 59 and 60 illustrate outputting notification with respect to payment cancellation and canceling payment according to one embodiment of the present invention.

With reference to FIG. 59(*a*), if the mobile membership card mc1 is selected, the controller 180 can display the mobile membership card mc1 on the execution screen of the card management application. According to one embodiment, in case a product related to the mobile membership card mc1 is not used, the controller 180 can display notification a12 which notifies that the product is not being used in one part of the mobile membership card mc1.

According to another embodiment, in case the product paid at the member shop is not used for a predetermined period, the controller 180 can display notification a13 which notifies that the product is not being used. The notification a13 can be displayed in the status bar of the mobile terminal 100 and can be displayed as shown in FIG. 59(*b*) according to a downward dragging input. Also, the controller 180 can display the notification a13 repeatedly at predetermined intervals before the payment is cancelled.

If the user selects the notification a13, the controller 180 can display an indicator a131 for canceling payment for the product or an indicator a132 for transferring the product as shown in FIG. 60(*a*). In case the user selects the indicator a131 for canceling payment of the product, the controller 180 can display a screen p for making a call to the member shop related to the mobile membership card mc1 as shown in FIG. 60(*b*). The user can call the member shop through the screen p and cancel the payment.

According to the description above, since notification is displayed for a product which has been paid but not used for a predetermined period, the user can easily cancel payment for the product.

Figure 61:
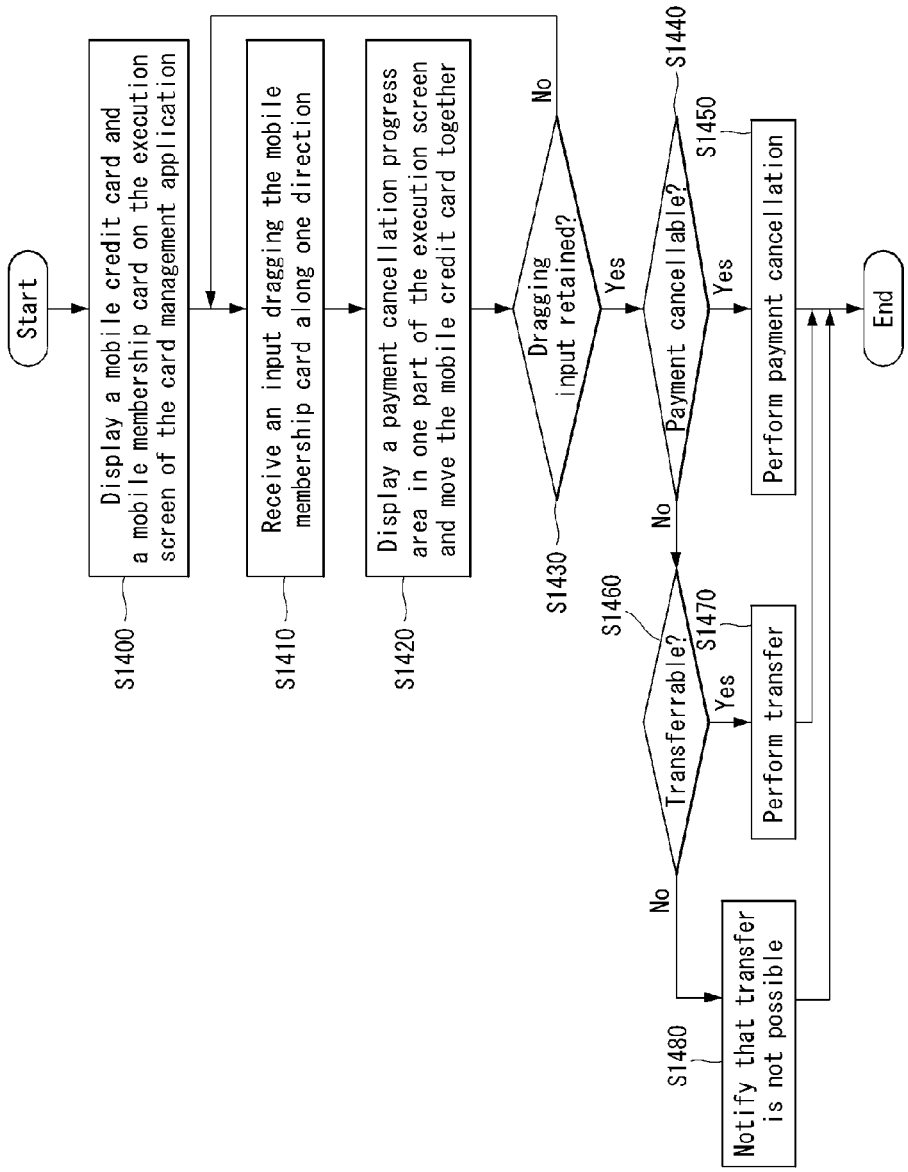
FIG. 61 is a flow diagram of a method for canceling payment by using a mobile credit card or transferring a related product according to one embodiment of the present invention.
Figure 68:
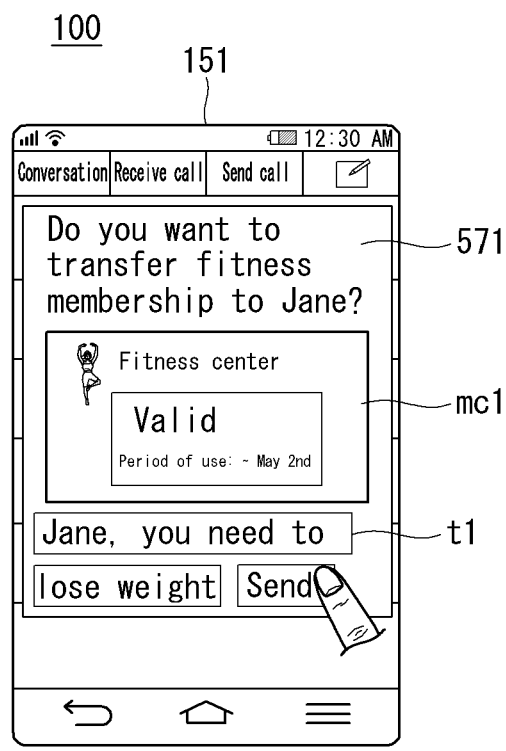

FIG. 61 is a flow diagram of a method for canceling payment by using a mobile credit card or transferring a related product according to one embodiment of the present invention. FIGS. 62 to 65 illustrate canceling payment by dragging a mobile membership card according to one embodiment of the present invention. FIGS. 66 to 68 illustrate transferring a paid product in case payment cancellation is not possible according to one embodiment of the present invention.

With reference to FIG. 61, the controller 180 can display the mobile credit card and the mobile membership card on the execution screen of the card management application which manages mobile cards stored in the mobile terminal S1400.

Figure 62:
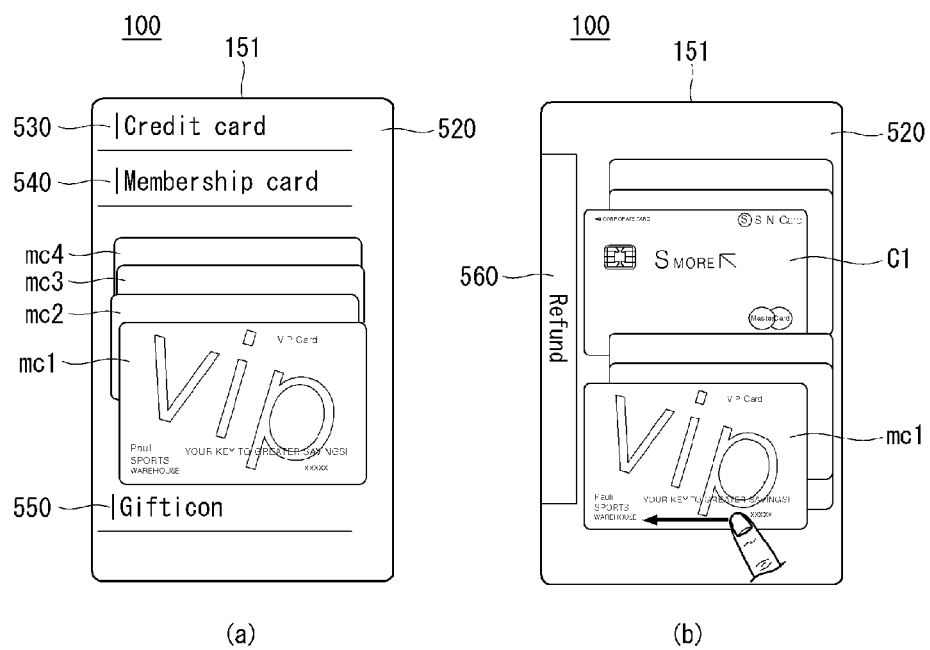
FIGS. 62 to 65 illustrate canceling payment by dragging a mobile membership card according to one embodiment of the present invention.

FIG. 62(*a*) shows a case where mobile membership cards mc1 to mc4 stored in the mobile terminal 100 are displayed in the membership card category of the execution screen 520 of the card management application. The execution screen can include a credit card category 530 or a gifticon category 550 in addition to the membership card category 540.

From the execution screen 520, it can be seen that the credit card category 530 is in a closed state. In the closed state, a mobile credit card stored in the mobile terminal 100 may not be displayed in the credit card category 530. If the user selects the credit card category 530, the controller 180 can switch the credit card category 530 to an open state, thereby displaying the stored mobile credit card.

Referring again to FIG. 61, the controller 180 can receive an input dragging the mobile membership card along one direction S1410.

As shown in FIG. 62(*b*), the user can touch the mobile membership card mc1 related to a product for which to cancel payment and to request refund; and drag the mobile membership card mc1 to the left. According to one embodiment, if the mobile membership card mc1 is selected, the controller 180 can display the mobile credit card c1 used for payment related to the mobile membership card mc1 so that the mobile credit card c1 can be distinguished from other mobile cards.

To this purpose, the controller 180 can increase the display area for the mobile credit card c1 among mobile cards, part of which are displayed being overlapped with each other. However, this is only an example, and the controller 180 can distinguish the whole or the boundary of the mobile credit card c1 with a separate color, highlight the mobile credit card c1, or display the mobile credit card c1 with a flickering effect or with separate text or figure.

According to one embodiment, if the user drags the mobile membership card mc1 to the left, the controller 180 can display a payment cancellation progress area 560 at the left edge of the execution screen 520 as shown in FIG. 62(*b*). Also, the controller 180 can move the mobile credit card c1 according to the movement of the mobile membership card mc1, S1420.

Referring again to FIG. 61, the controller 180 can check whether a dragging input is retained with respect to the mobile membership card mc1, S1430.

Figure 63:
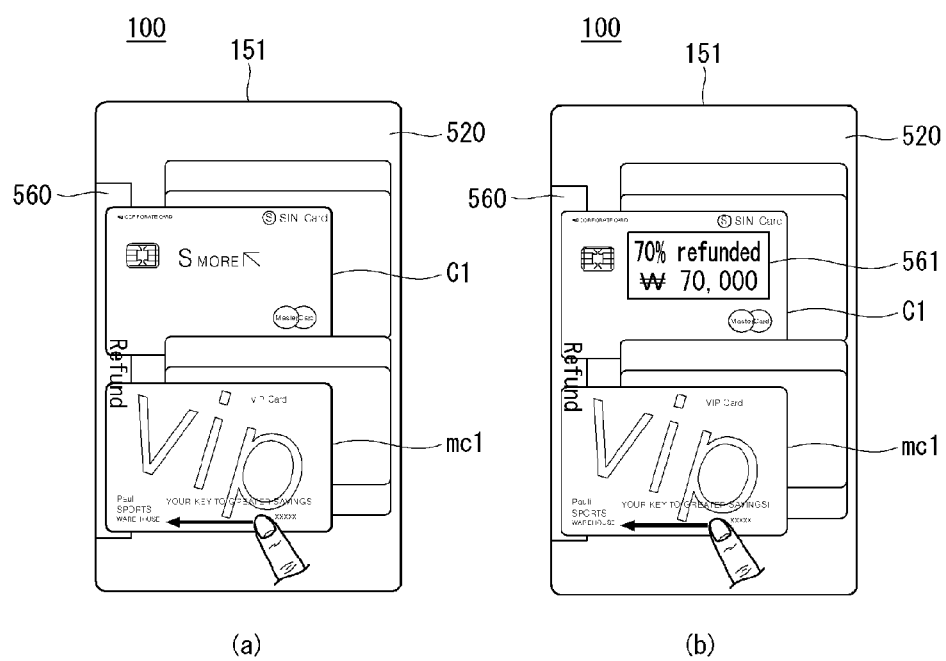

As shown in FIG. 63(*a*), to cancel payment and request refund, the user can keep dragging the mobile membership card mc1 to the payment cancellation progress area 560. In this case, according to one embodiment, the controller 180 can display information 561 related to the cancellation of payment in the mobile credit card c1. With reference to FIG. 63(*b*), the information 561 related to the cancellation of payment can be an amount of refund due to a refund policy of the member shop or card company.

However, this is only an example, and a product name or more specific refund information can be displayed in addition to the amount of refund. Or if the user selects the information 561 related to the cancellation of payment, the controller 180 can display a screen showing information about the grounds by which the amount of refund has been calculated on the execution screen 520.

Figure 64:
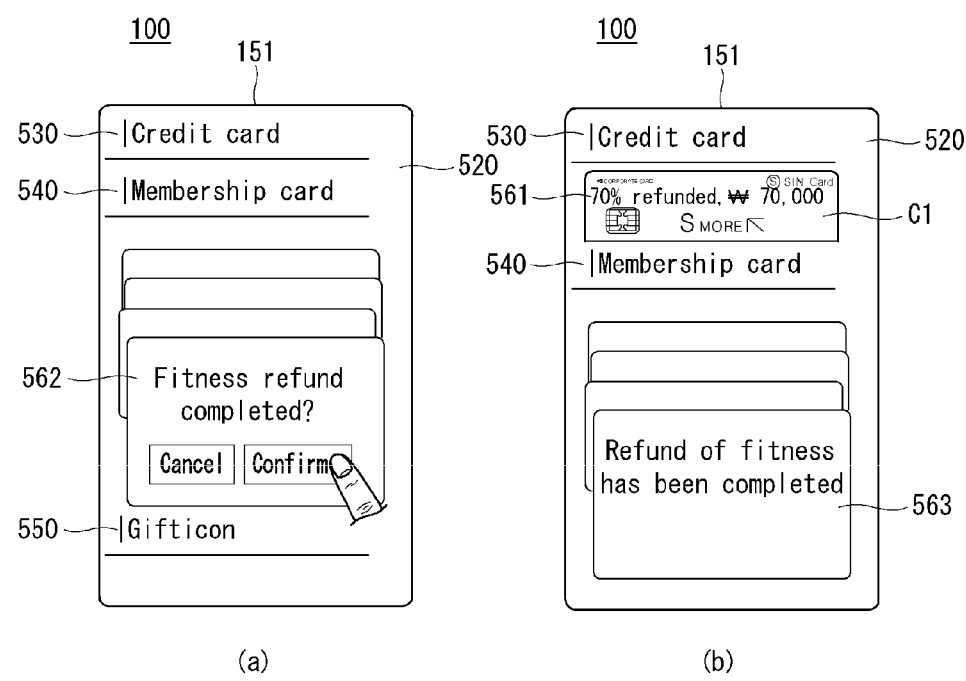

Referring again to FIG. 61, in case an input dragging the mobile membership card mc1 is retained S1430 (Yes), the controller 180 can check whether the payment can be cancelled S1440. In case the payment can be cancelled S1440 (Yes), the controller 180 can display a notification window 562 by which to check the intention to cancel payment of a product related to the mobile membership card mc1 as shown in FIG. 64(*a*). According to one embodiment, the notification window 562 can be displayed in the area of the mobile membership card mc1.

If the user confirms cancellation of the payment, the controller 180 can cancel the payment S1450. To this end, the controller 180 can transmit a request for cancellation of the payment to the server of a card company managing the mobile membership card mc1.

If the server of the card company receives the cancellation request, the server can transmit a request for cancellation of the payment to the server of the member shop after processing a predetermined authentication procedure. If cancellation of the payment is approved by the server of the member shop, the server of the card company can transmit cancellation information of the payment to the mobile terminal 100.

As shown in FIG. 64(*b*), receiving cancellation information of the payment, the controller 180 can display the received cancellation information of the payment 563 on the execution screen 520. In this case, the controller 180 can display the mobile credit card c1 related to the payment and the information 561 related to cancellation of the payment on the execution screen 520.

In the example above, a cancellation process of mobile payment using a mobile credit card employing a mobile terminal 100, a server of a card company, and a server of a member shop according to one embodiment has been described, but the present invention is not limited to the example. In other words, any method can be applied as long as the mobile terminal 100 can transmit a request for cancellation of payment and receive cancellation information of the payment according to the user's input.

Referring again to FIG. 61, if the dragging input is released, the controller 180 can return the mobile membership card and the mobile credit card to their original positions and stop cancellation of the payment S1430 (No).

Figure 65:
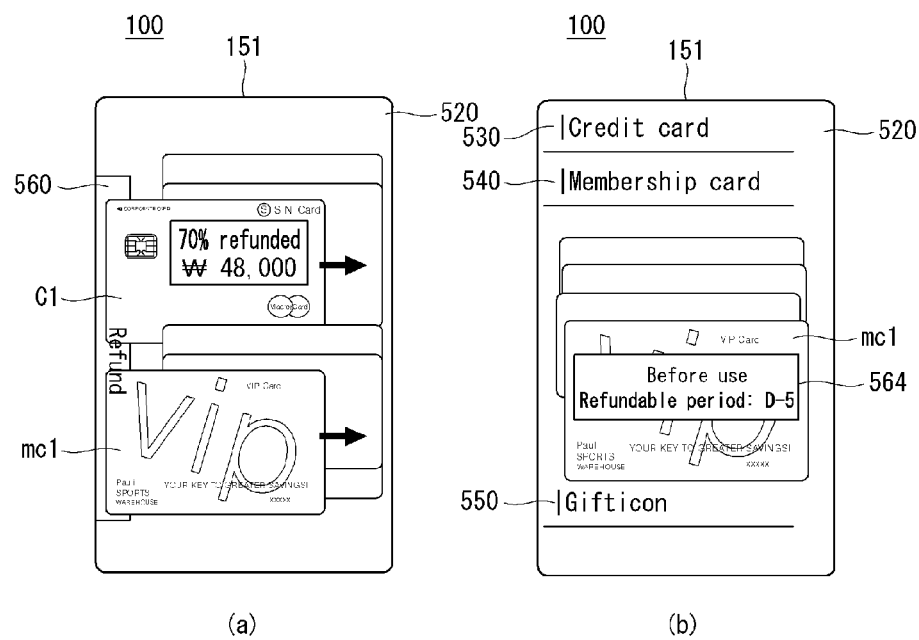
Figure 66:
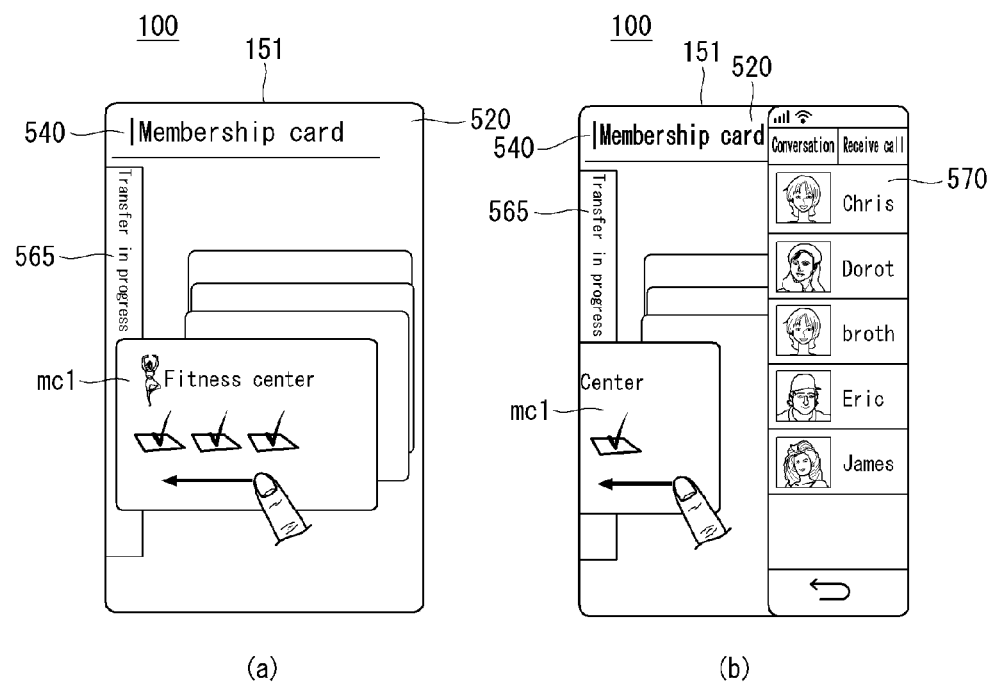

With reference to FIG. 65(*a*), in case the user wants to stop cancellation of the payment, the user can release the dragging input on the mobile membership card mc1. In this case, the controller 180 can stop cancellation of the payment. The controller 180 can move the mobile membership card mc1 to its original position. According to the movement of the mobile membership card mc1, the controller 180 can also move the mobile credit card c1 to its original position.

FIG. 65(*b*) illustrates a case where the mobile membership card mc1 is returned to its original position of the execution screen 520. In this case, the controller 180 display notification 564 for a period during which cancellation of the payment is possible in one area of the mobile membership card mc1.

The descriptions above assume that dragging the mobile membership card mc1 to the left in the execution screen 520 is configured to trigger cancellation of payment, but the present invention is not limited to the assumption. Cancellation of payment can be configured to start in case the mobile membership card mc1 is dragged in a different direction or a different specific touch input is applied.

According to the descriptions above, since a mobile credit card which has performed payment related to a mobile membership card is moved together according to a dragging input to the mobile membership card, the user can intuitively recognize the mobile credit card which has performed payment related to the mobile membership card. Also, since only a simple motion of dragging the mobile membership card is required to perform cancellation of payment related to the mobile membership card, the user can easily cancel payment.

Referring again to FIG. 61, in case the cancellation is not allowed S1440 (No), the controller 180 can determine whether the product related to the payment can be transferred S1460. If the product can be transferred S1460 (Yes), the controller 180 can proceed to transfer the product S1470.

With reference to FIG. 66(a), in case cancellation of the payment is not allowed, the controller 180 can display notification in the left area 565 of the execution screen 520, which notifies that payment cannot be cancelled. In case the product related to the payment is transferrable, the controller 180 can display notification in the same area 565 as shown in FIG. 66(b), which notifies that transfer of the product is performed.

In this case, according to one embodiment, the controller 180 can display a screen 570 showing a list of contacts stored in the mobile terminal 100 in the execution screen 520 to connect to a person to whom to transfer the product. According to one embodiment, the controller 180 can display the screen 570 including the list of contacts to appear from the right edge of the execution screen 520. However, this is only an example, and the present invention is not limited to the example; the screen 570 can be displayed immediately as shown in FIG. 67(a).

If the user selects a contact h1 of a person to whom to transfer the product from the screen 570, the controller can display a screen 571 for transferring the product as shown in FIG. 67(b). The screen 571 can display the mobile membership card mc1 which includes the information about the product. If the user selects transfer, the controller 180 can transmit information about the mobile membership card mc1 and information about the product to the contact h1 of the person.

With reference to FIG. 68, according to one embodiment, the controller 180 can display an area t1 for writing a message to be attached on the screen 571 for transferring the product while transmitting information about the mobile membership card mc1 and the information about the product. In this case, the user can write a message in the aforementioned area t1.

Referring again to FIG. 61, if transfer of the product is impossible S1460 (No), the controller 180 can display notification which notifies that the product cannot be transferred S1480. According to one embodiment, the controller 180 can display notification in the left area 565 of the execution screen 520, which notifies that the product cannot be transferred. Or according to another embodiment, the controller 180 can generate an effect that the mobile membership card mc1 is bounced off when it is dragged into the left area 565 of the execution screen 520.

According to the description above, since transfer of a related product can be performed in case payment related to a mobile membership card cannot be cancelled, the user can easily perform transfer of the related product.

Figure 70:
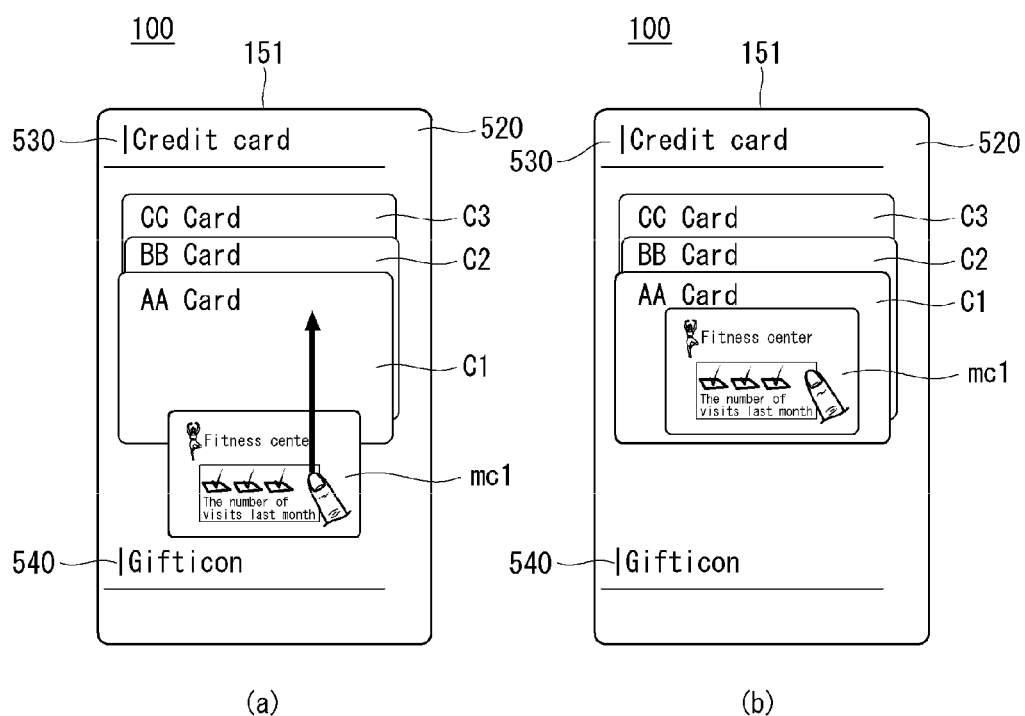

FIGS. 69 and 70 illustrate performing additional payment in case a period of using a paid product is shorter than a predetermined time period according to one embodiment of the present invention.

With reference to FIG. 69(a), in case a remaining period allowed for using the product corresponds to a predetermined period, the controller 180 can display notification a14 which notifies of additional payment for the product. In this case, according to one embodiment, the notification a14 can be displayed in the status bar of the mobile terminal 100 and can be displayed as shown in FIG. 69(a) according to a downward dragging input.

If the user selects the notification a14, the controller 180 can display the mobile credit card c1 and mobile membership card mc1 related to the notification a14 on the execution screen 520 of the card management application. As shown in FIG. 69(b), the user can drag the mobile membership card mc1 toward the credit card category 530 to extend the period of use for the product.

In this case, as shown in FIG. 70(a), the controller 180 can display the mobile credit card c1, c2, c3 belonging to the credit card category 530 on the execution screen 520. According to one embodiment, the controller 180 can display the mobile credit card c1 used for payment related to the mobile membership card mc1 at the top in the category.

With reference to FIG. 70(b), the user can drag the mobile membership card mc1 over the mobile credit card c1. In this case, the controller 180 can perform additional payment of the product by using the mobile credit card c1. Since the procedure of the additional payment is actually the same as the payment process described above, detailed descriptions thereof will be omitted.

According to one embodiment, a condition for additional payment such as purchase price or period of use allowed for the product can be applied in the same way as the condition for the previous payment. In case the member shop changes a condition for additional payment for the product, the controller 180 can display notification which notifies that additional payment has been failed. In this case, the controller 180 can receive a changed condition for additional payment from the server of the member shop and display the condition. Afterwards, the user can determine whether to perform additional payment on the basis of the changed condition.

According to the descriptions above, since notification about additional payment for a product is displayed in case a remaining period of use allowed for the product corresponds to a predetermined period, the user can easily manage the period of use for the product. Also, since additional payment is performed according to an input dragging a mobile membership card to a mobile credit card, the user can easily perform additional payment for the same product.

Figure 71:
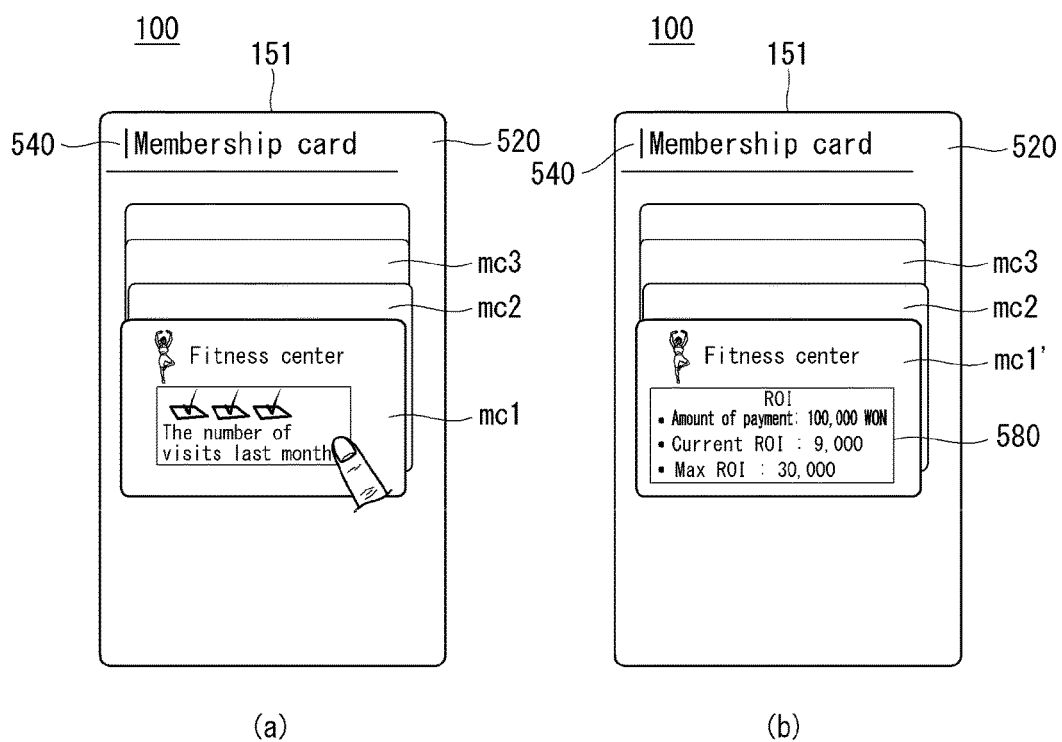
FIG. 71 illustrates calculating cost efficiency according to the number of times of using a product on the basis of payment cost for the product according to one embodiment of the present invention.

FIG. 71 illustrates calculating cost efficiency according to the number of times of using a product on the basis of payment cost for the product according to one embodiment of the present invention.

With reference to FIG. 71(a), the controller 180 can receive a predetermined input for the mobile membership card mc1 displayed on the execution screen 520 of the card management application. The predetermined input can be an input for calculating a use efficiency with respect to a product related to the mobile membership card mc1. The predetermined input can be implemented by various touch methods such as a short touch, long touch, multi-touch, drag touch, flick touch, pinch-in touch, pinch-out touch, swipe touch, and hovering touch; and a combination thereof.

In this case, as shown in FIG. 71(b), the controller 180 can display cost efficiency 580 due to the number of times for using the product calculated on the basis of payment cost of the product. According to one embodiment, the controller 180 can calculate the cost efficiency 580 in terms of ROI (Return On Investment). The ROI can be an indicator for calculating a ratio of profit to investment. Calculation of the efficiency in terms of the ROI follows the method well-known to the field, and further details thereof will be omitted.

However, this is only an example, and calculation of the efficiency 580 is not limited to the method of using the ROI. In other words, any method can be employed as long as it is capable of calculating cost efficiency due to payment cost for the product and the cost due to the number of times for using the product.

According to one embodiment, as shown in FIG. 71(b), the controller 180 can display the calculated efficiency 580 on the back mc1' of the mobile membership card. To this purpose, the controller 180 can generate an animation effect of flipping over the mobile membership card mc1 if the predetermined input is applied.

According to one embodiment, the controller 180 can display the calculated efficiency 580 differently according to a predetermined range of the efficiency. For example, in case the calculated efficiency 580 is very low, the controller 180 can display the background of the back of the mobile membership card in red color. However, this is only an example, and the present invention is not limited to the example. The range of the calculated efficiency 580 can be distinguished by using a color, symbol, text, or flickering effect.

According to the descriptions above, since the ratio of payment cost for a product to the cost due to the number of times for using the product is calculated and displayed, the user can manage the use of the product effectively.

Figure 72:
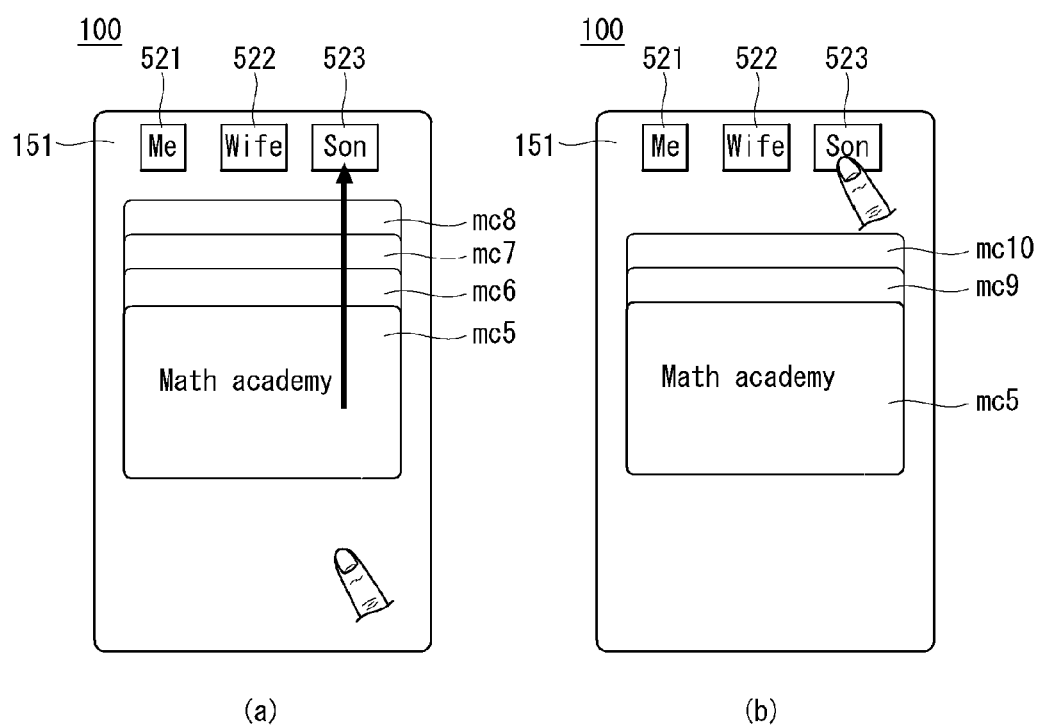
Figure 73:
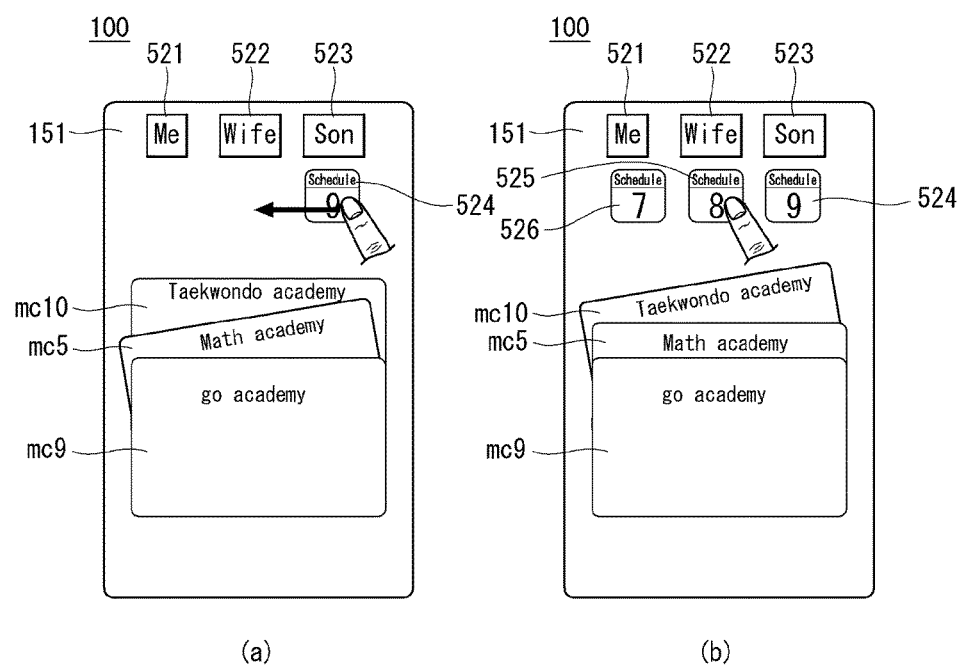

FIGS. 72 to 74 illustrate classifying and managing mobile cards according to a predetermine criterion in a card management application according to one embodiment of the present invention.

With reference to FIG. 72(a), the execution screen 520 of the card management application can include a predetermined criterion 521, 522, 523. The predetermined criterion can correspond to a criterion related to a mobile card stored in the mobile terminal 100. For example, FIG. 72(a) shows a criterion based on persons related to the mobile card. In other words, the mobile card can be managed in terms of a relationship with third parties.

FIG. 72(a) shows mobile cards mc5 to mc8 relevant to a first criterion 521 displayed on the execution screen 520. To move a particular mobile card mc5 among the mobile cards mc5 to mc8 to the group of a third criterion 523, the user the user can drag and drop the mobile card mc5 to the group of the third criterion 523.

In this case, the controller 180 can move the mobile card mc5 to the group of the third criterion 523. As shown in FIG. 72(b), if the user selects the third criterion, the moved mobile card mc5 can be displayed together with other mobile cards mc9, mc10.

With reference to FIG. 73(a), a mobile card belonging to the group based on the predetermined criterion 521, 522, 523 can be managed in conjunction with time information.

According to one embodiment, the controller 180 can display an indicator 524 for displaying a mobile card related to today as being attached to the third criterion 523. The indicator 524 can display information about today's date and the day.

If the user selects the indicator 524, the controller 180 can check the mobile card mc5 to be used today from an electronic receipt related to the mobile card or from a schedule application. The controller 180 can highlight the mobile card mc5 to be used today among mobile cards mc5, mc9, mc10 belonging to the group of the third criterion 523 so that the mobile card mc5 today can be distinguished from the others mc9, mc10.

In the example of FIG. 73(a), the color and slope of the mobile card mc5 are changed; however, this is only an example, and the present invention is not limited thereto. In other words, various methods using text, symbol, text, or highlighting can be applied as long as the mobile card mc5 can be distinguished.

To check mobile cards which may be needed at different dates rather than today, the user can apply a flick touch input to the left as shown in FIG. 73(a). In this case, the controller 180 can display indicators 525, 526 to highlight mobile cards related to past dates on the execution screen 520. If the user applies a flick touch input to the right, the controller 180 can display indicators for highlighting mobile cards related to future dates in the right side, while moving the indicator 524 to the left.

If the user selects an indicator 525 related to yesterday, the controller 180 can check the mobile card mc10 used yesterday from electronic receipts related to mobile cards or schedule application. The controller 180 can highlight the mobile card mc10 used yesterday among mobile cards mc5, mc9, mc10 belonging to the group of the third criterion 523 so that the mobile card used yesterday mc10 can be distinguished from the others.

According to one embodiment, it is assumed that a mobile card mc5 stored in the mobile terminal 100 is related to a third party (the user's son corresponding to the third criterion 523 shown in FIG. 72). If the third party does not put his mobile terminal to the member management terminal of the member shop, the controller 180 can display notification (a15, for example, notification that the son, the third party, didn't attend the class if the member shop is a private academy) which notifies that the third party didn't use the product as shown in FIG. 74(a). In this case, according to one embodiment, the notification a15 can be displayed in the status bar of the mobile terminal 100 and can be displayed according to a downward dragging input.

To this end, the controller 180 can receive information about whether to use the product from the server of the member shop. In this case, the server of the member shop can transmit information about the product's not being used to the mobile terminal 100 if a predetermined time period is passed from the time the product is supposed to be used.

As shown in FIG. 74(b), if the user selects the notification a15, the controller 180 can display the execution screen 520 of the card management application. The controller 180 can display details of use of the product on the back mc5' of the mobile card.

The description above gives an example of checking whether a product related to the mobile card of a third party is being used or not by using the mobile card related to the third party. However, the present invention is not limited to the example, and the descriptions given with reference to FIGS. 1 to 71 can also be applied actually in the same way to payment, cancellation, or transfer of a product with respect to a third party.

According to the description above, since mobile cards related to third parties among mobile cards stored in the mobile terminal 100 are grouped according to the respective parties, the user can easily check and manage mobile cards related to the third parties.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
    a wireless communication unit;
    a touch screen;
    a memory; and
    a controller configured to:
        display on the touch screen an electronic receipt received through the wireless communication unit as payment of product is being processed,
        generate notification information on the basis of payment information obtained from the electronic receipt and service information according to the payment,
        wherein the payment information includes seller information of the product, time of the payment, amount of the payment, and name of the product, and
        wherein the service information includes at least one of information related to refund, replacement, after-sales service, or warranty of the product, and
        store the notification information in the memory in conjunction with a calendar application,
    wherein the controller is further configured to:
        cause the wireless communication unit to connect a sales system,
        request the service information from the sales system, and
        receive the service information not obtained from the electronic receipt through the wireless communication unit on the basis of the seller information, in case at least one of the service information is not obtained from the electronic receipt, and
    wherein the controller is also further configured to display a notification item indicating that the notification information has been set on the execution screen of the calendar application along with generated notification time.

2. The mobile terminal of claim 1, wherein, in case at least one of the service information is not obtained from the electronic receipt, the controller is configured to receive the service information not obtained from the electronic receipt through the wireless communication unit on the basis of the seller information.

3. The mobile terminal of claim 1, wherein the controller is configured to generate the notification information which includes notification time at which to output the notification information according to a predetermined condition on the basis of the payment information and the service information; and notification contents.

4. The mobile terminal of claim 1, wherein, if receiving a first input with respect to the electronic receipt, the controller is configured to display a menu for storing the electronic receipt in conjunction with the calendar application.

5. The mobile terminal of claim 1, wherein, in case an execution screen of the calendar application is displayed on the touch screen, the controller is configured to display a payment item indicating that the payment has been processed on the execution screen of the calendar application along with payment time.

6. The mobile terminal of claim 5, wherein, in case a payment item displayed on the execution screen of the calendar application is selected, the controller is configured to display specific information of a receipt on the touch screen, where the payment information and the service information are arranged in terms of predetermined items.

7. The mobile terminal of claim 6, wherein the controller is configured to edit the receipt specific information or displays a user interface within the receipt specific information, through which a user can input a condition for generating the notification information.

8. The mobile terminal of claim 5, wherein, in case a notification item displayed on the execution screen of the calendar application is selected, the controller is configured to display the generated notification information on the touch screen.

9. The mobile terminal of claim 1, wherein, if receiving a second input with respect to the electronic receipt, the controller is configured to search the memory for an electronic receipt having the same seller information as the electronic receipt and to display the searched electronic receipt on the touch screen.

10. The mobile terminal of claim 1, wherein, if receiving a third input with respect to the electronic receipt, the controller is configured to display a user interface for writing a memo in the electronic receipt.

11. The mobile terminal of claim 1, wherein, in case the electronic receipt includes a plurality of products, the controller is configured to store receipt specific information with respect to a selected product, where the payment information and the service information are arranged in terms of predetermined items and to generate the notification information with respect to the selected product.

12. The mobile terminal of claim 1, wherein, in case the payment is canceled, the controller is configured to receive an electronic receipt due to the cancellation through the wireless communication unit and to reflect information according to the cancellation in the calendar application.

13. The mobile terminal of claim 1, wherein, at the time of the payment, the controller is configured to receive a warranty for the corresponding product through the wireless communication unit and to store the received warranty in conjunction with the electronic receipt.

14. The mobile terminal of claim 1, further comprising a camera, wherein the electronic receipt is the image of the receipt obtained through the camera; and the controller is configured to obtain the payment information and the service information from the image of the receipt.

15. The mobile terminal of claim 1, wherein the controller is configured to receive vehicle information from a vehicle control system through the wireless communication unit and to generate the notification information on the basis of the payment information, the service information, and the vehicle information.

16. The mobile terminal of claim 15, wherein the vehicle information includes driving record, maintenance record, fueling record, and wash record of the vehicle.

17. The mobile terminal of claim 15, wherein, in case the controller receives a payment request from the vehicle control system, the controller is configured to perform a user authentication process and to transmit payment approval information through the wireless communication unit.

18. The mobile terminal of claim 1, wherein, if payment via a mobile credit card is processed at a member shop, the controller is configured to receive the electronic receipt, generate a mobile membership card for the member ship on the basis of the electronic receipt, store the generated mobile membership card in conjunction with the mobile credit card and the received electronic receipt, and display the generated mobile membership card on the touch screen.

19. The mobile terminal of claim 18, wherein the controller is configured to display the mobile credit card and the mobile membership card on the execution screen of a card management application which manages mobile cards stored in the mobile terminal along with other mobile cards; and if a predetermined input with respect to the mobile membership card is received from the execution screen of the card management application, to perform an operation corresponding thereto.

* * * * *